(12) United States Patent
Hariya et al.

(10) Patent No.: US 12,341,435 B2
(45) Date of Patent: Jun. 24, 2025

(54) POWER CONVERSION APPARATUS AND POWER CONVERSION SYSTEM

(71) Applicant: TDK CORPORATION, Tokyo (JP)

(72) Inventors: Akinori Hariya, Tokyo (JP); Hisanori Cho, Tokyo (JP)

(73) Assignee: TDK CORPORATION, Tokyo (JP)

( * ) Notice: Subject to any disclaimer, the term of this patent is extended or adjusted under 35 U.S.C. 154(b) by 612 days.

(21) Appl. No.: 17/682,890

(22) Filed: Feb. 28, 2022

(65) Prior Publication Data
US 2022/0321019 A1    Oct. 6, 2022

(30) Foreign Application Priority Data

Mar. 30, 2021 (JP) ................................ 2021-056534
Dec. 7, 2021 (JP) ................................ 2021-198515

(51) Int. Cl.
*H02M 3/335*    (2006.01)
*H02M 1/00*    (2007.01)

(52) U.S. Cl.
CPC ..... *H02M 3/33592* (2013.01); *H02M 1/0006* (2021.05); *H02M 3/33573* (2021.05); *H02M 1/0009* (2021.05)

(58) Field of Classification Search
CPC ...... B60L 58/20; B60L 2210/10; Y02T 10/70; H02M 1/36; H02M 3/335; H02M 1/0009;
(Continued)

(56) References Cited

U.S. PATENT DOCUMENTS 6,169,675 B1    1/2001  Shimamori et al.
6,392,463 B1    5/2002  Kitagawa et al.
(Continued)

FOREIGN PATENT DOCUMENTS

CN    206481220 U    9/2017
CN    108511822 A    9/2018
(Continued)

OTHER PUBLICATIONS

Machine translation CN-111342676-A.*
(Continued)

*Primary Examiner* — Thienvu V Tran
*Assistant Examiner* — Yahveh Comas Torres
(74) *Attorney, Agent, or Firm* — Oliff PLC

(57) ABSTRACT

A power conversion apparatus includes: a first power terminal; a switching circuit including a first switching device on a path coupling a first power node to a first node, a second switching device on a path coupling the first node to a second power node, a third switching device on a path coupling the first power node to a second node, and a fourth switching device on a path coupling the second node to the second power node; a transformer including a first winding coupled to the switching circuit and a second winding; a rectifier circuit; a second power terminal; and a controller that controls operations of the switching circuit and the rectifier circuit to supply power from the second power terminal toward the first power terminal during a predetermined period different from a period during which power is supplied from the first power terminal toward the second power terminal.

19 Claims, 47 Drawing Sheets

(58) Field of Classification Search
CPC .......... H02M 1/0006; H02M 3/33573; H02M 3/33592

See application file for complete search history.

(56) References Cited

U.S. PATENT DOCUMENTS

| | | | |
|---|---|---|---|
| 11,616,451 B2 * | 3/2023 | Liu | H02M 3/33592 363/17 |
| 2007/0139975 A1 | 6/2007 | Yamauchi et al. | |
| 2013/0038305 A1 * | 2/2013 | Arno | H02M 3/158 323/282 |
| 2017/0033696 A1 | 2/2017 | Handa et al. | |
| 2019/0027950 A1 | 1/2019 | Carrizales | |
| 2019/0068070 A1 * | 2/2019 | Iyasu | H02M 3/33576 |
| 2020/0006970 A1 * | 1/2020 | Chen | H02M 7/217 |
| 2021/0296993 A1 * | 9/2021 | Liu | B60L 58/20 |

FOREIGN PATENT DOCUMENTS

| | | | | |
|---|---|---|---|---|
| CN | 111342676 A | * | 6/2020 | ............ B60L 53/22 |
| CN | 212304771 U | | 1/2021 | |
| EP | 1 801 960 A2 | | 6/2007 | |
| EP | 1801960 B1 | * | 7/2011 | ............ B60L 58/20 |
| EP | 2908420 A1 | * | 8/2015 | ............ B60L 15/007 |
| JP | H11-136934 A | | 5/1999 | |
| JP | 2001-160748 A | | 6/2001 | |
| JP | 2007-174784 A | | 7/2007 | |
| JP | 2017-034862 A | | 2/2017 | |
| JP | 2017-034982 A | | 2/2017 | |
| JP | 2017-204925 A | | 11/2017 | |
| JP | 2018-023236 A | | 2/2018 | |
| JP | 2019-126231 A | | 7/2019 | |
| WO | WO-2020055669 A1 | * | 3/2020 | ............ H02M 1/0058 |

OTHER PUBLICATIONS

DC-DC Converter protection, Aug. 12, 2015, pp. 1-4 (Year: 2015).*

Aug. 12, 2022 Search Report Issued in European Application No. 22 162 995.9.

Escudero at al. "Modulation Scheme for the Bidirectional Operation of the Phase-Shift Full-Bridge Power Converter," in IEEE Transactions on Power Electronics, vol. 35, No. 2, pp. 1377-1391, Feb. 2020.

R. Piveta et al. "Circulating Current Mitigation in Dual Active Bridge Converter," 2015 IEEE 13th Brazilian Power Electronics Conference and 1st Southern Power Electronics Conference (COBEP/SPEC), 2015, pp. 1-6.

* cited by examiner

POWER CONVERSION APPARATUS AND POWER CONVERSION SYSTEM

CROSS-REFERENCE TO RELATED APPLICATIONS

The present application claims priority from Japanese Patent Application Nos. 2021-056534 filed on Mar. 30, 2021, and 2021-198515 filed on Dec. 7, 2021, the entire contents of each of which are incorporated herein by reference.

BACKGROUND

The technology relates to a power conversion apparatus and a power conversion system that each convert electric power.

Some of power conversion apparatuses that convert electric power of a primary battery and supply the converted electric power to a secondary battery perform a so-called pre-charge operation before performing the power conversion operation. The pre-charge operation is an operation of supplying electric power of the secondary battery to a primary capacitor via the power conversion apparatus. For example, Japanese Unexamined Patent Application Publication (JP-A) No. 2017-034862 discloses a technique including, in the pre-charge operation, detecting a current value of a secondary choke coil and controlling an operation of a secondary switching device on the basis of a result of the detection.

SUMMARY

A power conversion apparatus according to one embodiment of the technology includes a first power terminal, a switching circuit, a transformer, a rectifier circuit, a second power terminal, and a controller. The first power terminal includes a first coupling terminal and a second coupling terminal. The switching circuit includes a first switching device, a second switching device, a third switching device, and a fourth switching device. The first switching device is provided on a path coupling a first power node and a first node to each other, the first power node being led to the first coupling terminal. The second switching device is provided on a path coupling the first node and a second power node to each other, the second power node being led to the second coupling terminal. The third switching device is provided on a path coupling the first power node and a second node to each other. The fourth switching device is provided on a path coupling the second node and the second power node to each other. The transformer includes a first winding and a second winding. The first winding includes a first terminal coupled to the first node and a second terminal coupled to the second node. The rectifier circuit is coupled to the second winding and includes a plurality of switching devices. The second power terminal is led to the rectifier circuit. The controller is configured to control an operation of each of the first switching device, the second switching device, the third switching device, the fourth switching device, and the plurality of switching devices. The controller is configured to control, during a predetermined period, an operation of each of the switching circuit and the rectifier circuit to supply electric power from the second power terminal toward the first power terminal. The predetermined period is different from a period during which electric power is to be supplied from the first power terminal toward the second power terminal. The controller is configured to operate the switching circuit with a first duty ratio and operate the rectifier circuit with a second duty ratio during the predetermined period. The first duty ratio is greater than zero and less than or equal to the second duty ratio.

A power conversion system according to one embodiment of the technology includes a first battery, a capacitor, a first switch, a second switch, a power conversion apparatus, and a second battery. The first battery includes a first terminal and a second terminal. The capacitor includes a first terminal and a second terminal. The first switch is provided on a path coupling the first terminal of the first battery and the first terminal of the capacitor to each other. The second switch is provided on a path coupling the second terminal of the first battery and the second terminal of the capacitor to each other. The power conversion apparatus includes a first power terminal, a switching circuit, a transformer, a rectifier circuit, a second power terminal, and a controller. The first power terminal includes a first coupling terminal coupled to the first terminal of the capacitor, and a second coupling terminal coupled to the second terminal of the capacitor. The switching circuit includes a first switching device, a second switching device, a third switching device, and a fourth switching device. The first switching device is provided on a path coupling a first power node and a first node to each other, the first power node being led to the first coupling terminal. The second switching device is provided on a path coupling the first node and a second power node to each other, the second power node being led to the second coupling terminal. The third switching device is provided on a path coupling the first power node and a second node to each other. The fourth switching device is provided on a path coupling the second node and the second power node to each other. The transformer includes a first winding and a second winding. The first winding includes a first terminal coupled to the first node and a second terminal coupled to the second node. The rectifier circuit is coupled to the second winding and includes a plurality of switching devices. The second power terminal is led to the rectifier circuit and coupled to the second battery. The controller is configured to control an operation of each of the first switching device, the second switching device, the third switching device, the fourth switching device, and the plurality of switching devices. The controller is configured to control, during a predetermined period, an operation of each of the switching circuit and the rectifier circuit to supply electric power from the second power terminal toward the first power terminal. The predetermined period is different from a period during which electric power is to be supplied from the first power terminal toward the second power terminal. The controller is configured to operate the switching circuit with a first duty ratio and operate the rectifier circuit with a second duty ratio during the predetermined period. The first duty ratio is greater than zero and less than or equal to the second duty ratio.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

Figure 1:
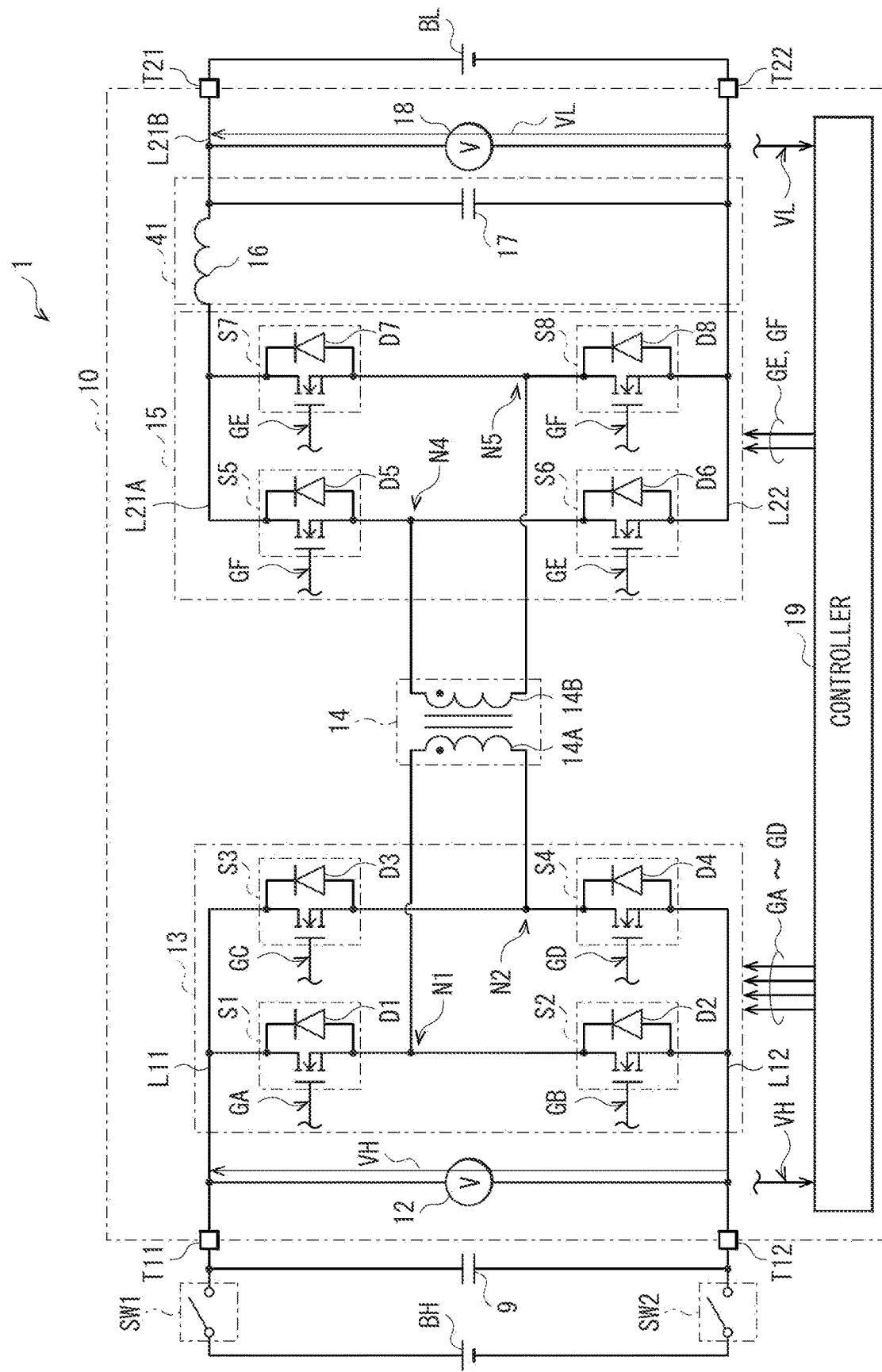
FIG. 1 is a circuit diagram illustrating a configuration example of a power conversion system according to one example embodiment of the technology.

It is generally desired that power conversion apparatuses be simple in configuration. A power conversion apparatus that performs a pre-charge operation is also expected to have a simple configuration with less additional components.

It is desirable to provide a power conversion apparatus and a power conversion system that are each able to perform a pre-charge operation with a simple configuration with less additional components.

In the following, some example embodiments of the technology are described in detail with reference to the accompanying drawings. Note that the following description is directed to illustrative examples of the disclosure and not to be construed as limiting the technology. Factors including, without limitation, numerical values, shapes, materials, components, positions of the components, and how the components are coupled to each other are illustrative only and not to be construed as limiting the technology. Further, elements in the following example embodiments which are not recited in a most-generic independent claim of the disclosure are optional and may be provided on an as-needed basis. The drawings are schematic and are not intended to be drawn to scale. Like elements are denoted with the same reference numerals to avoid redundant descriptions. Note that the description is given in the following order.

Example Embodiment

Configuration Example

FIG. 1 illustrates a configuration example of a power conversion system 1 including a power conversion apparatus according to an example embodiment of the technology. The power conversion system 1 includes a high-voltage battery BH, switches SW1 and SW2, a capacitor 9, a power conversion apparatus 10, and a low-voltage battery BL. The power conversion system 1 may be configured to convert electric power supplied from the high-voltage battery BH and supply the converted electric power to the low-voltage battery BL.

The high-voltage battery BH may be configured to store electric power. The high-voltage battery BH may be configured to supply the electric power to the power conversion apparatus 10 via the switches SW1 and SW2.

The switches SW1 and SW2 may be configured to supply the electric power stored in the high-voltage battery BH to the power conversion apparatus 10 by being turned on. The switches SW1 and SW2 may each include a relay, for example. The switch SW1 may couple a positive terminal of the high-voltage battery BH and a terminal T11 of the power conversion apparatus 10 to each other by being turned on. The switch SW2 may couple a negative terminal of the high-voltage battery BH and a terminal T12 of the power conversion apparatus 10 to each other by being turned on. The switches SW1 and SW2 may be configured to be turned on and off in accordance with instructions provided by a system controller (not illustrated).

One end of the capacitor 9 may be coupled to the terminal T11 of the power conversion apparatus 10 and to the switch SW1, and another end of the capacitor 9 may be coupled to the terminal T12 of the power conversion apparatus 10 and to the switch SW2.

The power conversion apparatus 10 may be configured to step down a voltage received from the high-voltage battery BH to thereby convert the electric power, and to supply the converted electric power to the low-voltage battery BL. The power conversion apparatus 10 may include the terminals T11 and T12, a voltage sensor 12, a switching circuit 13, a transformer 14, a rectifier circuit 15, a smoothing circuit 41, a voltage sensor 18, a controller 19, and terminals T21 and T22. Primary circuitry of the power conversion system 1 may include the high-voltage battery BH, the switches SW1 and SW2, the capacitor 9, the voltage sensor 12, and the switching circuit 13. Secondary circuitry of the power conversion system 1 may include the rectifier circuit 15, the smoothing circuit 41, the voltage sensor 18, and the low-voltage battery BL.

The terminals T11 and T12 may be configured to be supplied with a voltage from the high-voltage battery BH upon turning on of the switches SW1 and SW2. In the power conversion apparatus 10, the terminal T11 may be coupled to a voltage line L11, and the terminal T12 may be coupled to a reference voltage line L12.

The voltage sensor 12 may be configured to detect a voltage at the voltage line L11. One end of the voltage sensor 12 may be coupled to the voltage line L11, and another end of the voltage sensor 12 may be coupled to the reference voltage line L12. The voltage sensor 12 may detect, as a voltage VH, the voltage at the voltage line L11 relative to a voltage at the reference voltage line L12. Further, the voltage sensor 12 may be configured to supply a result of the detection of the voltage VH to the controller 19.

The switching circuit 13 may be configured to convert a DC voltage supplied from the high-voltage battery BH into an AC voltage. The switching circuit 13 may be a full-bridge circuit and may include transistors S1 to S4. The transistors S1 to S4 are switching devices that may perform switching operations on the basis of gate signals GA to GD, respectively. The transistors S1 to S4 may each be configured by an n-type field-effect transistor (FET), for example. The transistors S1 to S4 may include body diodes D1 to D4, respectively. For example, an anode of the body diode D1 may be coupled to a source of the transistor S1, and a cathode of the body diode D1 may be coupled to a drain of the transistor S1. The same applies to the body diodes D2 to D4. Note that while n-type FETs are used in this example, any switching devices may be chosen.

The transistor S1 is provided on a path coupling the voltage line L11 and a node N1 to each other. The transistor S1 may be configured to couple the node N1 to the voltage line L11 by being turned on. The drain of the transistor S1 may be coupled to the voltage line L11, a gate of the transistor S1 may be supplied with the gate signal GA, and the source of the transistor S1 may be coupled to the node N1. The transistor S2 is provided on a path coupling the node N1 and the reference voltage line L12 to each other. The transistor S2 may be configured to couple the node N1 to the reference voltage line L12 by being turned on. A drain of the transistor S2 may be coupled to the node N1, a gate of the transistor S2 may be supplied with the gate signal GB, and a source of the transistor S2 may be coupled to the reference voltage line L12. The node N1 may be a coupling point between the source of the transistor S1 and the drain of the transistor S2.

The transistor S3 is provided on a path coupling the voltage line L11 and a node N2 to each other. The transistor S3 may be configured to couple the node N2 to the voltage line L11 by being turned on. A drain of the transistor S3 may be coupled to the voltage line L11, a gate of the transistor S3 may be supplied with the gate signal GC, and a source of the transistor S3 may be coupled to the node N2. The transistor S4 is provided on a path coupling the node N2 and the reference voltage line L12 to each other. The transistor S4 may be configured to couple the node N2 to the reference voltage line L12 by being turned on. A drain of the transistor S4 may be coupled to the node N2, a gate of the transistor S4 may be supplied with the gate signal GD, and a source of the transistor S4 may be coupled to the reference voltage line L12. The node N2 may be a coupling point between the source of the transistor S3 and the drain of the transistor S4.

The transformer 14 may be configured to provide DC isolation and AC coupling between the primary circuitry and the secondary circuitry, and to convert an AC voltage supplied from the primary circuitry with a transformation ratio N of the transformer 14 to thereby supply the converted AC voltage to the secondary circuitry. The transformer 14 includes windings 14A and 14B. One end of the winding 14A is coupled to the node N1 in the switching circuit 13, and another end of the winding 14A is coupled to the node N2 in the switching circuit 13. One end of the winding 14B may be coupled to a node N4 (described later) in the rectifier circuit 15, and another end of the winding 14B may be coupled to a node N5 (described later) in the rectifier circuit 15.

The rectifier circuit 15 may be configured to rectify the AC voltage outputted from the winding 14B of the transformer 14 to thereby generate an output voltage. The rectifier circuit 15 may be a full-bridge circuit and may include transistors S5 to S8. The transistors S5 to S8 may each be configured to perform a switching operation on the basis of a gate signal GE or GF. The transistors S5 to S8 may each be configured, for example, by an n-type FET, like the transistors S1 to S4 of the switching circuit 13. The transistors S5 to S8 may include body diodes D5 to D8, respectively, like the transistors S1 to S4.

The transistor S5 may be provided on a path coupling a voltage line L21A and the node N4 to each other, and may be configured to couple the node N4 to the voltage line L21A by being turned on. A drain of the transistor S5 may be coupled to the voltage line L21A, a gate of the transistor S5 may be supplied with the gate signal GF, and a source of the transistor S5 may be coupled to the node N4. The transistor S6 may be provided on a path coupling the node N4 and the reference voltage line L22 to each other, and may be configured to couple the node N4 to the reference voltage line L22 by being turned on. A drain of the transistor S6 may be coupled to the node N4, a gate of the transistor S6 may be supplied with the gate signal GE, and a source of the transistor S6 may be coupled to the reference voltage line L22. The node N4 may be a coupling point between the source of the transistor S5 and the drain of the transistor S6.

The transistor S7 may be provided on a path coupling the voltage line L21A and the node N5 to each other, and may be configured to couple the node N5 to the voltage line L21A by being turned on. A drain of the transistor S7 may be coupled to the voltage line L21A, a gate of the transistor S7 may be supplied with the gate signal GE, and a source of the transistor S7 may be coupled to the node N5. The transistor S8 may be provided on a path coupling the node N5 and the reference voltage line L22 to each other, and may be configured to couple the node N5 to the reference voltage line L22 by being turned on. A drain of the transistor S8 may be coupled to the node N5, a gate of the transistor S8 may be supplied with the gate signal GF, and a source of the transistor S8 may be coupled to the reference voltage line L22. The node N5 may be a coupling point between the source of the transistor S7 and the drain of the transistor S8.

The smoothing circuit 41 may be configured to smooth the output voltage of the rectifier circuit 15. The smoothing circuit 41 may include a choke inductor 16 and a capacitor 17. One end of the choke inductor 16 may be coupled to the voltage line L21A, and another end of the choke inductor 16 may be coupled to a voltage line L21B. One end of the capacitor 17 may be coupled to the voltage line L21B, and another end of the capacitor 17 may be coupled to the reference voltage line L22. Note that although the choke inductor 16 is provided on the voltage lines L21A and L21B in this example, this is non-limiting. Alternatively, for example, the choke inductor 16 may be provided on the reference voltage line L22.

The voltage sensor 18 may be configured to detect a voltage at the voltage line L21B. One end of the voltage sensor 18 may be coupled to the voltage line L21B, and another end of the voltage sensor 18 may be coupled to the reference voltage line L22. The voltage sensor 18 may detect, as a voltage VL, the voltage at the voltage line L21B relative to a voltage at the reference voltage line L22. Further, the voltage sensor 18 may be configured to supply a result of the detection of the voltage VL to the controller 19.

The controller 19 may be configured to control an operation of the power conversion apparatus 10 by controlling operations of the switching circuit 13 and the rectifier circuit 15 on the basis of the voltage VH detected by the voltage sensor 12 and the voltage VL detected by the voltage sensor 18. In a specific but non-limiting example, the controller 19 may be configured to control the operation of the power conversion apparatus 10 by generating the gate signals GA to GF on the basis of the voltages VH and VL and performing pulse width modulation (PWM) control through the use of the gate signals GA to GF.

The terminals T21 and T22 may be configured to supply a voltage generated by the power conversion apparatus 10 to the low-voltage battery BL. In the power conversion apparatus 10, the terminal T21 may be coupled to the voltage line L21B, and the terminal T22 may be coupled to the reference voltage line L22. Further, the terminal T21 may be coupled to a positive terminal of the low-voltage battery BL, and the terminal T22 may be coupled to a negative terminal of the low-voltage battery BL.

The low-voltage battery BL may be configured to store electric power supplied from the power conversion apparatus 10.

With this configuration, the power conversion system 1 may perform a power conversion operation of converting electric power supplied from the high-voltage battery BH and supplying the converted electric power to the low-voltage battery BL.

Further, the power conversion system 1 may also have a function of performing a so-called pre-charge operation, that is, an operation of charging the capacitor 9 during a preparation period (a pre-charge period P1) before starting the power conversion operation described above. During the pre-charge operation, the switches SW1 and SW2 are in an OFF state and the controller 19 controls the operations of the switching circuit 13 and the rectifier circuit 15 to thereby allow the power conversion system 1 to supply the electric power of the low-voltage battery BL to the capacitor 9. This makes it possible for the power conversion apparatus 10 to reduce an inrush current flowing from the high-voltage battery BH to the capacitor 9 upon turning on the switches SW1 and SW2 in order to perform the power conversion operation.

Figure 2:
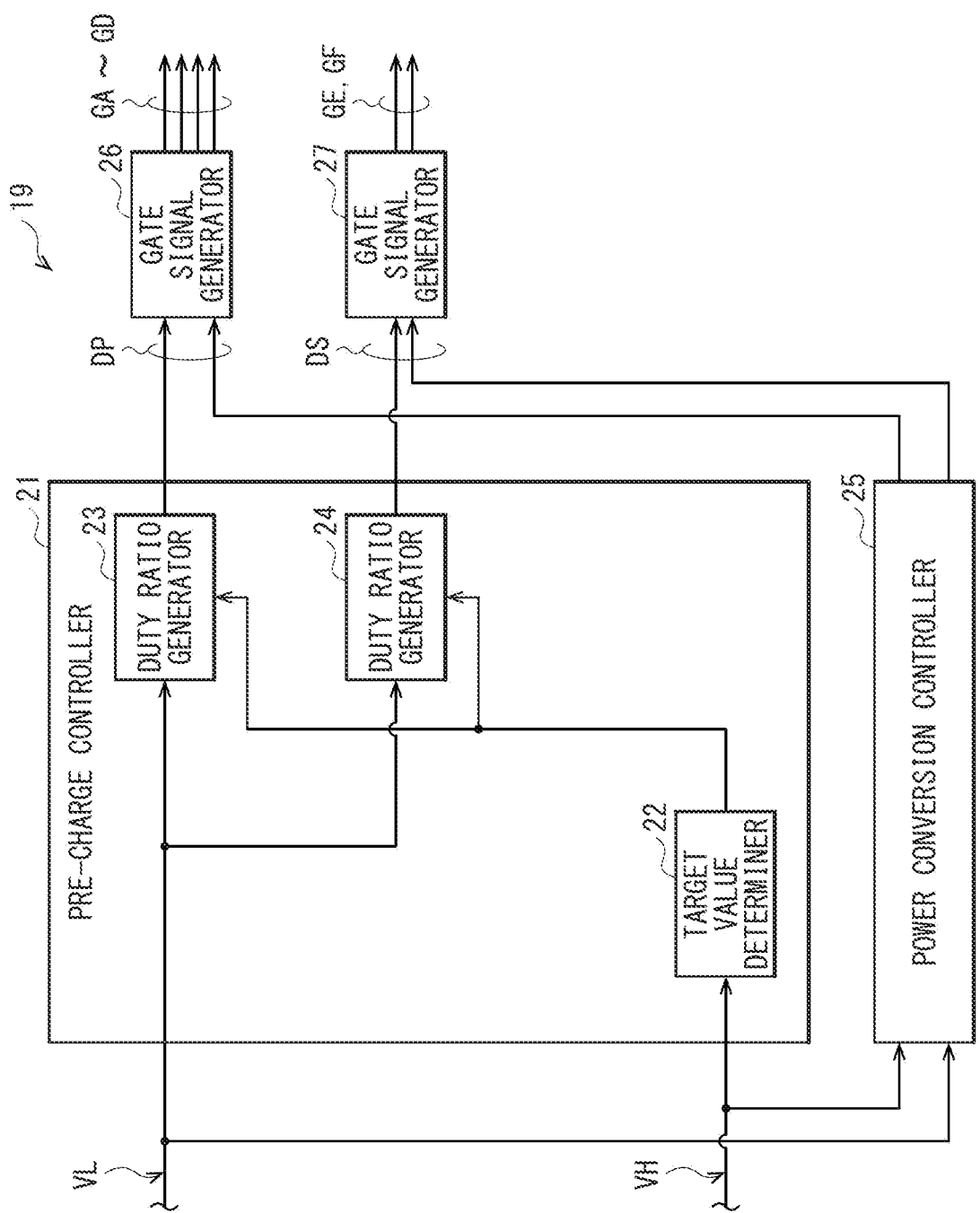
FIG. 2 is a block diagram illustrating a configuration example of a controller illustrated in FIG. 1.

FIG. 2 illustrates a configuration example of the controller 19. The controller 19 may include a pre-charge controller 21, a power conversion controller 25, and gate signal generators 26 and 27.

The pre-charge controller 21 may be configured to generate a duty ratio DP of a switching operation of the switching circuit 13 and a duty ratio DS of a switching operation of the rectifier circuit 15 on the basis of the voltages VH and VL during the pre-charge period P1. The pre-charge controller 21 may include a target value determiner 22 and duty ratio generators 23 and 24.

The target value determiner 22 may be configured to determine, during the pre-charge period P1, whether the voltage VH exceeds a target voltage VH_target. Further, the target value determiner 22 may supply a result of the determination to the duty ratio generators 23 and 24.

The duty ratio generator 23 may be configured to generate the duty ratio DP of the switching circuit 13 on the basis of the voltage VL during the pre-charge period P1. In a specific but non-limiting example, the duty ratio generator 23 may generate the duty ratio DP in such a manner that the higher the voltage VL, the lower the duty ratio DP. It is possible for the duty ratio generator 23 to generate the duty ratio DP on the basis of the voltage VL in accordance with, for example, an equation such as: "DP=X1/VL", where "X1" is any constant. Alternatively, the duty ratio generator 23 may use, for example, table data indicating a relationship between the duty ratio DP and the voltage VL to thereby generate the duty ratio DP on the basis of the voltage VL. The duty ratio generator 23 may generate the duty ratio DP in a manner to cause the duty ratio DP to gradually increase during the pre-charge period P1. This makes it possible to reduce a current stress in circuitry in the power conversion system 1. In a case where the target value determiner 22 determines that the voltage VH exceeds the target voltage VH_target, the duty ratio generator 23 may determine that the pre-charge period P1 has ended, and may thus end the generation of the duty ratio DP.

The duty ratio generator 24 may be configured to generate the duty ratio DS of the rectifier circuit 15 on the basis of the voltage VL during the pre-charge period P1. In a specific but non-limiting example, the duty ratio generator 24 may generate the duty ratio DS in such a manner that the higher the voltage VL, the lower the duty ratio DS. It is possible for the duty ratio generator 24 to generate the duty ratio DS on the basis of the voltage VL in accordance with, for example, an equation such as: "DS=X2/VL", where "X2" is any constant. Further, the duty ratio generator 24 may use, for example, table data indicating a relationship between the duty ratio D S and the voltage VL to thereby generate the duty ratio DS on the basis of the voltage VL. The duty ratio generator 24 may generate the duty ratio DS in a manner to cause the duty ratio DS to gradually increase during the pre-charge period P1. This makes it possible to reduce a current stress in circuitry in the power conversion system 1. In a case where the target value determiner 22 determines that the voltage VH exceeds the target voltage VH_target, the duty ratio generator 24 may determine that the pre-charge period P1 has ended, and may end the generation of the duty ratio DS.

In generating the duty ratios DP and DS, the duty ratio generators 23 and 24 may generate the duty ratios DP and DS to satisfy the following equations EQ1 and EQ2.

$$0 < DS \leq 0.5 \tag{EQ1}$$

$$0 < DP \leq DS \tag{EQ2}$$

In other words, the duty ratio DS of the rectifier circuit 15 may be controlled to be greater than zero and less than or equal to 0.5. Further, the duty ratio DP of the switching circuit 13 is controlled to be greater than zero and less than or equal to the duty ratio DS of the rectifier circuit 15. The duty ratio generators 23 and 24 may generate such duty ratios DP and DS.

The power conversion controller 25 may be configured to generate the duty ratio DP of the switching operation of the switching circuit 13 and the duty ratio DS of the switching operation of the rectifier circuit 15 on the basis of the voltages VH and VL during a period during which the power conversion operation is to be performed (a power conversion period P2).

The gate signal generator 26 may be configured to generate the gate signals GA to GD on the basis of the duty ratios DP generated by the duty ratio generator 23 and the power conversion controller 25. In a specific but non-limiting example, during the pre-charge period P1, the gate signal generator 26 may generate the gate signal s GC and GD on the basis of the duty ratio DP generated by the duty ratio generator 23 and maintain the gate signals GA and GB at a low level. Further, during the power conversion period P2, the gate signal generator 26 may generate the gate signals GA to GD on the basis of the duty ratio DP generated by the power conversion controller 25.

The gate signal generator 27 may be configured to generate the gate signals GE and GF on the basis of data on the duty ratios DS supplied from the duty ratio generator 24 and the power conversion controller 25. In a specific but non-limiting example, during the pre-charge period P1, the gate signal generator 27 may generate the gate signals GE and GF on the basis of the duty ratio DS generated by the duty ratio generator 23. Further, during the power conversion period P2, the gate signal generator 27 may generate the gate signals GE and GF on the basis of the duty ratio DS generated by the power conversion controller 25.

The terminals T11 and T12 may correspond to a specific but non-limiting example of a "first power terminal" in one embodiment of the technology. The terminal T11 may correspond to a specific but non-limiting example of a "first coupling terminal" in one embodiment of the technology. The terminal T12 may correspond to a specific but non-limiting example of a "second coupling terminal" in one embodiment of the technology. The switching circuit 13 may correspond to a specific but non-limiting example of a "switching circuit" in one embodiment of the technology. The voltage line L11 may correspond to a specific but non-limiting example of a "first power node" in one embodiment of the technology. The reference voltage line L12 may correspond to a specific but non-limiting example of a "second power node" in one embodiment of the technology. The node N1 may correspond to a specific but non-limiting example of a "first node" in one embodiment of the technology. The node N2 may correspond to a specific but non-limiting example of a "second node" in one embodiment of the technology. The transistor S1 may correspond to a specific but non-limiting example of a "first switching device" in one embodiment of the technology. The transistor S2 may correspond to a specific but non-limiting example of a "second switching device" in one embodiment of the technology. The transistor S3 may correspond to a specific but non-limiting example of a "third switching device" in one embodiment of the technology. The transistor S4 may correspond to a specific but non-limiting example of a "fourth switching device" in one embodiment of the technology. The transformer 14 may correspond to a specific but non-limiting example of a "transformer" in one embodiment of the technology. The winding 14A may correspond to a specific but non-limiting example of a "first winding" in one embodiment of the technology. The winding 14B may correspond to a specific but non-limiting example of a "second winding" in one embodiment of the technology. The rectifier circuit 15 may correspond to a specific but non-limiting example of a "rectifier circuit" in one embodiment of the technology. The voltage line L21A may correspond to a specific but non-limiting example of a "third power node" in one embodiment of the technology. The reference voltage line L22 may correspond to a specific but non-limiting example of a "fourth power node" in one embodiment of the technology. The node N4 may correspond to a specific but non-limiting example of a "fourth node" in one embodiment of the technology. The node N5 may correspond to a specific but non-limiting example of a "fifth node" in one embodiment of the technology. The transistor S5 may correspond to a specific but non-limiting example of a "fifth switching device" in one embodiment of the technology. The transistor S6 may correspond to a specific but non-limiting example of a "sixth switching device" in one embodiment of the technology. The transistor S7 may correspond to a specific but non-limiting example of a "seventh switching device" in one embodiment of the technology. The transistor S8 may correspond to a specific but non-limiting example of an "eighth switching device" in one embodiment of the technology. The terminals T21 and T22 may correspond to a specific but non-limiting example of a "second power terminal" in one embodiment of the technology. The terminal T21 may correspond to a specific but non-limiting example of a "third coupling terminal" in one embodiment of the technology. The terminal T22 may correspond to a specific but non-limiting example of a "fourth coupling terminal" in one embodiment of the technology. The controller 19 may correspond to a specific but non-limiting example of a "controller" in one embodiment of the technology. The duty ratio DP may correspond to a specific but non-limiting example of a "first duty ratio" in one embodiment of the technology. The duty ratio DS may correspond to a specific but non-limiting example of a "second duty ratio" in one embodiment of the technology. The pre-charge period P1 may correspond to a specific but non-limiting example of a "predetermined period" in one embodiment of the technology.

Example Workings and Effects

Example workings and effects of the power conversion system 1 according to the present example embodiment will now be described.

Outline of Overall Operation

First, an outline of an overall operation of the power conversion system 1 will be described with reference to FIGS. 1 and 2. During the pre-charge period P1, the switches SW1 and SW2 may be in an OFF state, and the controller 19 may generate the gate signals GC to GF on the basis of the voltages VH and VL and maintain the gate signals GA and GB at the low level. This causes the switching circuit 13 and the rectifier circuit 15 to operate, and causes the power conversion apparatus 10 to supply electric power of the low-voltage battery BL to the capacitor 9. As a result, the capacitor 9 is charged and the voltage VH thus increases. Once the voltage VH exceeds the target voltage VH_target, the pre-charge operation may end. The switches SW1 and SW2 may then be turned on and the controller 19 may generate the gate signals GA to GF on the basis of the voltages VH and VL. This causes the power conversion apparatus 10 to convert electric power supplied from the high-voltage battery BH and to supply the converted electric power to the low-voltage battery BL.

Details of Operation

Figure 3:
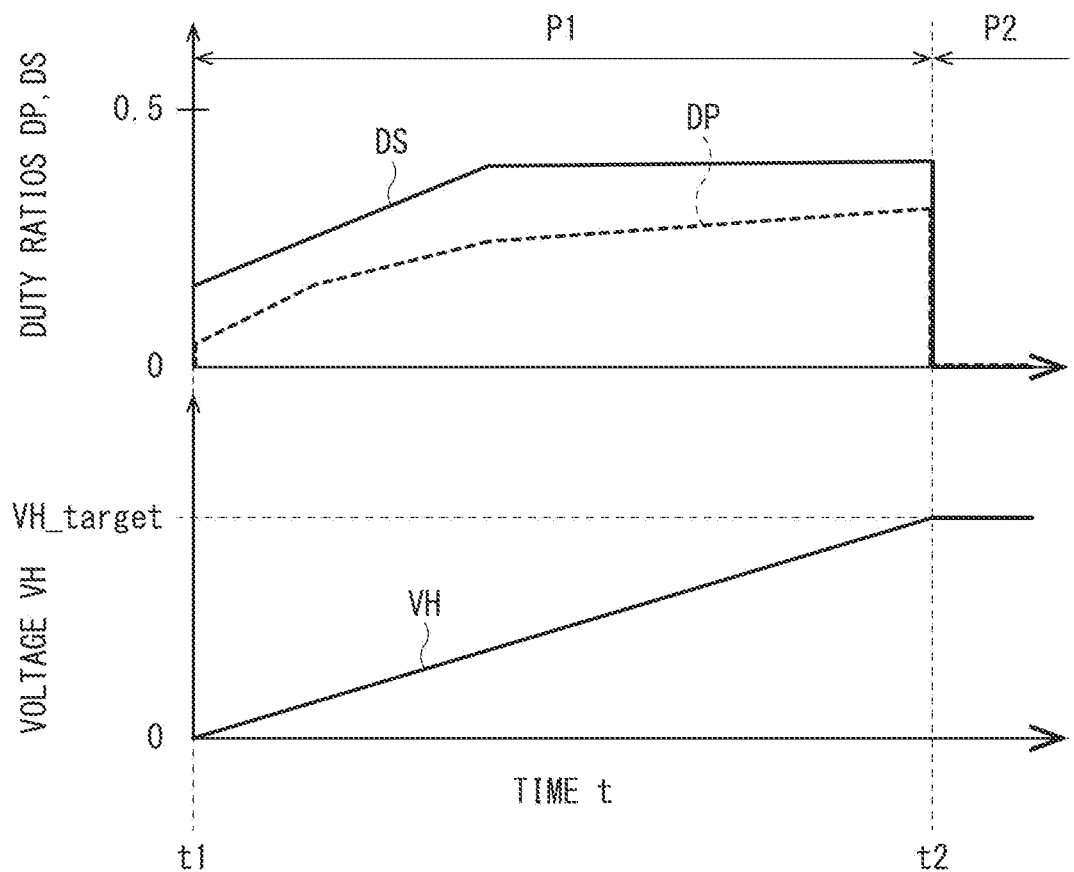
FIG. 3 is a timing chart illustrating an operation example of the power conversion system illustrated in FIG. 1.

FIG. 3 illustrates an example of the pre-charge operation. In this example, the pre-charge controller 21 may generate the duty ratios DP and DS in a manner to cause the duty ratios DP and DS to gradually increase during a period from a timing t1 to a timing t2 (the pre-charge period P1). The pre-charge controller 21 may generate the duty ratios DP and DS in a manner to cause the duty ratio DS to be greater than zero and less than or equal to 0.5 as represented by Equation EQ1 and to cause the duty ratio DP to be greater than zero and less than or equal to the duty ratio DS as represented by Equation EQ2. The gate signal generator 26 may generate the gate signals GC and GD on the basis of the duty ratio DP and maintain the gate signals GA and GB at the low level. The switching circuit 13 may perform the switching operation on the basis of the gate signals GA to GD. The gate signal generator 27 may generate the gate signals GE and GF on the basis of the duty ratio DS. The rectifier circuit 15 may perform the switching operation on the basis of the gate signals GE and GF. As a result, from the timing t1 at which the pre-charge period P1 starts onward, the voltage VH at the capacitor 9 gradually increases.

Figure 4:
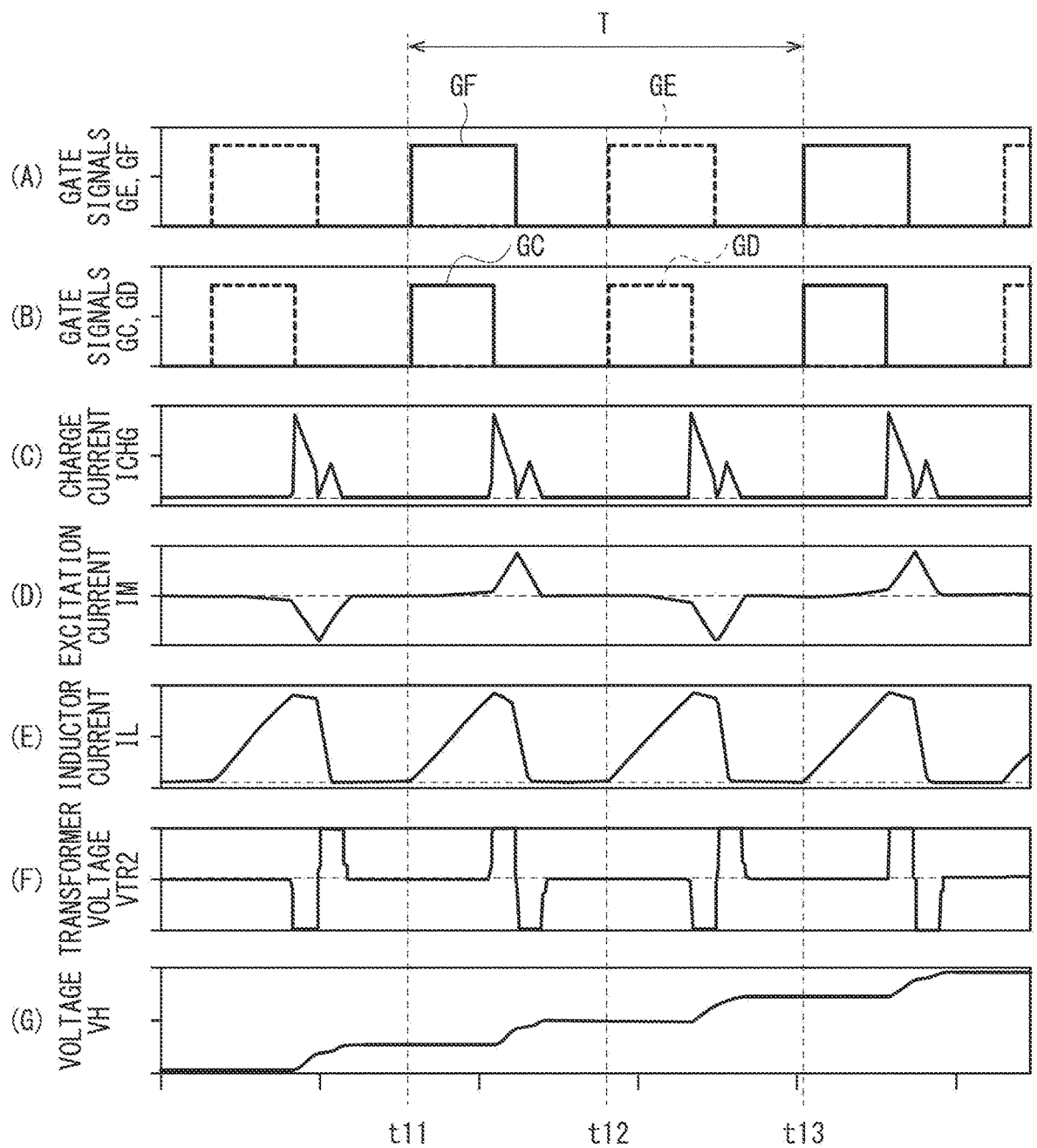
FIG. 4 is a timing waveform chart illustrating an operation example of the power conversion system illustrated in FIG. 1.

FIG. 4 illustrates a simulation waveform example of the pre-charge operation. Part (A) of FIG. 4 illustrates waveforms of the gate signals GE and GF. Part (B) of FIG. 4 illustrates waveforms of the gate signals GC and GD. Part (C) of FIG. 4 illustrates a waveform of a charge current ICHG, i.e., a current flowing into the capacitor 9. Part (D) of FIG. 4 illustrates a waveform of an excitation current IM of the transformer 14. Part (E) of FIG. 4 illustrates a waveform of an inductor current IL, i.e., a current flowing from the voltage line L21B to the voltage line L21A in the choke inductor 16. Part (F) of FIG. 4 illustrates a waveform of a transformer voltage VTR2, i.e., a voltage of the winding 14B of the transformer 14 at the node N4 relative to that at the node N5. Part (G) of FIG. 4 illustrates a waveform of the voltage VH. In FIG. 4, T represents a period of the switching operation.

In the pre-charge operation, the controller 19 may generate the gate signals GC and GD on the basis of the duty ratio DP, and may generate the gate signals GE and GF on the basis of the duty ratio DS. The duty ratio DP represents a pulse width of each of the gate signals GC and GD in a case where the period T (a duration from a timing t11 to a timing t13) is taken as "1". The duty ratio DS represents a pulse width of each of the gate signals GE and GF in the case where the period T is taken as "1". As illustrated in parts (A) and (B) of FIG. 4, the controller 19 may change the gate signals GC and GF from a low level to a high level at the timing t11. Further, the controller 19 may change the gate signal GC from the high level to the low level at a timing at which a time corresponding to the duty ratio DP (duty ratio DP×period T) has elapsed from the timing t11, and may change the gate signal GF from the high level to the low level at a timing at which a time corresponding to the duty ratio DS (duty ratio DS×period T) has elapsed from the timing t11. Next, the controller 19 may change the gate signals GD and GE from the low level to the high level at a timing t12. Further, the controller 19 may change the gate signal GD from the high level to the low level at a timing at which the time corresponding to the duty ratio DP (duty ratio DP×period T) has elapsed from the timing t12, and may change the gate signal GE from the high level to the low level at a timing at which the time corresponding to the duty ratio DS (duty ratio DS×period T) has elapsed from the timing t12. Although not illustrated, the controller 19 may maintain the gate signals GA and GB at the low level. Note that in the power conversion system 1, the capacitor 9 may be charged by repeating the operations performed from the timing t11 to the timing t13 while changing the duty ratios DP and DS. This causes the voltage VH to gradually increase as illustrated in part (G) of FIG. 4.

A detailed description will be given below of operations based on the gate signals GC and GF during a period from the timing t11 to the timing t12 by way of example. Note that the same applies to operations based on the gate signals GD and GE during a period from the timing t12 to the timing t13.

Figure 5:
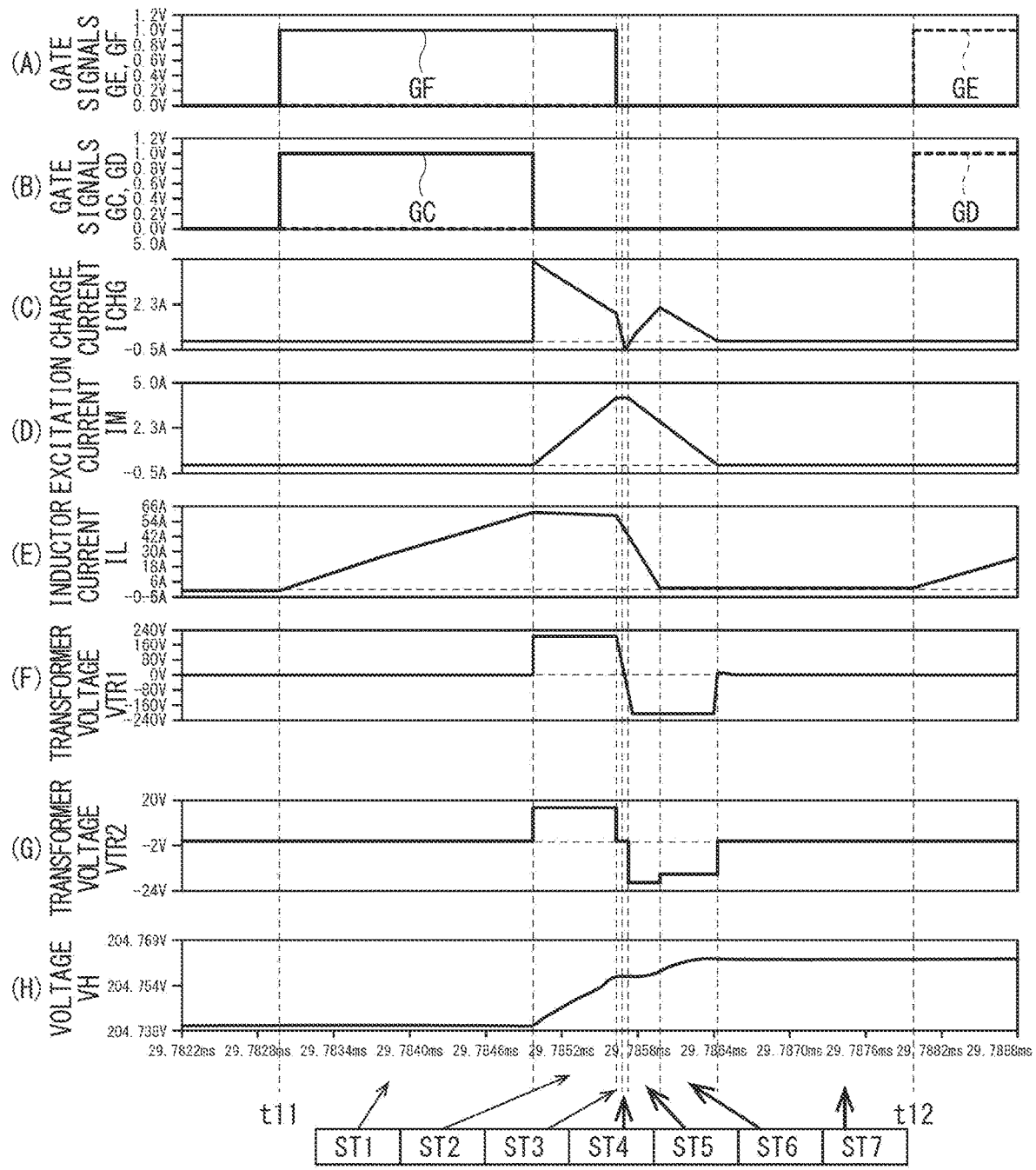
FIG. 5 is another timing waveform chart illustrating an operation example of the power conversion system illustrated in FIG. 1.
Figure 6:
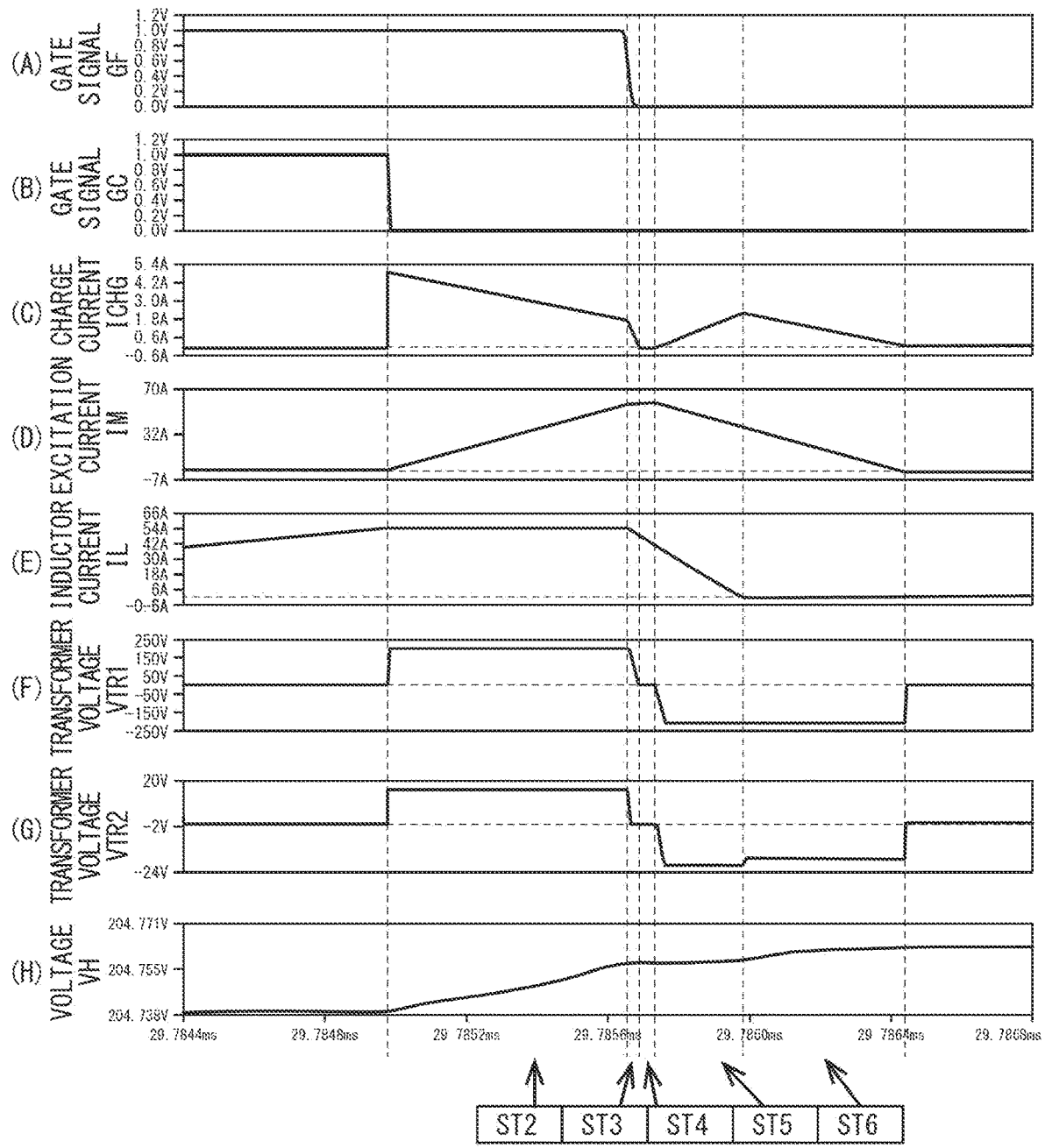
FIG. 6 is another timing waveform chart illustrating an operation example of the power conversion system illustrated in FIG. 1.

FIGS. 5 and 6 illustrate the operations during the period from the timing t11 to the timing t12 in more detail. In each of FIGS. 5 and 6, part (A) illustrates the waveforms of the gate signals GE and GF; part (B) illustrates the waveforms of the gate signals GC and GD; part (C) illustrates the waveform of the charge current ICHG, i.e., a current flowing into the capacitor 9; part (D) illustrates the waveform of the excitation current IM of the transformer 14; part (E) illustrates the waveform of the inductor current IL, i.e., a current flowing from the voltage line L21B to the voltage line L21A in the choke inductor 16; part (F) illustrates a waveform of a transformer voltage VTR1, i.e., a voltage of the winding 14A of the transformer 14 at the node N1 relative to that at the node N2; part (G) illustrates the waveform of the transformer voltage VTR2, i.e., a voltage of the winding 14B of the transformer 14 at the node N4 relative to that at the node N5; and part (H) illustrates the waveform of the voltage VH. As illustrated in FIG. 5, the power conversion system 1 can take seven operation states ST1 to ST7 during the period from the timing t11 to the timing t12. The operation states ST of the power conversion system 1 may change in the order of the operation state ST1, the operation state ST2, the operation state ST3, . . . , and the operation state ST7. The operation states ST3 and ST4 are operation states over very small time periods. FIG. 6 illustrates the operations during the periods corresponding to the operation states ST3 and ST4 and periods therearound in an enlarged manner.

FIGS. 7A to 7G illustrate the operations of the power conversion system 1 in the seven operation states ST1 to ST7. For convenience in description, the power conversion system 1 is depicted in a more simplified manner in FIGS. 7A to 7G.

Figure 7A:
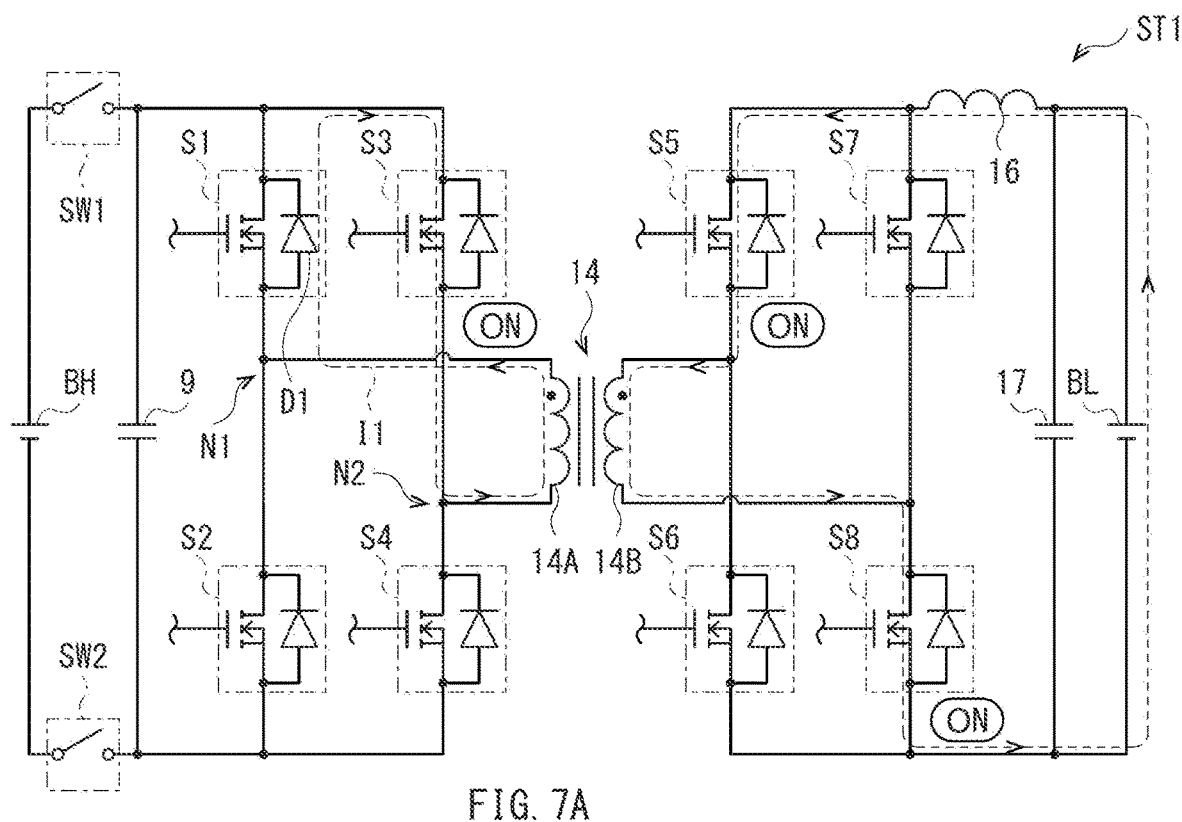
FIG. 7A is an explanatory diagram illustrating an operation state of the power conversion system illustrated in FIG. 1.

In the operation state ST1, the controller 19 may set the gate signals GC and GF at the high level and set the gate signals GA, GB, GD, and GE at the low level (parts (A) and (B) of FIG. 5). This turns on the transistors S3, S5, and S8 and turns off the transistors S1, S2, S4, S6, and S7 (FIG. 7A). In the secondary circuitry, a current I2 flows through the positive terminal of the low-voltage battery BL, the choke inductor 16, the transistor S5 in the ON state, the winding 14B, the transistor S8 in the ON state, and the negative terminal of the low-voltage battery BL in this order, and energy is stored in the choke inductor 16. In the primary circuitry, the body diode D1 of the transistor S1 is turned on to allow a current I1 to flow through the one end of the winding 14A, i.e., the node N1, the body diode D1 of the transistor S1, the transistor S3 in the ON state, and the other end of the winding 14A, i.e., the node N2 in this order, and energy is stored in a leakage inductor LLK of the transformer 14. At this time, the primary circuitry is in a substantially short-circuited state as viewed from the secondary circuitry. The transformer voltages VTR1 and VTR2 are therefore substantially 0 V (parts (F) and (G) of FIG. 5).

Figure 7B:
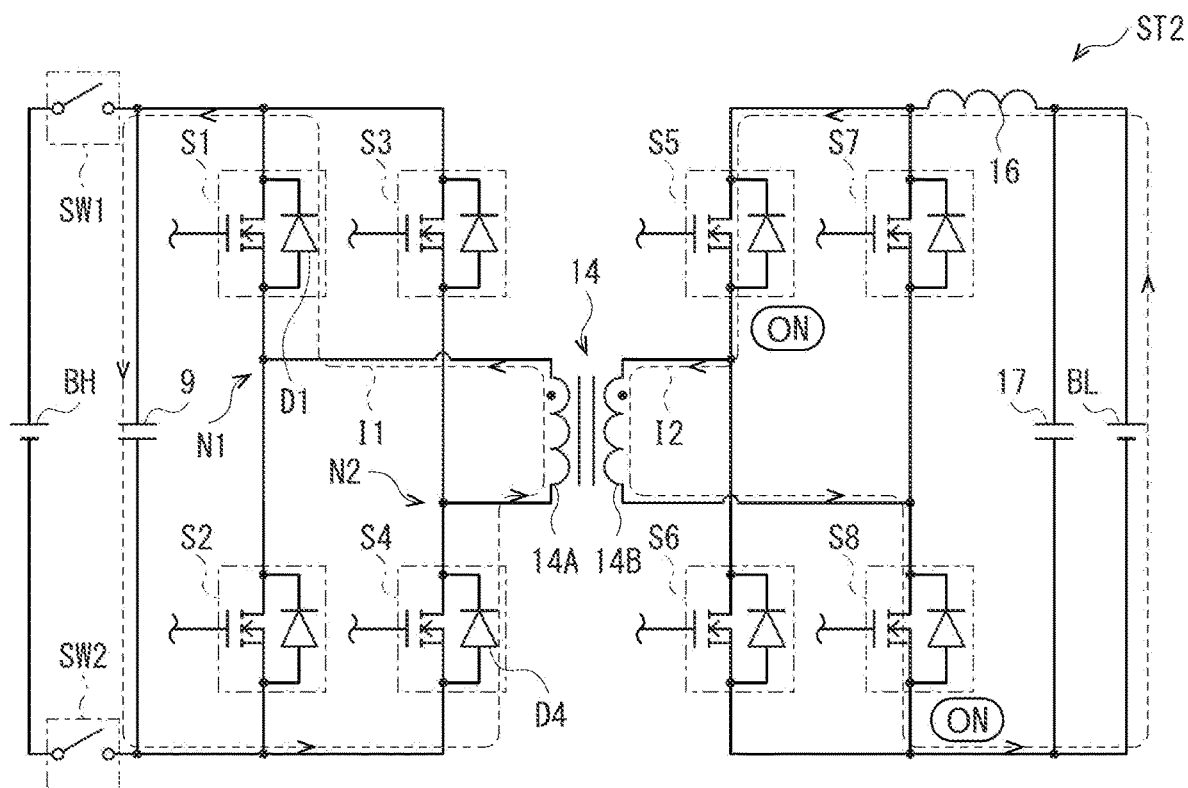
FIG. 7B is an explanatory diagram illustrating another operation state of the power conversion system illustrated in FIG. 1.

In the next operation state ST2, the controller 19 may change the gate signal GC from the high level to the low level (part (B) of FIG. 5). This changes the transistor S3 from the ON state to the OFF state (FIG. 7B). In the primary circuitry, the body diode D4 of the transistor S4 is turned on to allow the current I1 to flow through the one end of the winding 14A, i.e., the node N1, the body diode D1 of the transistor S1, the capacitor 9, the body diode D4 of the transistor S4, and the other end of the winding 14A, i.e., the node N2 in this order, and the charge current ICHG thus flows (part (C) of FIG. 5). In other words, the energy stored in the leakage inductor LLK of the transformer 14 is released and stored in the capacitor 9. In this way, the voltage VH increases (part (H) of FIG. 5). In the secondary circuitry, the transformer voltage VTR2 becomes a positive voltage (part (G) of FIG. 5), and the excitation current IM starts to flow through the transformer 14 (part (D) of FIG. 5). In a case where the voltage VH has not yet sufficiently increased and the following equation EQ3 is satisfied, the power conversion system 1 may perform a step-down operation. In a case where the voltage VH has sufficiently increased and the following equation EQ4 is satisfied, the power conversion system 1 may perform a step-up operation.

$$VH < N \times VL \qquad (EQ3)$$

$$VH \geq N \times VL \qquad (EQ4)$$

Here, N represents the transformation ratio of the transformer 14, and is expressible by the following equation EQ5 using the number of turns Np of the winding 14A which is the primary winding of the transformer 14, and the number of turns Ns of the winding 14B which is the secondary winding of the transformer 14.

$$N = Np/Ns \qquad (EQ5)$$

In the operation state ST2, in a case where the power conversion system 1 performs the step-down operation, the inductor current IL increases with a positive slope over time, whereas in a case where the power conversion system 1 performs the step-up operation, the inductor current IL decreases with a negative slope over time. In the present case, the power conversion system 1 is performing the step-up operation and therefore the inductor current IL decreases (part (E) of FIG. 5).

Figure 7C:
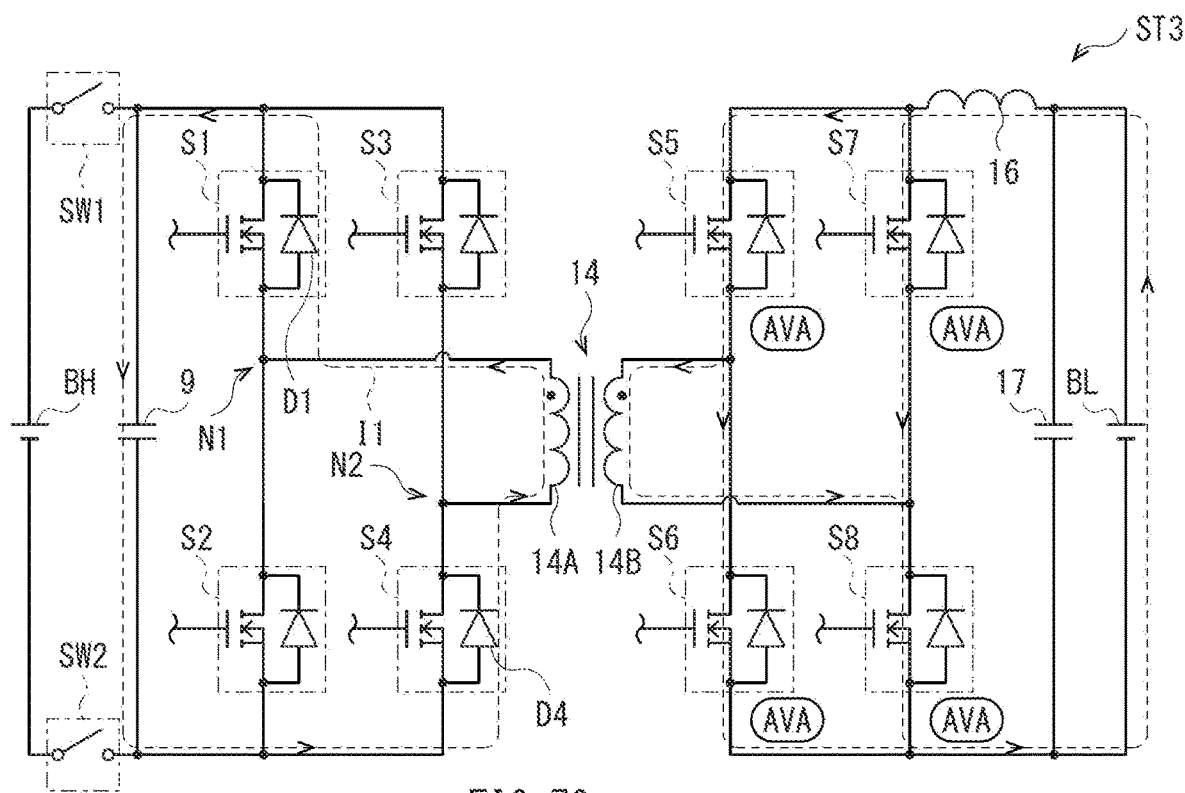
FIG. 7C is an explanatory diagram illustrating another operation state of the power conversion system illustrated in FIG. 1.

In the next operation state ST3 over a very small time period, the controller 19 may change the gate signal GF from the high level to the low level (part (A) of each of FIGS. 5 and 6). This changes the transistors S5 and S8 from the ON state to the OFF state (FIG. 7C). In the secondary circuitry, a counter-electromotive voltage occurs in the choke inductor 16 and a drain-to-source voltage of each of the transistors S5 to S8 increases to reach an avalanche breakdown voltage. As a result, an avalanche current flows through each of the transistors S5 to S8, bringing each of the transistors S5 to S8 into an avalanche breakdown state AVA. Then, the energy stored in the choke inductor 16 is released, and the inductor current IL decreases (part (E) of each of FIGS. 5 and 6). In this way, due to each of the transistors S5 to S8 coming into the avalanche breakdown state AVA, the transformer voltage VTR2 becomes substantially 0 V (part (G) of each of FIGS. 5 and 6). In the primary circuitry, continuing from the previous operation state ST2, the current I1 flows through the one end of the winding 14A, i.e., the node N1, the body diode D1 of the transistor S1, the capacitor 9, the body diode D4 of the transistor S4, and the other end of the winding 14A, i.e., the node N2 in this order. A counter-electromotive voltage of the leakage inductor LLK of the transformer 14 appears in the transformer voltage VTR1.

Figure 7D:
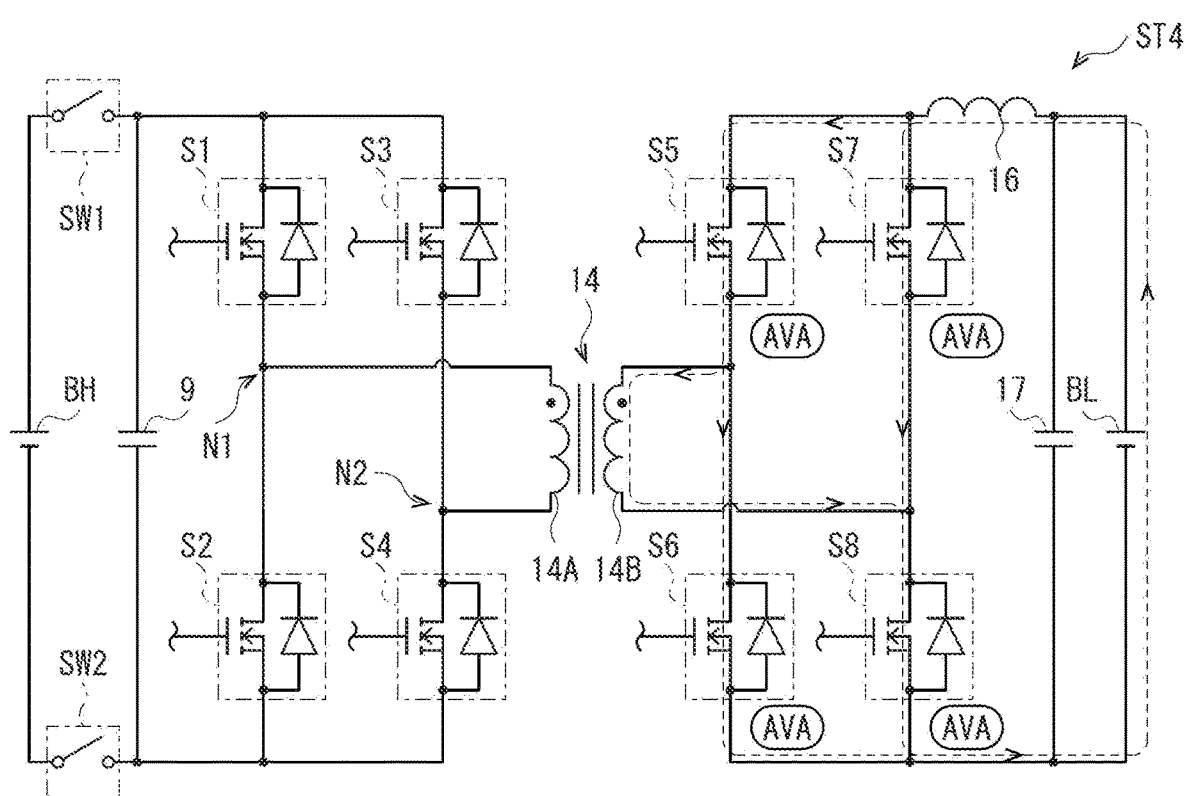
FIG. 7D is an explanatory diagram illustrating another operation state of the power conversion system illustrated in FIG. 1.

In the next operation state ST4 over a very small time period, in the primary circuitry, the release of the energy stored in the leakage inductor LLK of the transformer 14 ends, and the body diode D1 of the transistor S1 and the body diode D4 of the transistor S4 are turned off (FIG. 7D). Thus, in the primary circuitry, no current flows through the switching circuit 13 and therefore the charge current ICHG becomes 0 A (part (C) of each of FIGS. 5 and 6). In the secondary circuitry, the transistors S5 to S8 each remain in the avalanche breakdown state AVA. The avalanche current flowing through the transistor S5 exceeds the avalanche current flowing through the transistor S6 by the excitation current IM. Likewise, the avalanche current flowing through the transistor S8 exceeds the avalanche current flowing through the transistor S7 by the excitation current IM. Therefore, the avalanche current flowing through each of the transistors S6 and S7 approaches 0 A faster than the avalanche current flowing through each of the transistors S5 and S8.

Figure 7E:
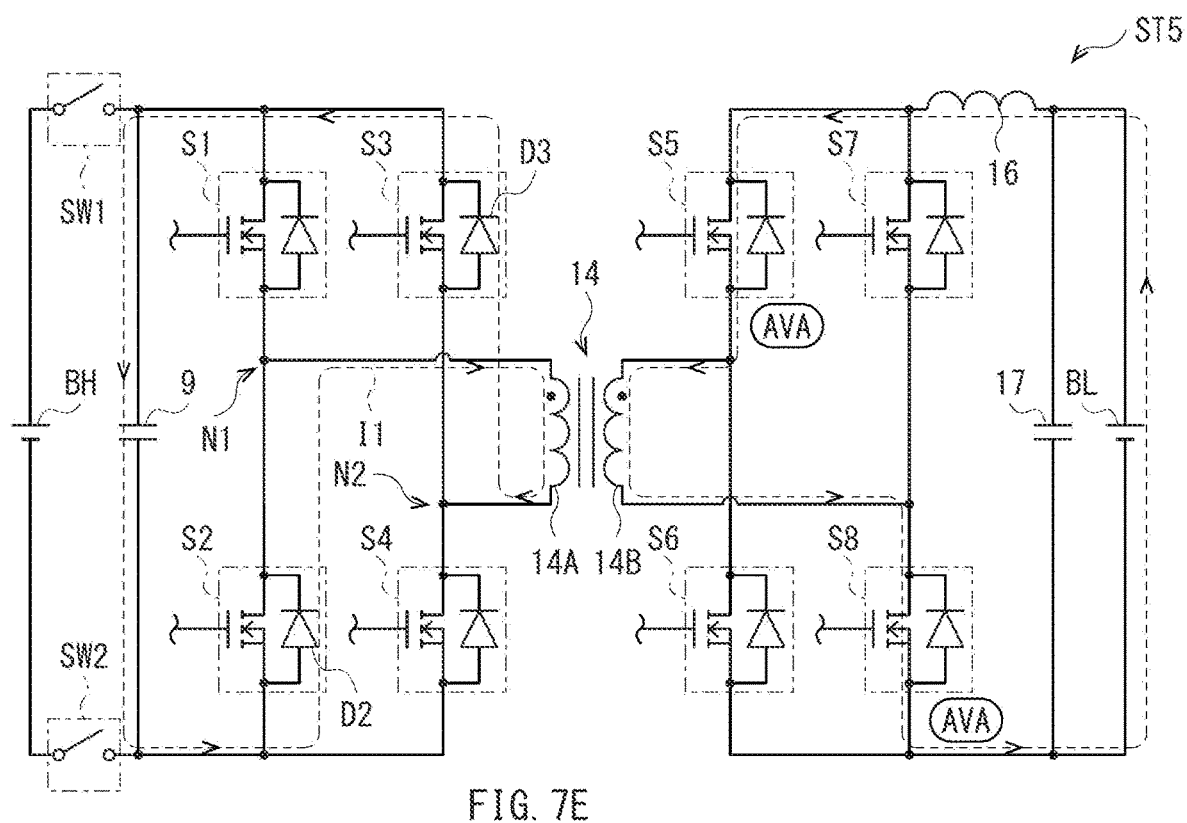
FIG. 7E is an explanatory diagram illustrating another operation state of the power conversion system illustrated in FIG. 1.

In the next operation state ST5, the avalanche current flowing through each of the transistors S6 and S7 reaches 0 A, and the avalanche breakdown state AVA of each of the transistors S6 and S7 is thus cleared (FIG. 7E). The transistors S5 and S8 remain in the avalanche breakdown state AVA. Accordingly, the transformer voltages VTR1 and VTR2 become negative voltages (parts (F) and (G) of FIG. 5). As a result, in the primary circuitry, the body diode D2 of the transistor S2 and the body diode D3 of the transistor S3 are turned on to allow the current I1 to flow through the other end of the winding 14A, i.e., the node N2, the body diode D3 of the transistor S3, the capacitor 9, the body diode D2 of the transistor S2, and the one end of the winding 14A, i.e., the node N1 in this order, and the charge current ICHG thus flows (part (C) of FIG. 5). In other words, energy stored in an excitation inductor LM of the transformer 14 is released and stored in the capacitor 9. In this way, the voltage VH increases (part (H) of FIG. 5).

Figure 7F:
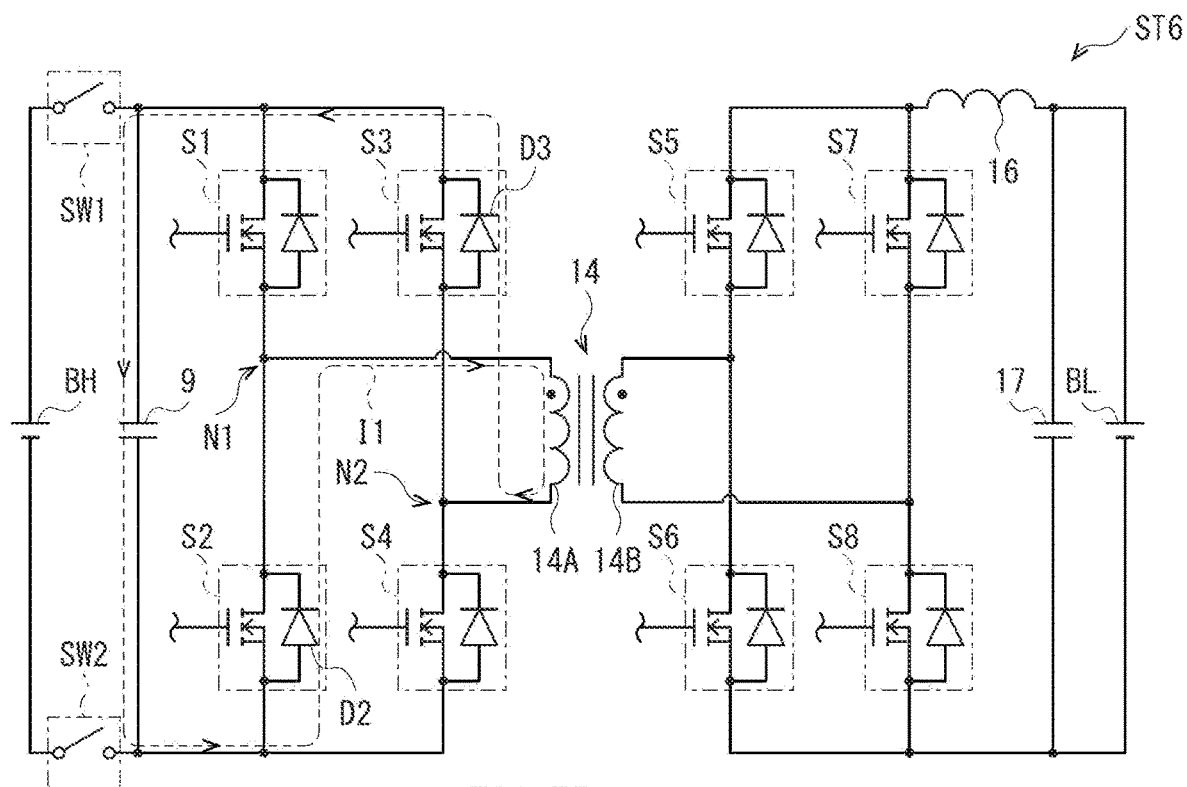
FIG. 7F is an explanatory diagram illustrating another operation state of the power conversion system illustrated in FIG. 1.

In the next operation state ST6, in the secondary circuitry, the release of the energy stored in the choke inductor 16 ends, and the avalanche breakdown state AVA of each of the transistors S5 and S8 is thus cleared (FIG. 7F). Accordingly, in the secondary circuitry, no current flows through the rectifier circuit 15. In the primary circuitry, continuing from the previous operation state ST5, the current I1 flows through the other end of the winding 14A, i.e., the node N2, the body diode D3 of the transistor S3, the capacitor 9, the body diode D2 of the transistor S2, and the one end of the winding 14A, i.e., the node N1 in this order. In other words, the energy stored in the excitation inductor LM of the transformer 14 is released and stored in the capacitor 9. In this way, the voltage VH increases (part (H) of FIG. 5).

Figure 7G:
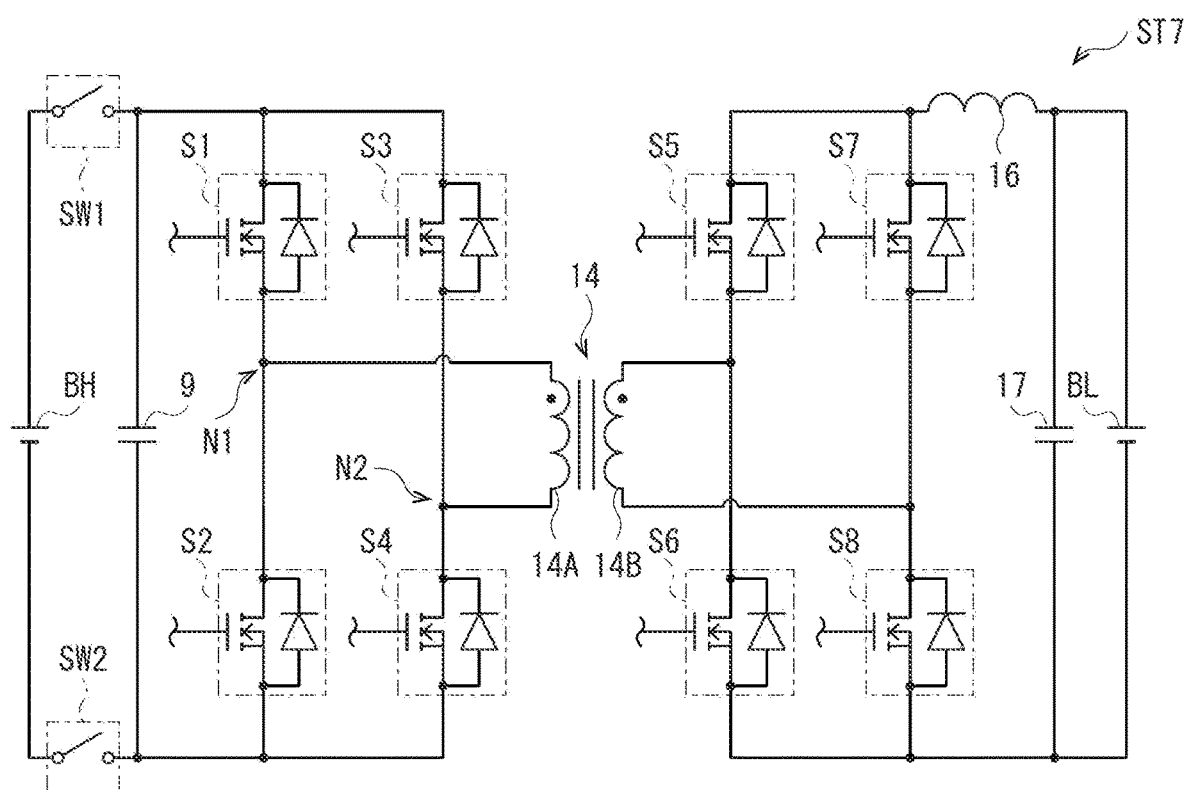
FIG. 7G is an explanatory diagram illustrating another operation state of the power conversion system illustrated in FIG. 1.

In the next operation state ST7, in the primary circuitry, the release of the energy stored in the excitation inductor LM of the transformer 14 ends, and the body diode D2 of the transistor S2 and the body diode D3 of the transistor S3 are turned off (FIG. 7G). Accordingly, in the primary circuitry, no current flows through the switching circuit 13. In other words, in the operation state ST7, any current flows through neither the primary circuitry nor the secondary circuitry.

In this way, during the period from the timing t11 to the timing t12, the capacitor 9 is charged and the voltage VH thus increases. The same applies to the period from the timing t12 to the timing t13. Note that the operations described above are one example. For example, if the duty ratio DS increases to approach "0.5", the operation state ST7, for example, among the operation states ST1 to ST7, can become absent. In the power conversion system 1, as illustrated in FIG. 4, repeating such operations performed from the timing t11 to the timing t13 causes the capacitor 9 to be gradually charged and thus causes the voltage VH to gradually increase.

Further, as illustrated in FIG. 3, once the voltage VH exceeds the target voltage VH_target at the timing t2, the pre-charge controller 21 may end the generation of the duty ratios DP and DS. The pre-charge operation may thus end. Then, the power conversion operation may start after turning on of the switches SW1 and SW2. Note that although in this example the power conversion operation is started immediately after the end of the pre-charge operation at the timing t2, this is non-limiting. For example, after the end of the pre-charge operation, the power conversion system 1 may perform a voltage maintaining operation of allowing the voltage VH to remain near the target voltage VH_target by generating the duty ratios DP and DS, and may thereafter perform the power conversion operation.

The pre-charge operation described above may be controlled by the pre-charge controller 21 of the controller 19. An operation example of the pre-charge controller 21 will be described next.

Figure 8:
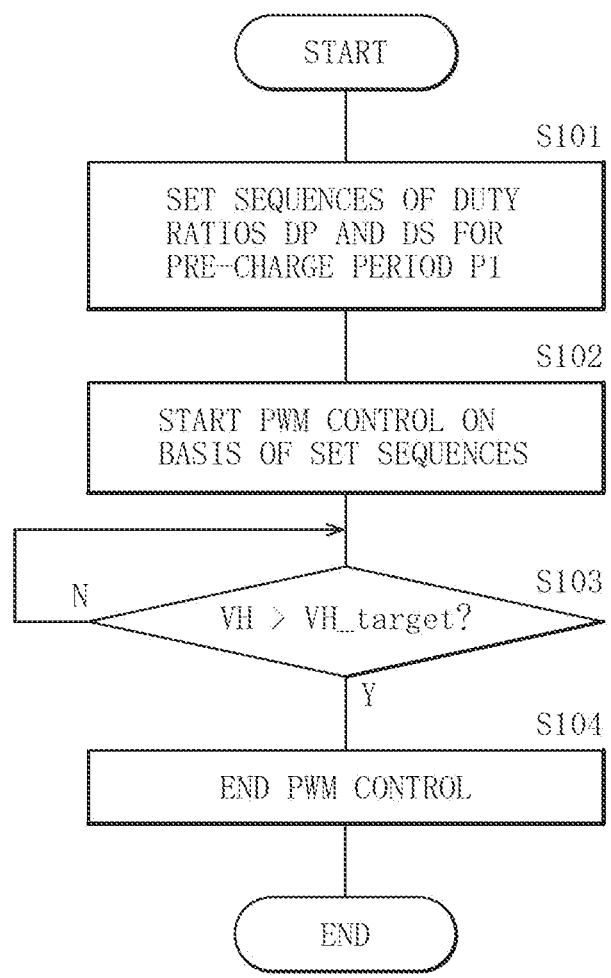
FIG. 8 is a flowchart illustrating an operation example of the power conversion system illustrated in FIG. 1.

FIG. 8 illustrates an operation example of the pre-charge controller 21. With the switches SW1 and SW2 set at the OFF state, the pre-charge controller 21 may perform the following operations.

First, in step S101, the duty ratio generators 23 and 24 of the pre-charge controller 21 may set sequences of the duty ratios DP and DS for the period P1 on the basis of the voltage VL. In a specific but non-limiting example, the duty ratio generator 23 may generate the duty ratio DP in a manner to cause the duty ratio DP to gradually increase during the pre-charge period P1, as illustrated in FIG. 3. The duty ratio generator 24 may generate the duty ratio DS in a manner to cause the duty ratio DS to gradually increase during the pre-charge period P1, as illustrated in FIG. 3. The duty ratio generators 23 and 24 may generate the duty ratios DP and DS in a manner to cause the duty ratio DS to be greater than zero and less than or equal to 0.5 as represented by Equation EQ1 and to cause the duty ratio DP to be greater than zero and less than or equal to the duty ratio DS as represented by Equation EQ2.

Next, in step S102, the controller 19 may start PWM control on the basis of the sequences set in step S101. In a specific but non-limiting example, the controller 19 may generate the gate signals GC to GF on the basis of the sequences set in step S101 and maintain the gate signals GA and GB at the low level. Accordingly, in the power conversion system 1, as illustrated in FIGS. 4 to 6, the PWM control may be performed to cause the capacitor 9 to be gradually charged and to thus cause the voltage VH to gradually increase.

Next, in step S103, the target value determiner 22 may determine whether the voltage VH exceeds the target voltage VH_target. In a case where the voltage VH does not exceed the target voltage VH_target ("N" in step S103), the process in step S103 may be repeated until the voltage VH exceeds the target voltage VH_target.

In a case where the voltage VH exceeds the target voltage VH_target ("Y" in step S103), in step S104, the controller 19 may end the PWM control.

The pre-charge operation may thus end. Thereafter, the switches SW1 and SW2 may be turned on, and the power conversion apparatus 10 may start the power conversion operation of converting the electric power supplied from the high-voltage battery BH and supplying the converted electric power to the low-voltage battery BL.

As described above, in the power conversion system 1, the operations of the switching circuit 13 and the rectifier circuit 15 are controlled to supply electric power from the second power terminal (the terminals T21 and T22) toward the first power terminal (the terminals T11 and T12) during the pre-charge period P1, that is, a preparation period before supplying electric power from the first power terminal (the terminals T11 and T12) toward the second power terminal (the terminals T21 and T22). This makes it possible to perform the pre-charge operation with a simple configuration. For example, according to the technique disclosed in JP-A No. 2017-034862, in the pre-charge operation, the switching operation of the secondary circuitry is controlled on the basis of the current value of the choke coil. This necessitates a current sensor to detect the current flowing through the choke coil. In contrast, in the power conversion system 1 according to the present example embodiment, the operations of the switching circuit 13 and the rectifier circuit 15 are controlled during the pre-charge period P1. For example, it is possible to control the operations of the switching circuit 13 and the rectifier circuit 15 in a manner to cause the duty ratio DS to be greater than zero and less than or equal to 0.5 and to cause the duty ratio DP to be greater than zero and less than or equal to the duty ratio DS. The power conversion system 1 thus makes it possible to omit a current sensor. Accordingly, the power conversion system 1 is able to perform the pre-charge operation with a simple configuration.

Effects

As described above, according to the present example embodiment, the operations of the switching circuit and the rectifier circuit are controlled to supply electric power from the second power terminal toward the first power terminal during the pre-charge period, i.e., a preparation period before supplying electric power from the first power terminal toward the second power terminal. This makes it possible to perform the pre-charge operation with a simple configuration.

Modification Example 1

In the foregoing example embodiment, the operations of the transistors S3 and S4 among the four transistors S1 to S4 of the switching circuit 13 may be controlled during the pre-charge period P1; however, this is non-limiting. Alternatively, for example, the operations of the transistors S1 and S2 may be controlled; the operations of the transistors S1 and S3 may be controlled; or the operations of the transistors S2 and S4 may be controlled.

Modification Example 2

In the foregoing example embodiment, as illustrated in FIG. 8, the sequences of the duty ratios DP and DS for the pre-charge period P1 may be set in advance of starting the pre-charge operation; however, this is non-limiting. A detailed description will be given below of the power conversion system 1 according to a modification example.

Figure 9:
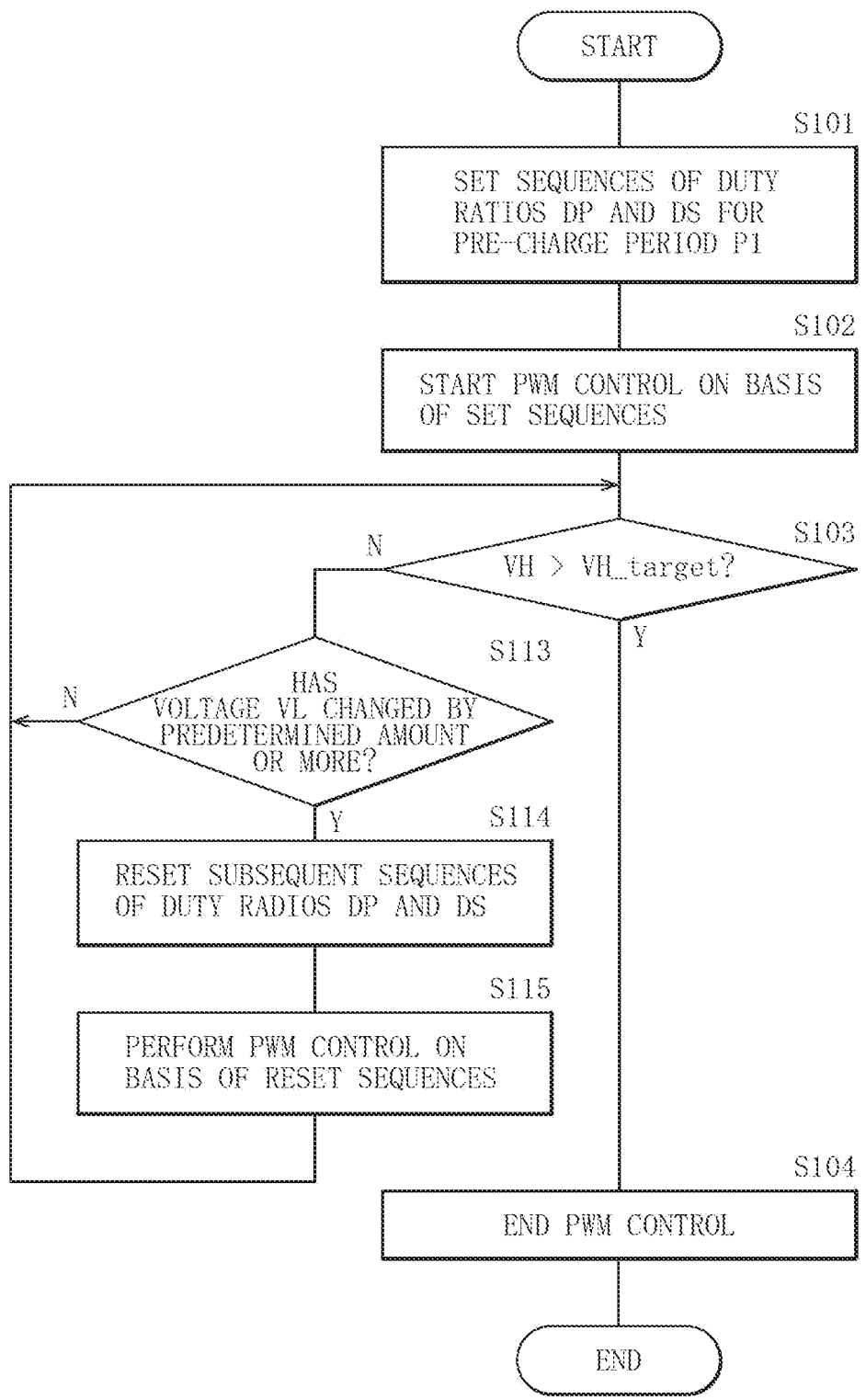
FIG. 9 is a flowchart illustrating an operation example of a power conversion system according to a modification example.

FIG. 9 illustrates an operation example of the pre-charge controller 21 according to the present modification example.

First, in step S101, the duty ratio generators 23 and 24 of the pre-charge controller 21 may set the sequences of the duty ratios DP and DS for the period P1 on the basis of the voltage VL.

Next, in step S102, the controller 19 may start the PWM control on the basis of the sequences set in step S101. Accordingly, in the power conversion system 1, the PWM control may be performed to cause the capacitor 9 to be gradually charged and to thus cause the voltage VH to gradually increase.

Next, in step S103, the target value determiner 22 may determine whether the voltage VH exceeds the target voltage VH_target.

In a case where the voltage VH does not exceed the target voltage VH_target ("N" in step S103), in step S113, the duty ratio generators 23 and 24 may confirm whether the voltage VL has changed from the initial voltage VL of step S101 by a predetermined amount or more. In a case where the voltage VL has not changed by the predetermined amount or more ("N" in step S113), the process may return to step S103.

In a case where it is confirmed in step S113 that the voltage VL has changed by the predetermined amount or more ("Y" in step S113), in step S114, the duty ratio generators 23 and 24 may reset the subsequent sequences of the duty ratios DP and DS on the basis of the voltage VL. Thereafter, in step S115, the controller 19 may perform the PWM control on the basis of the sequences reset in step S114. In a case where the voltage VL has greatly changed from the initial voltage VL, there is a possibility that the sequences that have been set on the basis of the initial voltage VL in step S101 can no longer be appropriate. Accordingly, in the case where the voltage VL has changed by the predetermined amount or more, the duty ratio generators 23 and 24 may reset the subsequent sequences of the duty ratios DP and DS on the basis of the latest voltage VL. The process may thereafter return to step S103.

In a case where it is determined in step S103 that the voltage VH exceeds the target voltage VH_target ("Y" in step S103), in step S104, the controller 19 may end the PWM control. The pre-charge operation may thus end.

Modification Example 3

Figure 10:
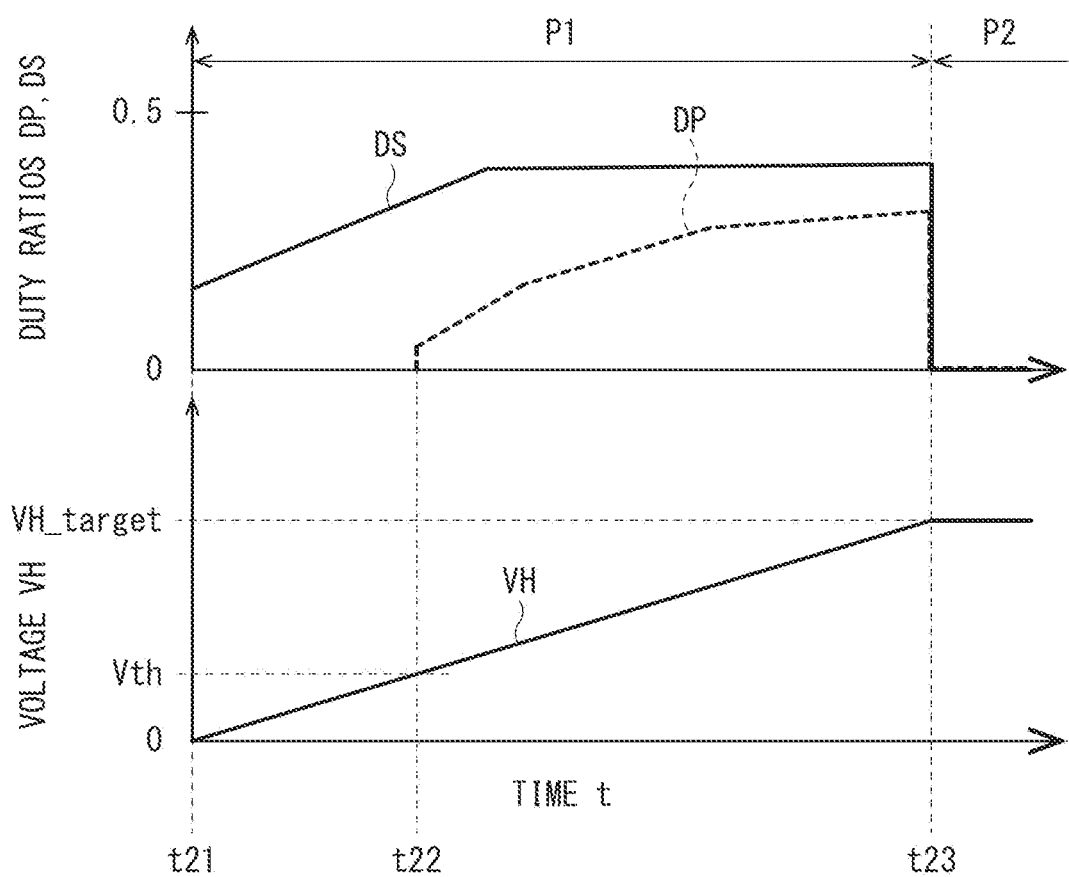
FIG. 10 is a timing chart illustrating an operation example of a power conversion system according to another modification example.

According to the foregoing example embodiment, as illustrated in FIG. 3, in the pre-charge period P1 the switching circuit 13 may be caused to operate on the basis of the duty ratio DP from the timing t1 at which the pre-charge operation is started; however, this is non-limiting. Alternatively, for example, as illustrated in FIG. 10, the switching circuit 13 may be caused to operate on the basis of the duty ratio DP some time after the start of the pre-charge operation. In this example, the pre-charge controller 21 may generate the duty ratio DS in a manner to cause the duty ratio DS to gradually increase during a period from a timing t21 to a timing t22. Further, once the voltage VH exceeds a threshold Vth, the pre-charge controller 21 may generate the duty ratios DP and DS in a manner to cause the duty ratios DP and DS to gradually increase during a period from the timing t22 to a timing t23. Accordingly, during the period from the timing t21 to the timing t22, the rectifier circuit 15 may perform the switching operation, and during the period from the timing t22 to the timing t23, the switching circuit 13 and the rectifier circuit 15 may perform the switching operations as with the case with the foregoing example embodiment (FIG. 4). The threshold Vth may be set to satisfy the following equation EQ6, for example.

$$Vth < N \times VL \quad \text{(EQ6)}$$

Thus, the threshold Vth may be set to fall within such a range of the voltage VH that the power conversion system 1 is to perform the step-down operation in the pre-charge operation, as indicated by equation EQ3.

Figure 11:
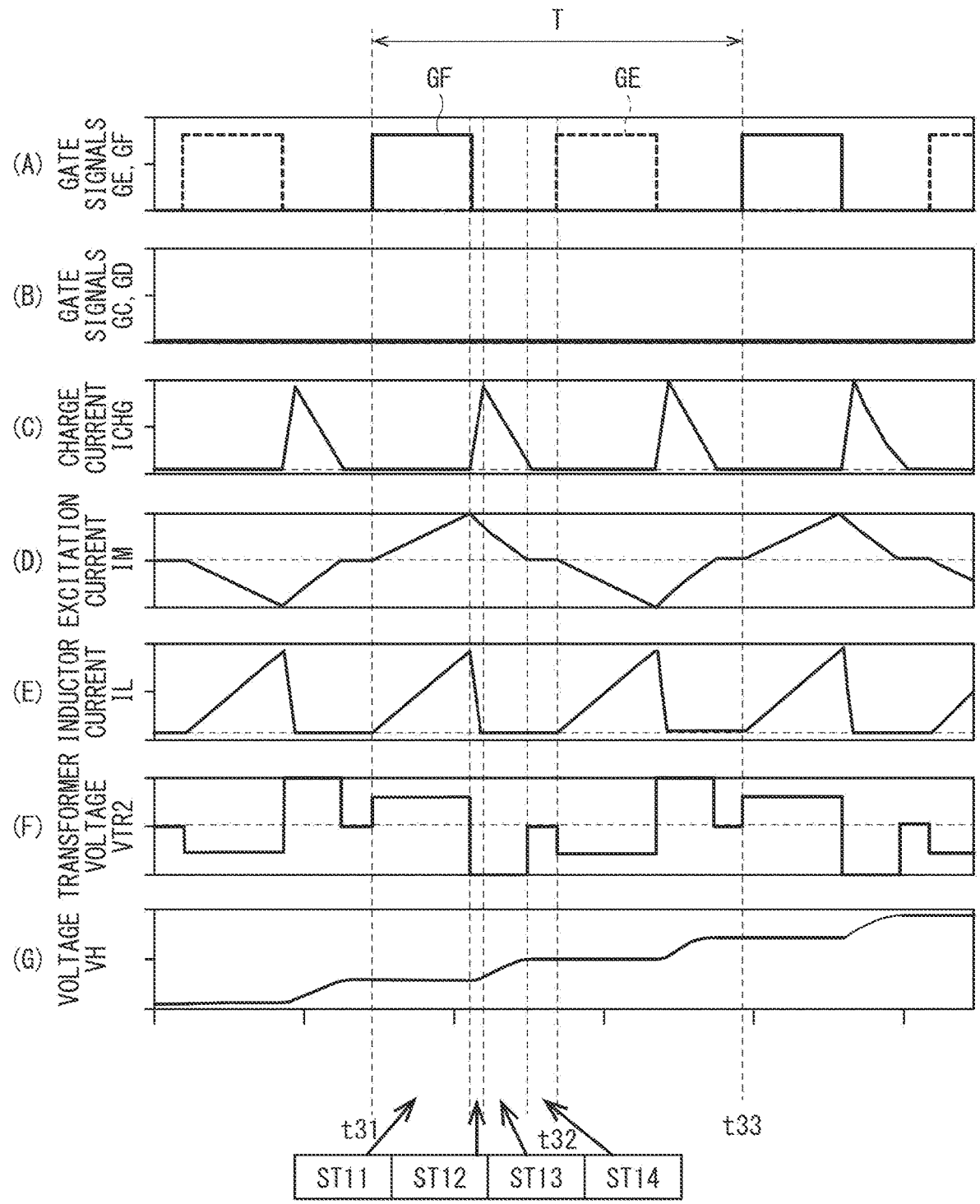
FIG. 11 is a timing waveform chart illustrating an operation example of a power conversion system according to another modification example.

FIG. 11 illustrates a simulation waveform example of the operations during the period from the timing t21 to the timing t22. Part (A) of FIG. 11 illustrates the waveforms of the gate signals GE and GF. Part (B) of FIG. 11 illustrates the waveforms of the gate signals GC and GD. Part (C) of FIG. 11 illustrates the waveform of the charge current ICHG, i.e., a current flowing into the capacitor 9. Part (D) of FIG. 11 illustrates the waveform of the excitation current IM of the transformer 14. Part (E) of FIG. 11 illustrates the waveform of the inductor current IL, i.e., a current flowing from the voltage line L21B to the voltage line L21A in the choke inductor 16. Part (F) of FIG. 11 illustrates the waveform of the transformer voltage VTR2, i.e., a voltage of the winding 14B of the transformer 14 at the node N4 relative to that at the node N5. Part (G) of FIG. 11 illustrates the waveform of the voltage VH.

As illustrated in part (A) of FIG. 11, the controller 19 may change the gate signal GF from the low level to the high level at a timing t31. Further, the controller 19 may change the gate signal GF from the high level to the low level at a timing at which the time corresponding to the duty ratio DS has elapsed from the timing t31. Next, the controller 19 may change the gate signal GE from the low level to the high level at a timing t32. Further, the controller 19 may change the gate signal GE from the high level to the low level at a timing at which the time corresponding to the duty ratio DS has elapsed from the timing t32. The controller 19 may maintain the gate signals GA to GD at the low level. In the power conversion system 1, during the period from the timing t21 to the timing t22, the capacitor 9 may be charged by repeating the operations performed from the timing t31 to a timing t33 while changing the duty ratio DS. This causes the voltage VH to gradually increase as illustrated in part (G) of FIG. 11.

In this example, the power conversion system 1 can take four operation states ST11 to ST14 during a period from the timing t31 to the timing t32. The operation states ST of the power conversion system 1 may change in the order of the operation state ST11, the operation state ST12, the operation state ST13, and the operation state ST14.

In the operation state ST11, the controller 19 may set the gate signal GF at the high level and set the gate signals GA to GE at the low level (parts (A) and (B) of FIG. 11). This turns on the transistors S5 and S8 and turns off the transistors S1 to S4, S6, and S7. In the secondary circuitry, the current I2 flows through the positive terminal of the low-voltage battery BL, the choke inductor 16, the transistor S5 in the ON state, the winding 14B, the transistor S8 in the ON state, and the negative terminal of the low-voltage battery BL in this order, and energy is stored in the choke inductor 16. In the primary circuitry, the excitation current IM flows through the transformer 14 (part (D) of FIG. 11).

In the next operation state ST12, the controller 19 may change the gate signal GF from the high level to the low level (part (A) of FIG. 11). This changes the transistors S5 and S8 from the ON state to the OFF state. In the secondary circuitry, a counter-electromotive voltage occurs in the choke inductor 16 and the drain-to-source voltage of each of the transistors S5 and S8 increases to reach the avalanche breakdown voltage. As a result, an avalanche current flows through each of the transistors S5 and S8, bringing each of the transistors S5 and S8 into the avalanche breakdown state AVA. This causes the transformer voltages VTR1 and VTR2 to be negative voltages (part (F) of FIG. 11). In the primary circuitry, the body diode D2 of the transistor S2 and the body diode D3 of the transistor S3 are turned on to allow the current I1 to flow through the other end of the winding 14A, i.e., the node N2, the body diode D3 of the transistor S3, the capacitor 9, the body diode D2 of the transistor S2, and the one end of the winding 14A, i.e., the node N1 in this order, and the charge current ICHG thus flows (part (C) of FIG. 11). In this way, the voltage VH increases (part (G) of FIG. 11).

In the next operation state ST13, the release of the energy stored in the choke inductor 16 ends, and the avalanche breakdown state AVA of each of the transistors S5 and S8 is thus cleared. In the primary circuitry, continuing from the previous operation state ST12, the current I1 flows through the other end of the winding 14A, i.e., the node N2, the body diode D3 of the transistor S3, the capacitor 9, the body diode D2 of the transistor S2, and the one end of the winding 14A, i.e., the node N1 in this order. In other words, the energy stored in the excitation inductor LM of the transformer 14 is released and stored in the capacitor 9. In this way, the voltage VH increases (part (G) of FIG. 11).

In the next operation state ST14, in the primary circuitry, the release of the energy stored in the excitation inductor LM of the transformer 14 ends, and the body diode D2 of the transistor S2 and the body diode D3 of the transistor S3 are turned off. Accordingly, in the primary circuitry, no current flows through the switching circuit 13.

In this way, during the period from the timing t31 to the timing t32, the capacitor 9 is charged and the voltage VH thus increases. The same applies to a period from the timing t32 to the timing t33. Note that the operations described above are one example. For example, if the duty ratio DS increases to approach "0.5", the operation state ST14, for example, among the operation states ST11 to ST14, can become absent. In the power conversion system 1, as illustrated in FIG. 11, repeating such operations performed from the timing t31 to the timing t33 causes the capacitor 9 to be gradually charged and thus causes the voltage VH to gradually increase.

As illustrated in FIG. 10, during the period from the timing t22 to the timing t23 after the voltage VH has exceeded the threshold Vth, the power conversion system 1 may operate as illustrated in FIGS. 4 to 6. This causes the voltage VH to gradually increase as illustrated in part (G) of FIG. 4.

Further, as illustrated in FIG. 10, once the voltage VH exceeds the target voltage VH_target at the timing t23, the pre-charge controller 21 may end the generation of the duty ratios DP and DS. The pre-charge operation may thus end. Then, the power conversion operation may start after turning on of the switches SW1 and SW2.

Figure 12:
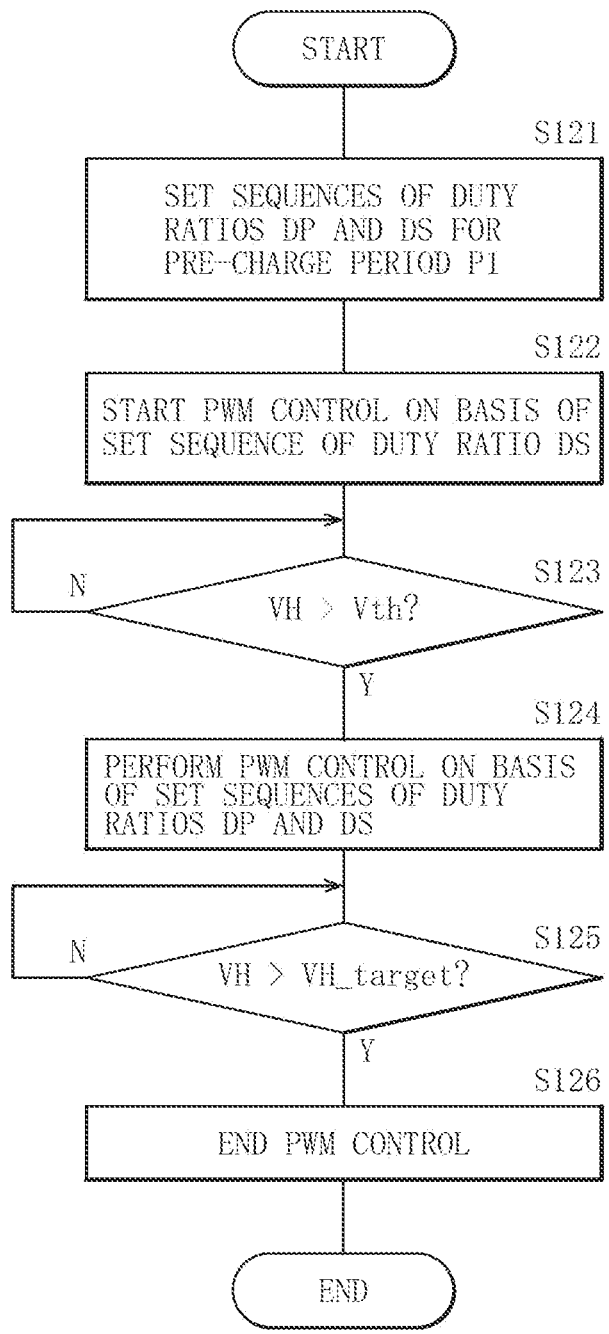
FIG. 12 is a flowchart illustrating an operation example of a power conversion system according to another modification example.

FIG. 12 illustrates an operation example of the pre-charge controller 21 according to the present modification example.

First, in step S121, the duty ratio generators 23 and 24 of the pre-charge controller 21 may set the sequences of the duty ratios DP and DS for the pre-charge period P1 on the basis of the voltage VL. In a specific but non-limiting example, the duty ratio generator 23 may generate the duty ratio DP in a manner to cause the duty ratio DP to gradually increase during the pre-charge period P1. The duty ratio generator 24 may generate the duty ratio DS in a manner to cause the duty ratio DS to gradually increase during the pre-charge period P1. The duty ratio generators 23 and 24 may generate the duty ratios DP and DS in a manner to cause the duty ratio DS to be greater than zero and less than or equal to 0.5 as represented by Equation EQ1 and to cause the duty ratio DP to be greater than zero and less than or equal to the duty ratio DS as represented by Equation EQ2.

Next, in step S122, the controller 19 may start the PWM control on the basis of the sequence of the duty ratio DS set in step S121. In a specific but non-limiting example, the controller 19 may generate the gate signals GE and GF on the basis of the sequence of the duty ratio DS set in step S121 and maintain the gate signals GA to GD at the low level. Accordingly, in the power conversion system 1, as illustrated in FIG. 10, the PWM control may be performed to cause the capacitor 9 to be gradually charged and to thus cause the voltage VH to gradually increase.

Next, in step S123, the target value determiner 22 may determine whether the voltage VH exceeds the threshold Vth. In a case where the voltage VH does not exceed the threshold Vth ("N" in step S123), the process in step S123 may be repeated until the voltage VH exceeds the threshold Vth.

In a case where the voltage VH exceeds the threshold Vth ("Y" in step S123), in step S124, the controller 19 may perform the PWM control on the basis of the sequences of the duty ratios DP and DS set in step S121. In a specific but non-limiting example, the controller 19 may generate the gate signals GC to GF on the basis of the sequences of the duty ratios DP and DS set in step S121 and maintain the gate signals GA and GB at the low level. Accordingly, in the power conversion system 1, as illustrated in FIGS. 4 to 6, the PWM control may be performed to cause the capacitor 9 to be gradually charged and to thus cause the voltage VH to gradually increase.

Next, in step S125, the target value determiner 22 may determine whether the voltage VH exceeds the target voltage VH_target. In a case where the voltage VH does not exceed the target voltage VH_target ("N" in step S125), the process in step S125 may be repeated until the voltage VH exceeds the target voltage VH_target.

In a case where the voltage VH exceeds the target voltage VH_target ("Y" in step S125), in step S126, the controller 19 may end the PWM control.

The pre-charge operation may thus end.

Note that in this example, as described in steps S123 and S124, the controller 19 may perform the PWM control on the basis of the set duty ratio DP in the case where the voltage VH exceeds the threshold Vth; however, this is non-limiting. For example, the controller 19 may perform the PWM control on the basis of the set duty ratio DP after the elapse of a predetermined time from the start of the pre-charge operation.

Modification Example 4

Figure 13:
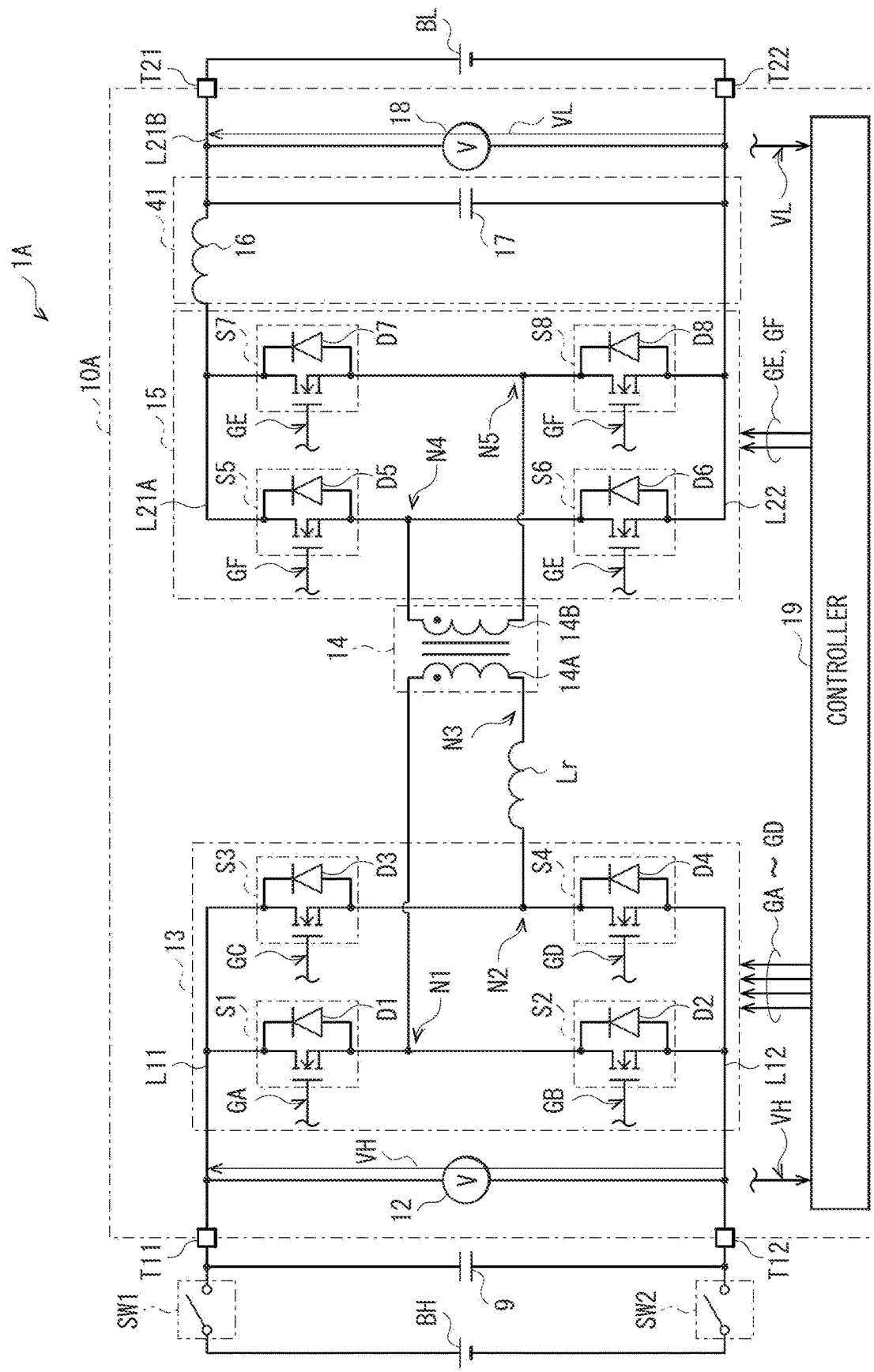
FIG. 13 is a circuit diagram illustrating a configuration example of a power conversion system according to another modification example.

In the foregoing example embodiment, as illustrated in FIG. 1, the switching circuit 13 and the transformer 14 may be directly coupled to each other; however, this is non-limiting. Alternatively, for example, a resonant inductor Lr may be provided between the switching circuit 13 and the transformer 14 as in a power conversion system 1A illustrated in FIG. 13. The power conversion system 1A includes a power conversion apparatus 10A. The power conversion apparatus 10A may include the resonant inductor Lr. One end of the resonant inductor Lr may be coupled to the node N2, and another end of the resonant inductor Lr may be coupled to the node N3. The other end of the winding 14A of the transformer 14 may be coupled to the node N3. The resonant inductor Lr may correspond to a specific but non-limiting example of an "inductor" in one embodiment of the technology. In this example, the one end of the resonant inductor Lr may be coupled to the node N2 and the other end of the resonant inductor Lr may be coupled to the other end of the winding 14A; however, this is non-limiting. Alternatively, for example, the one end of the resonant inductor Lr may be coupled to the node N1 and the other end of the resonant inductor Lr may be coupled to the one end of the winding 14A.

Modification Example 5

Figure 14:
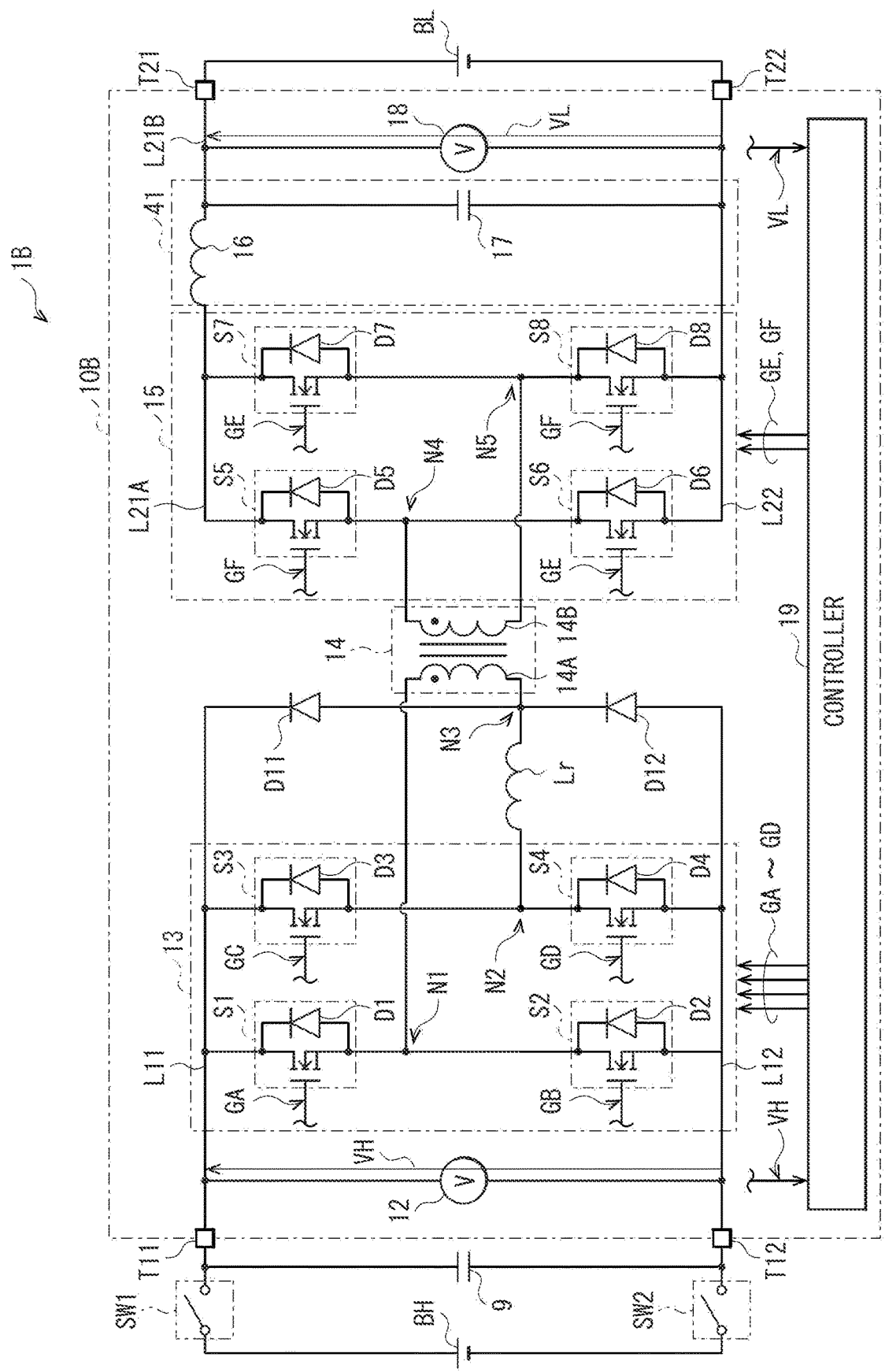
FIG. 14 is a circuit diagram illustrating a configuration example of a power conversion system according to another modification example.

In the foregoing example embodiment, as illustrated in FIG. 1, the switching circuit 13 may be provided on the primary side; however, this is non-limiting. Alternatively, for example, a resonant inductor Lr and diodes D11 and D12 may further be provided as in a power conversion system 1B illustrated in FIG. 14. The power conversion system 1B includes a power conversion apparatus 10B. The power conversion apparatus 10B may include the resonant inductor Lr and the diodes D11 and D12. One end of the resonant inductor Lr may be coupled to the node N2, and another end of the resonant inductor Lr may be coupled to the node N3. The other end of the winding 14A of the transformer 14 may be coupled to the node N3. An anode of the diode D11 may be coupled to the node N3, and a cathode of the diode D11 may be coupled to the voltage line L11. An anode of the diode D12 may be coupled to the reference voltage line L12, and a cathode of the diode D12 may be coupled to the node N3. The resonant inductor Lr may correspond to a specific but non-limiting example of the "inductor" in one embodiment of the technology. The diode D11 may correspond to a specific but non-limiting example of a "first diode" in one embodiment of the technology. The diode D12 may correspond to a specific but non-limiting example of a "second diode" in one embodiment of the technology. With this configuration, when the power conversion system 1B performs the power conversion operation of converting electric power supplied from the high-voltage battery BH and supplying the converted electric power to the low-voltage battery BL, the diodes D11 and D12 may function as so-called clamp diodes. This makes it possible to reduce a surge voltage occurring in the secondary circuitry. In the pre-charge operation, the power conversion system 1B may cause the transistors S3 and S4, among the four transistors S1 to S4 of the switching circuits 13, to operate as illustrated in FIGS. 4 to 6. Accordingly, in the pre-charge operation of the power conversion system 1B, for example, in a case where the transistor S3 is in the ON state, a current flows through the transistor S3 instead of the diode D11, and in a case where the transistor S4 is in the ON state, a current flows through the transistor S4 instead of the diode D12. This makes it possible to reduce a current flowing through each of the diodes D11 and D12 in the pre-charge operation, thus making it unnecessary to upsize the diodes D11 and D12.

Modification Example 6

In the foregoing example embodiment, the controller 19 may generate the sequences of the duty ratios DP and DS for the pre-charge period P1 on the basis of the voltage VL and control the operations of the switching circuit 13 and the rectifier circuit 15 on the basis of the generated sequences; however, this is non-limiting. Alternatively, for example, the operations of the switching circuit 13 and the rectifier circuit 15 may be controlled by performing feedback control on the basis of a current flowing through the capacitor 9. Such a modification example will be described in detail below with reference to some examples.

Figure 15:
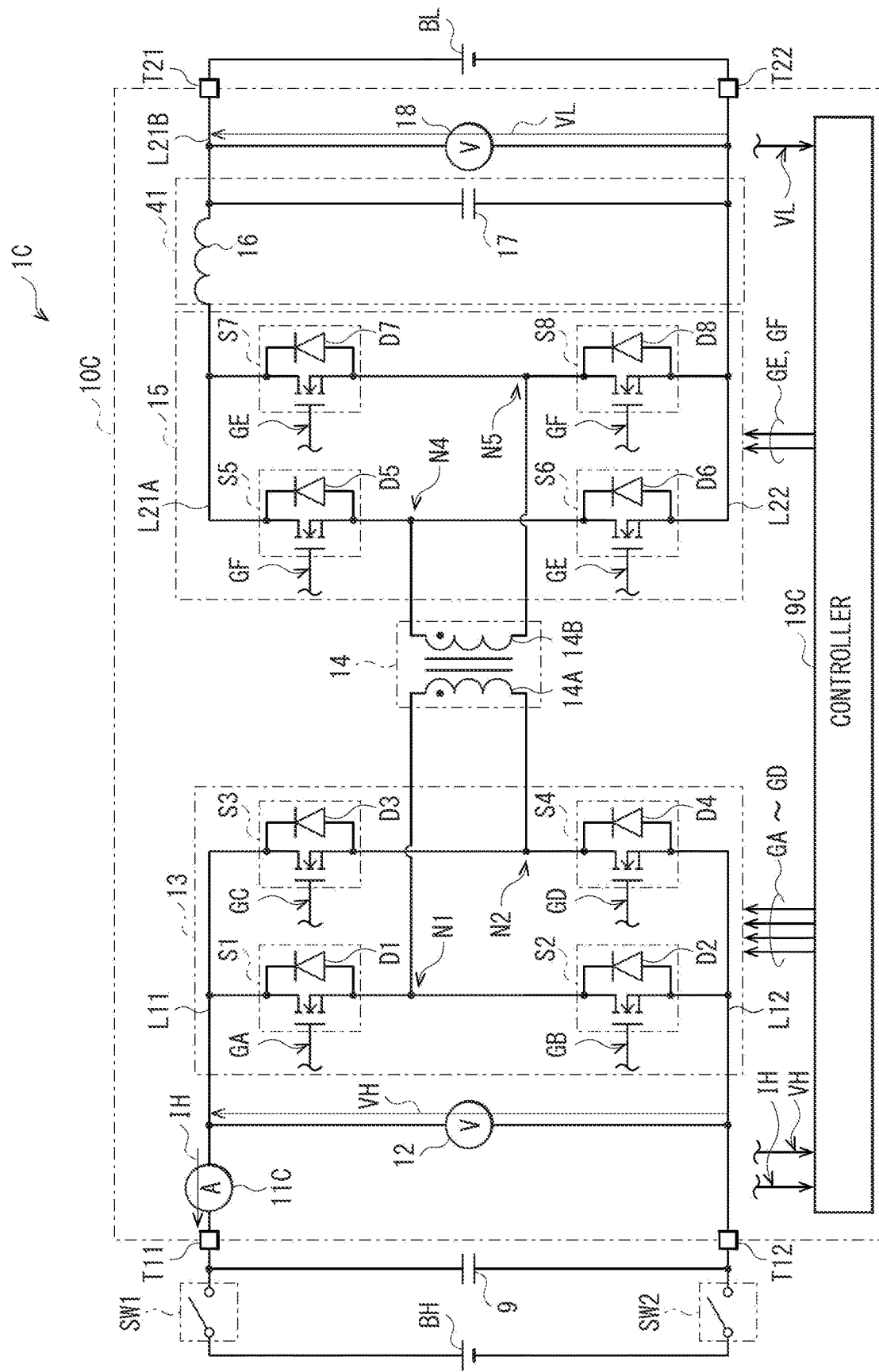
FIG. 15 is a circuit diagram illustrating a configuration example of a power conversion system according to another modification example.

FIG. 15 illustrates a configuration example of a power conversion system 1C according to the present modification example. The power conversion system 1C includes a power conversion apparatus 10C. The power conversion apparatus 10C may include a current sensor 11C and a controller 19C. The current sensor 11C may be configured to detect a current flowing through the terminal T11. One end of the current sensor 11C may be coupled to the terminal T11, and another end of the current sensor 11C may be coupled to the voltage line L11. The current sensor 11C may detect a current flowing from the voltage line L11 toward the terminal T11 as a current IH. Further, the current sensor 11C may be configured to supply a result of the detection of the current IH to the controller 19C. The controller 19C may be configured to control the operations of the switching circuit 13 and the rectifier circuit 15 on the basis of the current IH detected by the current sensor 11C, the voltage VH detected by the voltage sensor 12, and the voltage VL detected by the voltage sensor 18.

Figure 16:
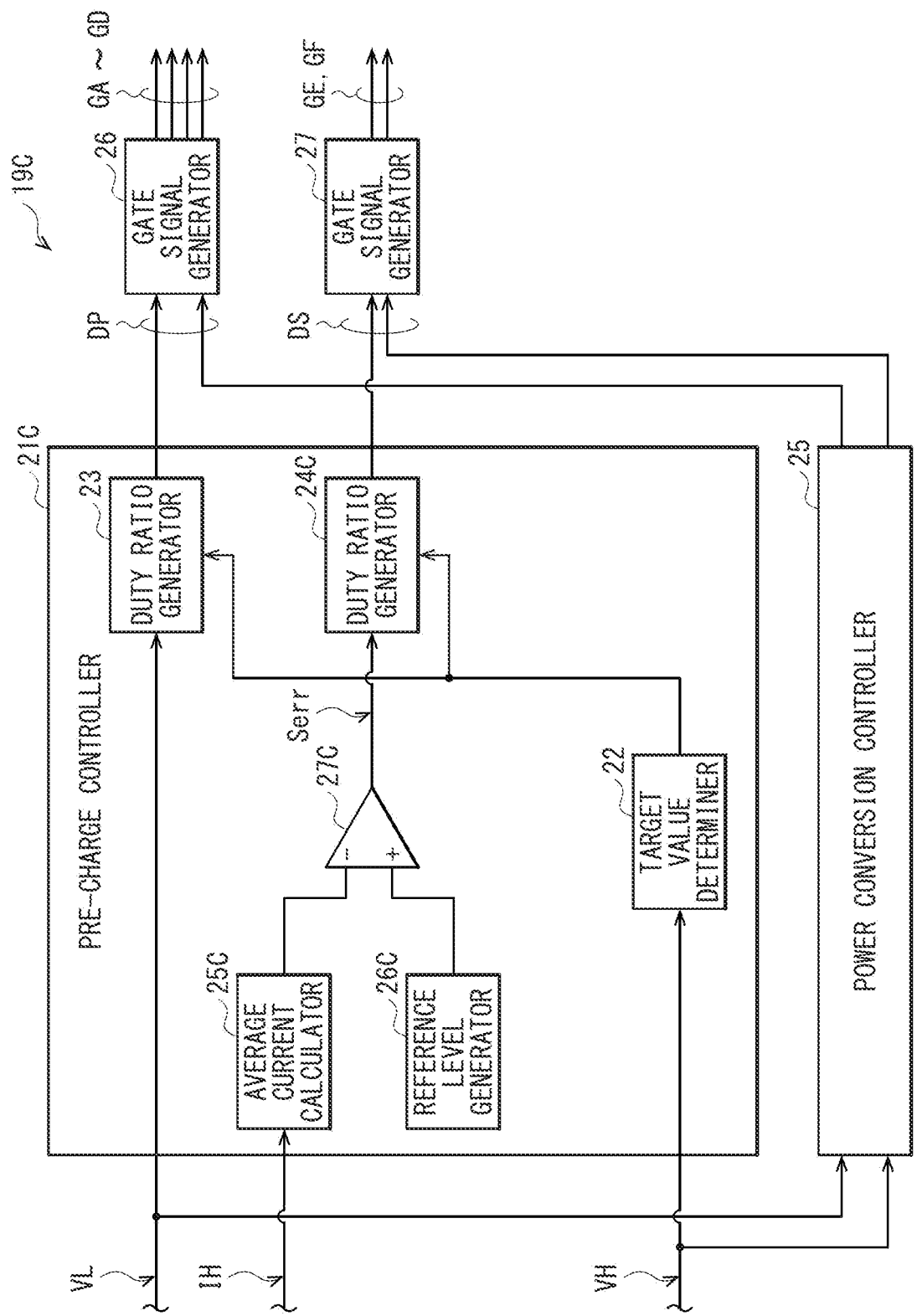
FIG. 16 is a block diagram illustrating a configuration example of a controller illustrated in FIG. 15.

FIG. 16 illustrates a configuration example of the controller 19C. The controller 19C may include a pre-charge controller 21C. The pre-charge controller 21C may include an average current calculator 25C, a reference level generator 26C, an error amplifier 27C, and a duty ratio generator 24C.

The average current calculator 25C may be configured to calculate an average value of the current IH detected by the current sensor 11C. The reference level generator 26C may be configured to generate a reference level REF for the average value of the current IH. The error amplifier 27C may be configured to generate an error signal Serr by amplifying a difference between the reference level REF and the average value of the current IH. The duty ratio generator 24C may be configured to generate the duty ratio DS on the basis of the error signal Serr.

This makes it possible for the power conversion system 1C to control the operation of the rectifier circuit 15 in the pre-charge operation by performing feedback control on the basis of the current flowing through the capacitor 9.

Next, another power conversion system 1D according to the present modification example will be described. Like the power conversion system 1C (FIG. 15), the power conversion system 1D may include the current sensor 11C and a controller 19D.

Figure 17:
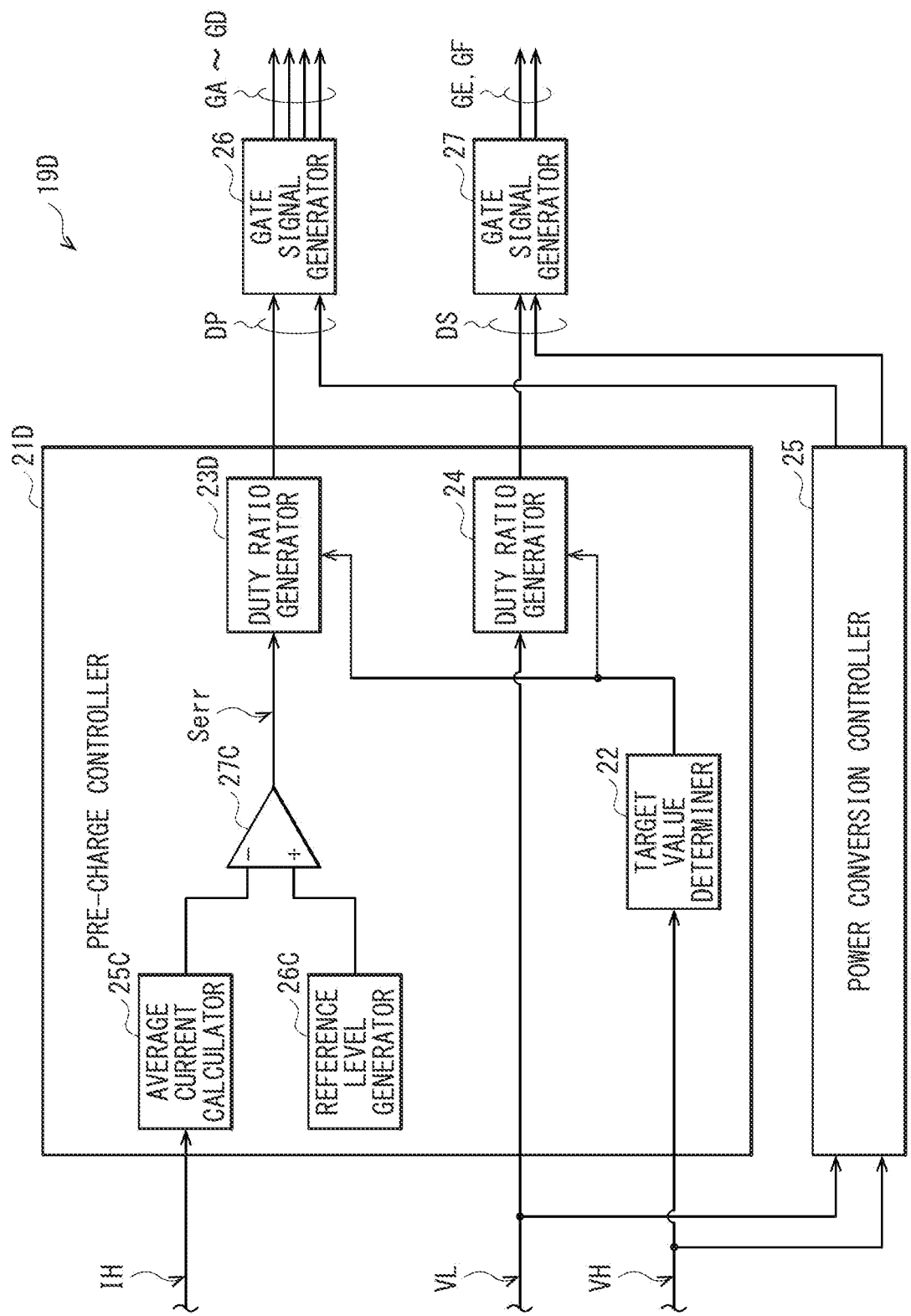
FIG. 17 is a block diagram illustrating a configuration example of a controller according to another modification example.

FIG. 17 illustrates a configuration example of the controller 19D. The controller 19D may include a pre-charge controller 21D. The pre-charge controller 21D may include the average current calculator 25C, the reference level generator 26C, the error amplifier 27C, and a duty ratio generator 23D. The duty ratio generator 23D may be configured to generate the duty ratio DP on the basis of the error signal Serr.

This makes it possible for the power conversion system 1D to control the operation of the switching circuit 13 in the pre-charge operation by performing feedback control on the basis of the current flowing through the capacitor 9.

The above-described examples are non-limiting. For example, the above-described examples may be combined to control both of the operation of the switching circuit 13 and the operation of the rectifier circuit 15 in the pre-charge operation by performing feedback control on the basis of the current flowing through the capacitor 9.

In the power conversion system 1C, as illustrated in FIG. 15, the current sensor 11C may be provided between the terminal T11 and the voltage line L11; however, this is non-limiting. Alternatively, for example, the current sensor 11C may be provided between the terminal T12 and the reference voltage line L12, between the node N1 and the one end of the winding 14A, or between the node N2 and the other end of the winding 14A. Further, in this example, the current sensor 11C may be provided in the primary circuitry; however, this is non-limiting. Alternatively, for example, the current sensor 11C may be provided in the secondary circuitry.

Modification Example 7

In the foregoing example embodiment, the controller 19 may generate the sequences of the duty ratios DP and DS for the pre-charge period P1 on the basis of the voltage VL and may control the operations of the switching circuit 13 and the rectifier circuit 15 on the basis of the duty ratios DP and DS generated; however, this is non-limiting. Alternatively, for example, the operations of the switching circuit 13 and the rectifier circuit 15 may be controlled by performing feedback control on the basis of the voltage VH. Such a modification example will be described in detail below with reference to some examples.

A power conversion system 1E according to the present modification example includes a controller 19E.

Figure 18:
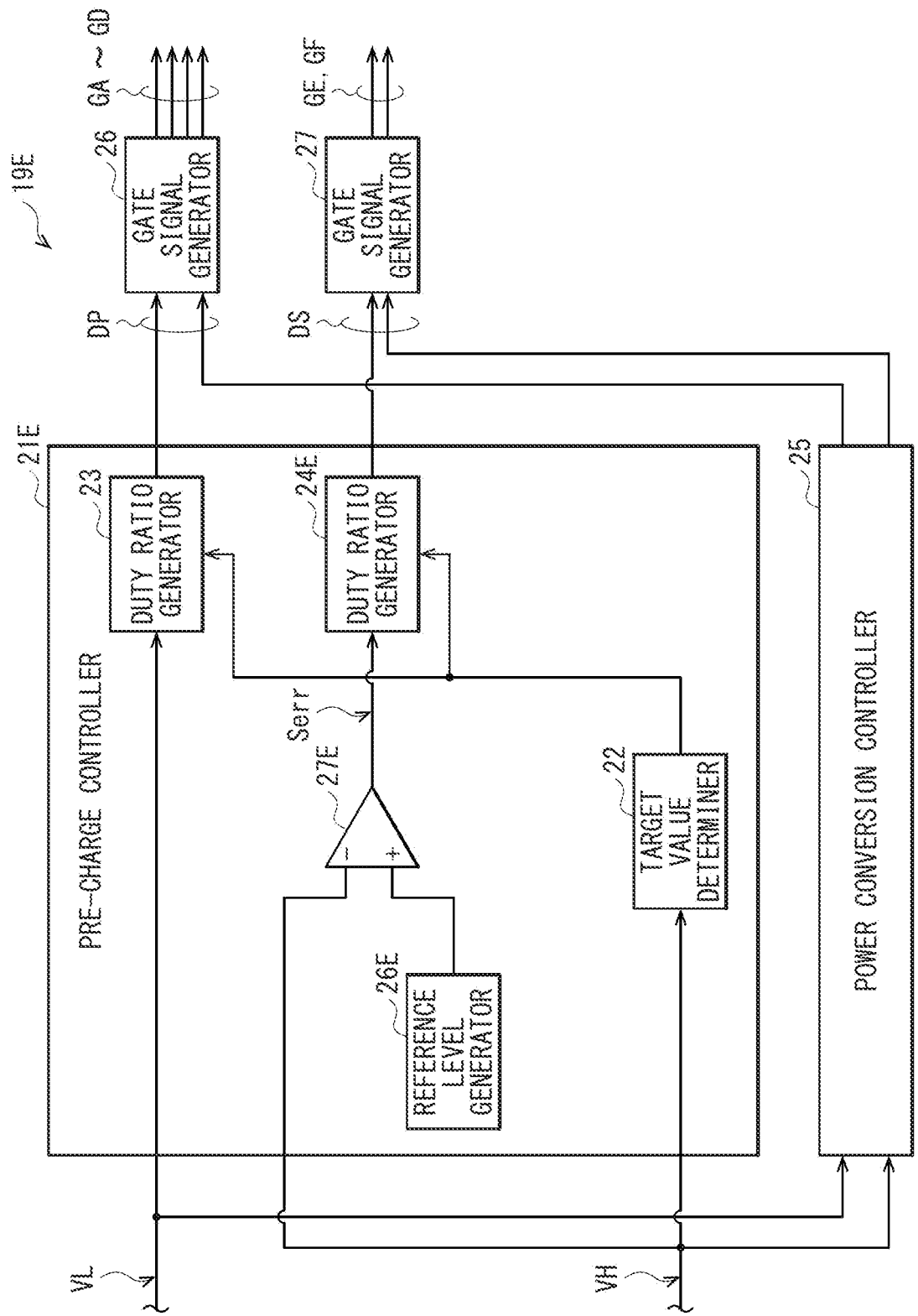
FIG. 18 is a block diagram illustrating a configuration example of a controller according to another modification example.

FIG. 18 illustrates a configuration example of the controller 19E. The controller 19E may include a pre-charge controller 21E. The pre-charge controller 21E may include a reference level generator 26E, an error amplifier 27E, and a duty ratio generator 24E.

The reference level generator 26E may be configured to generate the reference level REF for the voltage VH. The error amplifier 27E may be configured to generate the error signal Serr by amplifying a difference between the reference level REF and the voltage VH. The duty ratio generator 24E may be configured to generate the duty ratio DS on the basis of the error signal Serr.

This makes it possible for the power conversion system 1E to control the operation of the rectifier circuit 15 in the pre-charge operation by performing feedback control on the basis of the voltage VH.

Next, another power conversion system 1F according to the present modification example will be described. Like the power conversion system 1E, the power conversion system 1F includes a controller 19F.

Figure 19:
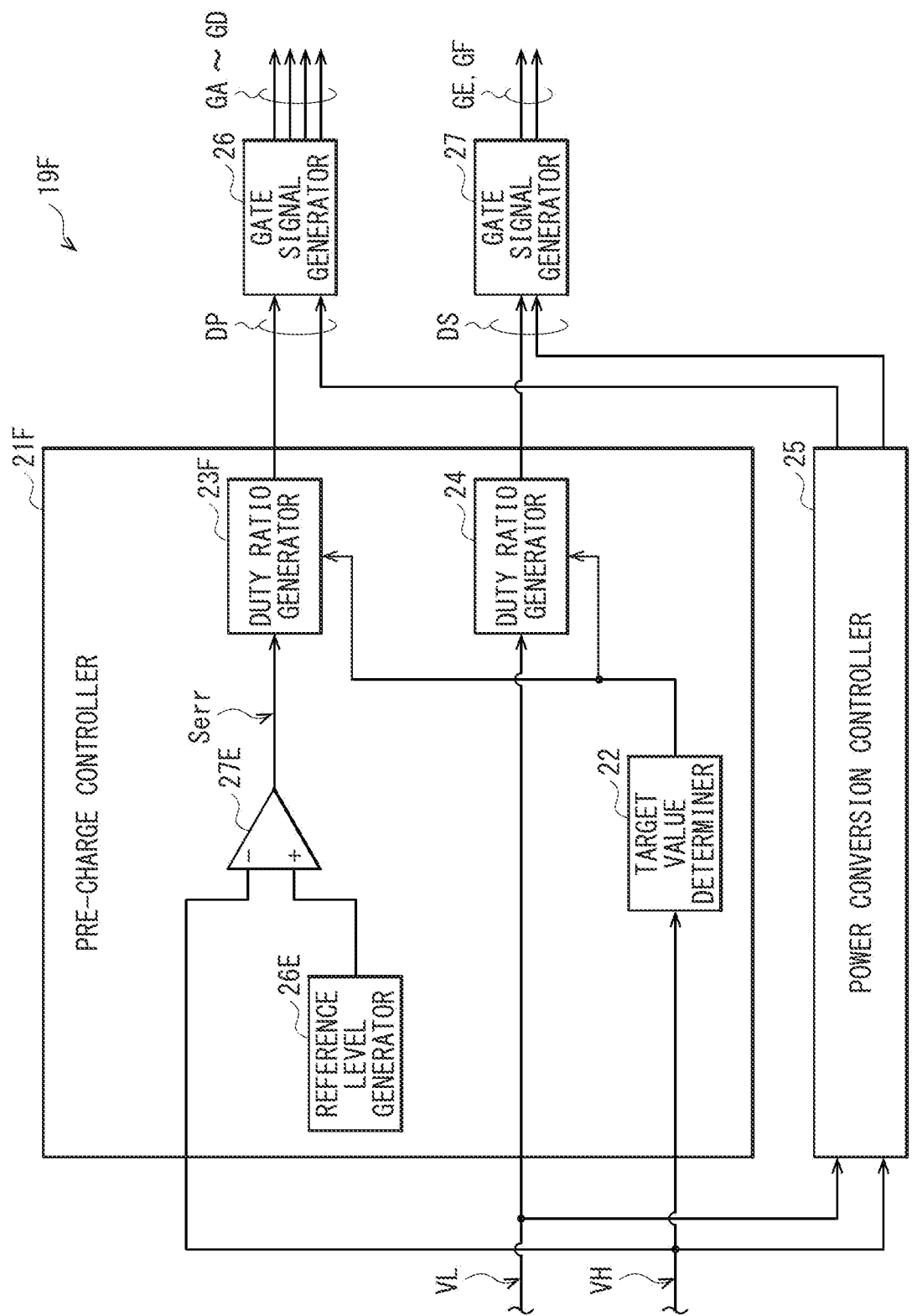
FIG. 19 is a block diagram illustrating a configuration example of a controller according to another modification example.

FIG. 19 illustrates a configuration example of the controller 19F. The controller 19F may include a pre-charge controller 21F. The pre-charge controller 21F may include the reference level generator 26E, the error amplifier 27E, and a duty ratio generator 23F. The duty ratio generator 23F may be configured to generate the duty ratio DP on the basis of the error signal Serr.

This makes it possible for the power conversion system 1F to control the operation of the switching circuit 13 in the pre-charge operation by performing feedback control on the basis of the voltage VH.

The above-described examples are non-limiting. For example, the above-described examples may be combined to control both of the operation of the switching circuit 13 and the operation of the rectifier circuit 15 in the pre-charge operation by performing feedback control on the basis of the voltage VH.

Modification Example 8

Figure 20:
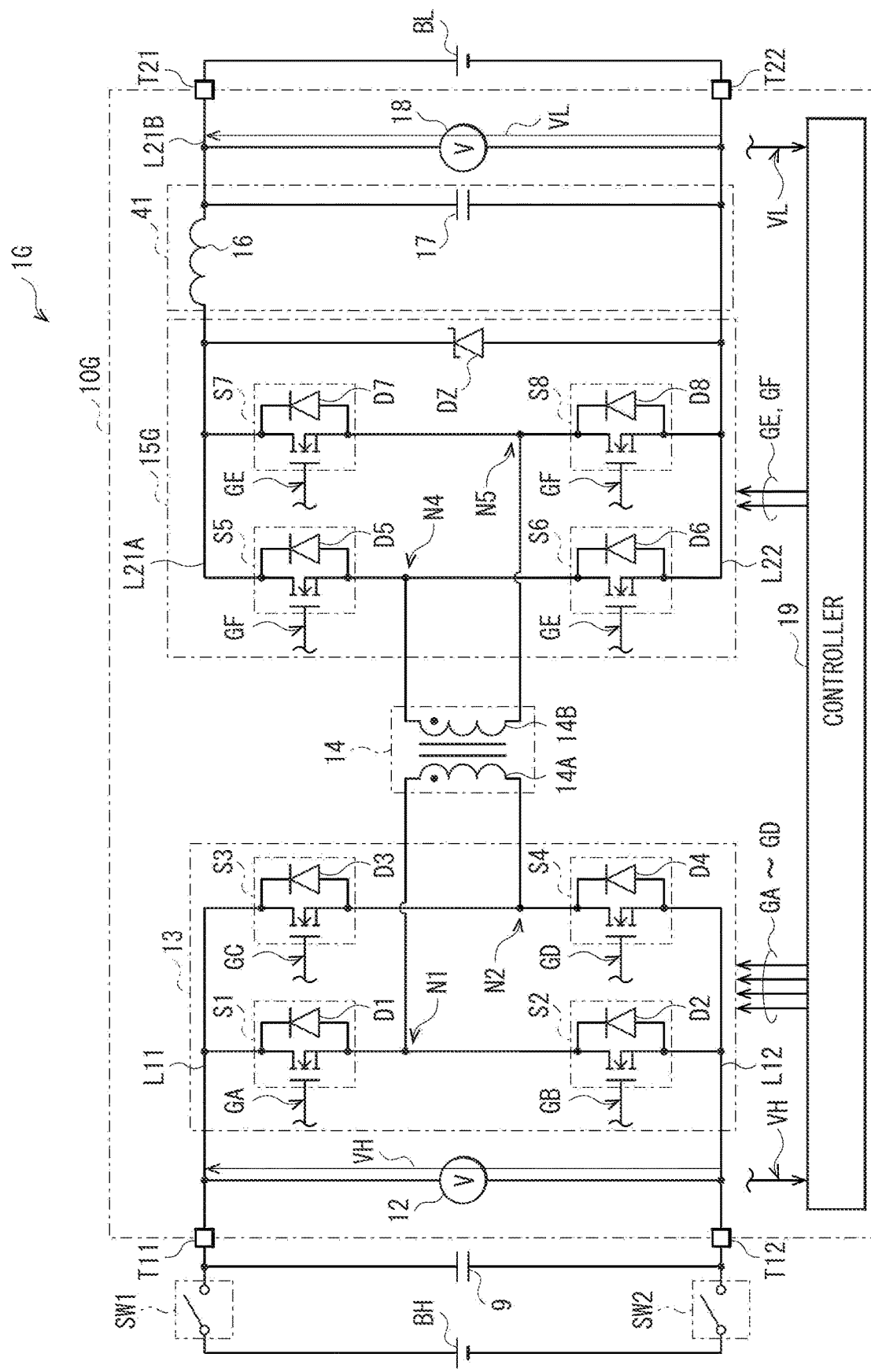
FIG. 20 is a circuit diagram illustrating a configuration example of a power conversion system according to another modification example.

In the foregoing example embodiment, as illustrated in FIG. 1, the four transistors S5 to S8 may be provided between the voltage line L21A and the reference voltage line L22; however, as in a power conversion system 1G illustrated in FIG. 20, a Zener diode DZ may further be provided between the voltage line L21A and the reference voltage line L22. The power conversion system 1G includes a power conversion apparatus 10G. The power conversion apparatus 10G includes a rectifier circuit 15G. The rectifier circuit 15G may include the Zener diode DZ. An anode of the Zener diode DZ may be coupled to the reference voltage line L22, and a cathode of the Zener diode DZ may be coupled to the voltage line L21A. A Zener voltage of the Zener diode DZ is lower than the avalanche breakdown voltage at the transistors S5 to S8. This makes it possible to prevent the transistors S5 to S8 from coming into the avalanche breakdown state AVA in the operation states ST3 to ST5 (FIGS. 7C to 7E) in the case where a counter-electromotive voltage occurs in the choke inductor 16. The Zener diode DZ may correspond to a specific but non-limiting example of a "Zener diode" in one embodiment of the technology. In this example, the Zener diode DZ may be provided between the voltage line L21A and the reference voltage line L22; however, this is non-limiting. Alternatively, the Zener diode may be provided between the drain and the source of each of the transistors S5 to S8.

Figure 21:
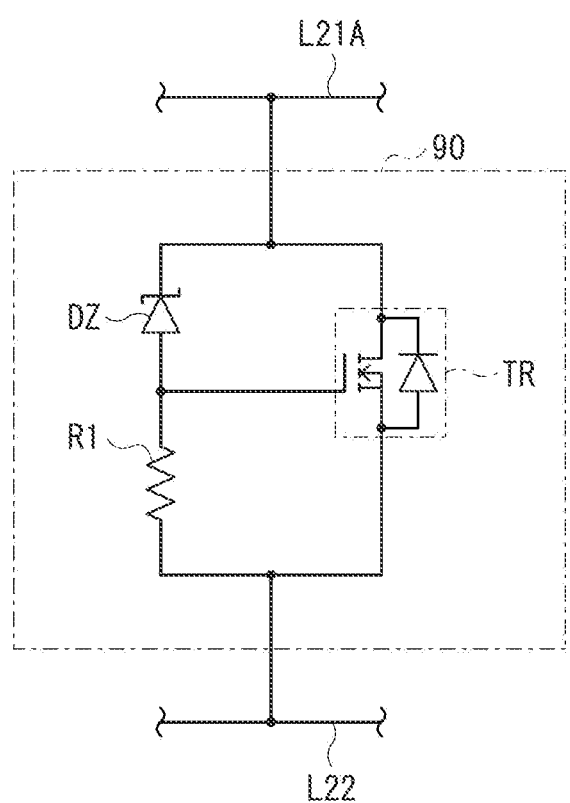
FIG. 21 is a circuit diagram illustrating a configuration example of an active clamp circuit according to another modification example.

Although the Zener diode DZ may be provided between the voltage line L21A and the reference voltage line L22 in this example, this is non-limiting. Alternatively, for example, an active clamp circuit 90 including the Zener diode DZ illustrated in FIG. 21 may be provided between the voltage line L21A and the reference voltage line L22. The active clamp circuit 90 may include the Zener diode DZ, a resistor R1, and a transistor TR. The anode of the Zener diode DZ may be coupled to one end of the resistor R1 and to a gate of the transistor TR, and the cathode of the Zener diode DZ may be coupled to the voltage line L21A. The one end of the resistor R1 may be coupled to the anode of the Zener diode DZ, and another end of the resistor R1 may be coupled to the reference voltage line L22. The transistor TR may be an n-type FET. A drain of the transistor TR may be coupled to the voltage line L21A, the gate of the transistor TR may be coupled to the anode of the Zener diode DZ and to the one end of the resistor R1, and a source of the transistor TR may be coupled to reference voltage line L22. This configuration makes it possible to enhance flexibility of setting of a clamp voltage of the active clamp circuit 90, thus making it possible to prevent the transistors S5 to S8 from coming into the avalanche breakdown state AVA in the case where a counter-electromotive voltage occurs in the choke inductor 16.

Modification Example 9

Although the choke inductor 16 may be provided in the foregoing example embodiment, this is non-limiting. Alternatively, for example, a choke transformer 31 may be provided, as in a power conversion system 1H illustrated in FIG. 22. The power conversion system 1H includes a power conversion apparatus 10H. The power conversion apparatus 10H may include a smoothing circuit 41H and a diode D13. The smoothing circuit 41H may include the choke transformer 31. The choke transformer 31 may include windings 31A and 31B. One end of the winding 31A may be coupled to the voltage line L11, and another end of the winding 31A may be coupled to a cathode of the diode D13. One end of the winding 31B may be coupled to the voltage line L21A, and another end of the winding 31B may be coupled to the voltage line L21B. An anode of the diode D13 may be coupled to the reference voltage line L12, and the cathode of the diode D13 may be coupled to the other end of the winding 31A. The choke transformer 31 may correspond to a specific but non-limiting example of a "choke transformer" in one embodiment of the technology. The diode D13 may correspond to a specific but non-limiting example of a "third diode" in one embodiment of the technology.

Figure 23:
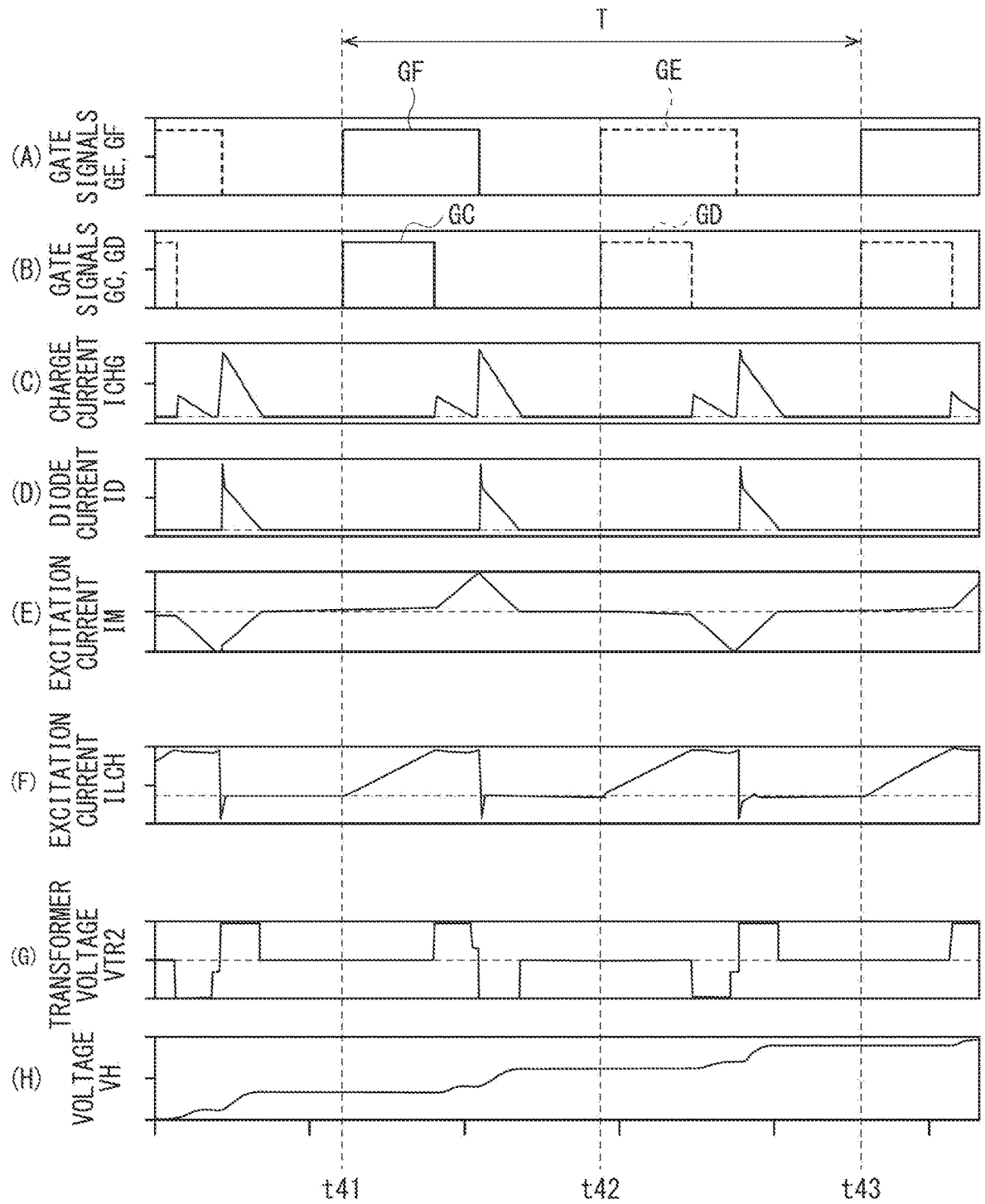
FIG. 23 is a timing waveform chart illustrating an operation example of the power conversion system illustrated in FIG. 22.

FIG. 23 illustrates a simulation waveform example of the pre-charge operation in the power conversion system 1H. Part (A) of FIG. 23 illustrates the waveforms of the gate signals GE and GF. Part (B) of FIG. 23 illustrates the waveforms of the gate signals GC and GD. Part (C) of FIG. 23 illustrates the waveform of the charge current ICHG, i.e., a current flowing into the capacitor 9. Part (D) of FIG. 23 illustrates a waveform of a diode current ID, i.e., a current flowing into the diode D13. Part (E) of FIG. 23 illustrates the waveform of the excitation current IM of the transformer 14. Part (F) of FIG. 23 illustrates a waveform of an excitation current ILCH of the choke transformer 31. Part (G) of FIG. 23 illustrates the waveform of the transformer voltage VTR2, i.e., a voltage of the winding 14B of the transformer 14 at the node N4 relative to that at the node N5. Part (H) of FIG. 23 illustrates the waveform of the voltage VH.

As illustrated in parts (A) and (B) of FIG. 23, the controller 19 may change the gate signals GC and GF from the low level to the high level at a timing t41. Further, the controller 19 may change the gate signal GC from the high level to the low level at a timing at which the time corresponding to the duty ratio DP has elapsed from the timing t41, and may change the gate signal GF from the high level to the low level at a timing at which the time corresponding to the duty ratio DS has elapsed from the timing t41. Next, the controller 19 may change the gate signals GD and GE from the low level to the high level at a timing t42. Further, the controller 19 may change the gate signal GD from the high level to the low level at a timing at which the time corresponding to the duty ratio DP has elapsed from the timing t42, and may change the gate signal GE from the high level to the low level at a timing at which the time corresponding to the duty ratio DS has elapsed from the timing t42. The controller 19 may maintain the gate signals GA and GB at the low level. In the power conversion system 1H, the capacitor 9 may be charged by repeating the operations performed from the timing t41 to a timing t43 while changing the duty ratios DP and DS. This causes the voltage VH to gradually increase as illustrated in part (H) of FIG. 23.

A detailed description will be given below of operations based on the gate signals GC and GF during a period from the timing t41 to the timing t42 by way of example. Note that the same applies to operations based on the gate signals GD and GE during a period from the timing t42 to the timing t43.

Figure 24:
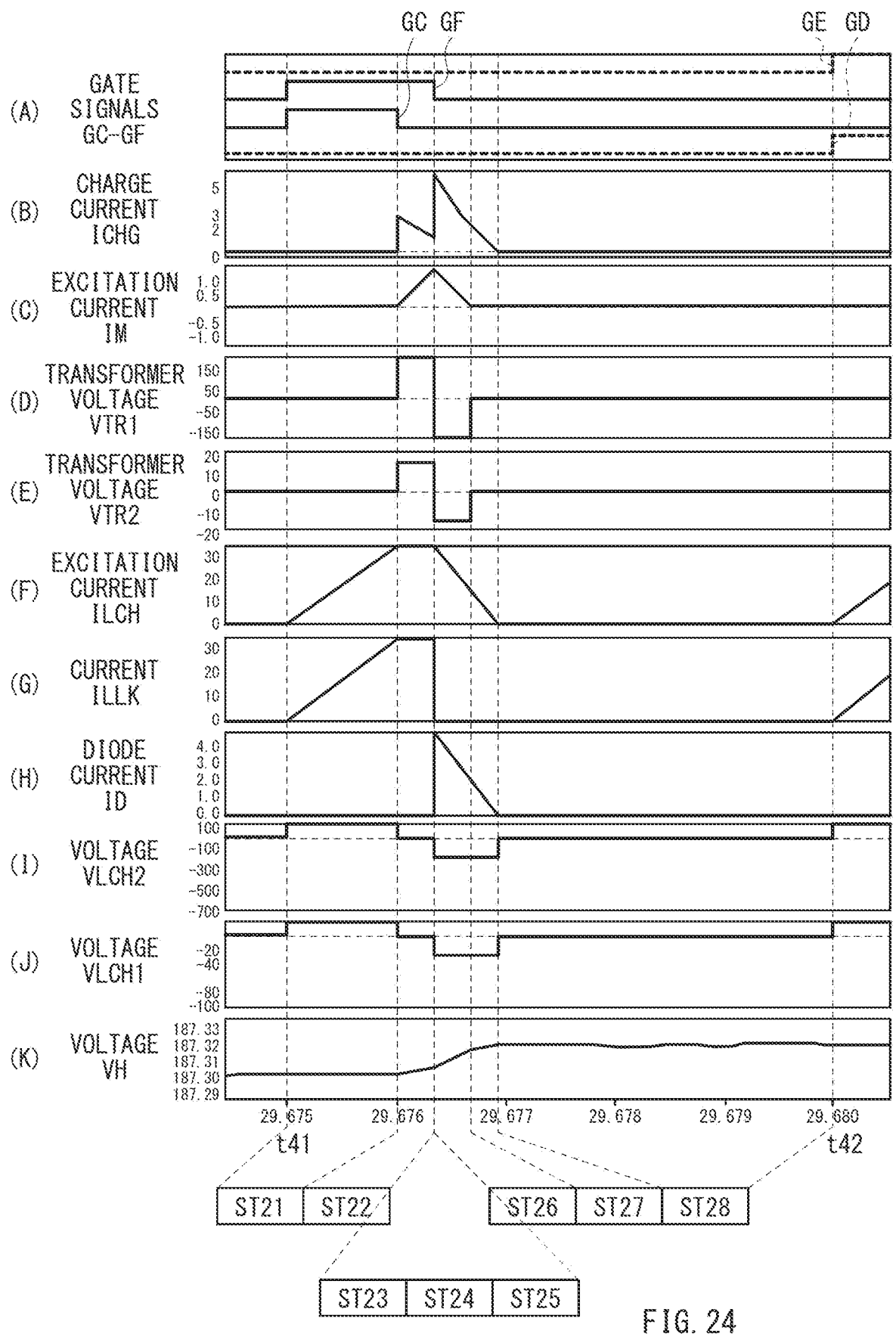
FIG. 24 is another timing waveform chart illustrating an operation example of the power conversion system illustrated in FIG. 22.
Figure 25:
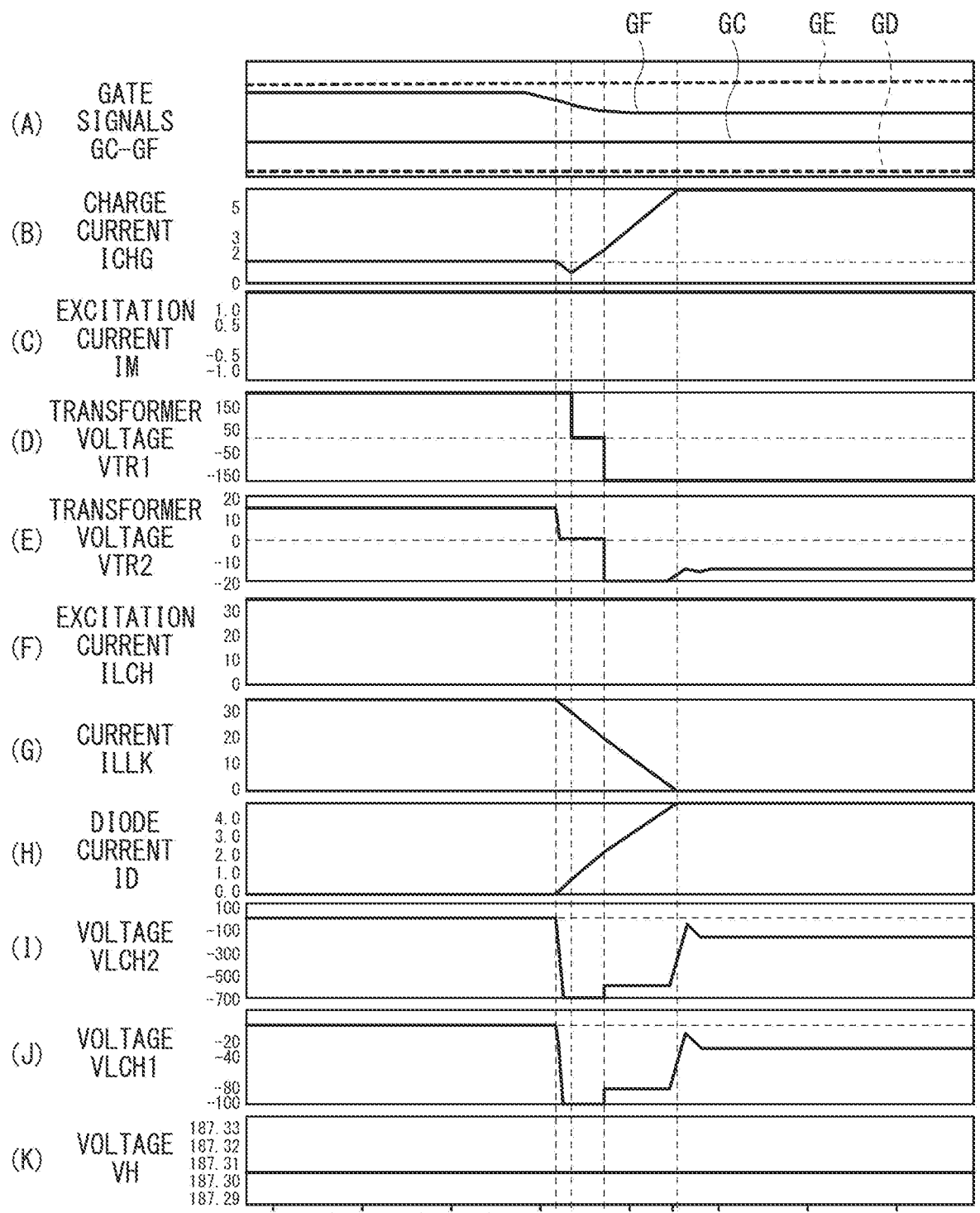
FIG. 25 is another timing waveform chart illustrating an operation example of the power conversion system illustrated in FIG. 22.

FIGS. 24 and 25 illustrate the operations during the period from the timing t41 to the timing t42 in more detail. In each of FIGS. 24 and 25, part (A) illustrates the waveforms of the gate signals GC to GF; part (B) illustrates the waveform of the charge current ICHG, i.e., a current flowing into the capacitor 9; part (C) illustrates the waveform of the excitation current IM of the transformer 14; part (D) illustrates the waveform of the transformer voltage VTR1, i.e., a voltage of the winding 14A of the transformer 14 at the node N1 relative to that at the node N2; part (E) illustrates the waveform of the transformer voltage VTR2, i.e., a voltage of the winding 14B of the transformer 14 at the node N4 relative to that at the node N5; part (F) illustrates the waveform of the excitation current ILCH of the choke transformer 31; part (G) illustrates a waveform of a current ILLK flowing through the low-voltage battery BL; part (H) illustrates the waveform of the diode current ID, i.e., a current flowing through the diode D13; part (I) illustrates a waveform of a voltage VLCH2, i.e., a voltage of the winding 31A of the choke transformer 31 at the voltage line L11 relative to that at the cathode of the diode D13; part (J) illustrates a waveform of a voltage VLCH1, i.e., a voltage of the winding 31B of the choke transformer 31 at the voltage line L21A relative to that at the voltage line L21B; and part (K) illustrates the waveform of the voltage VH. As illustrated in FIG. 24, the power conversion system 1H can take eight operation states ST21 to ST28 during the period from the timing t41 to the timing t42. The operation states ST of the power conversion system 1H may change in the order of the operation state ST21, the operation state ST22, the operation state ST23, ..., and the operation state ST28. The operation states ST23 to ST25 are operation states over very small time periods. FIG. 25 illustrates the operations during the periods corresponding to the operation states ST23 to ST25 and periods thereareound in an enlarged manner.

FIGS. 26A to 26H illustrate operations of the power conversion system 1H in the eight operation states ST21 to ST28.

Figure 26A:
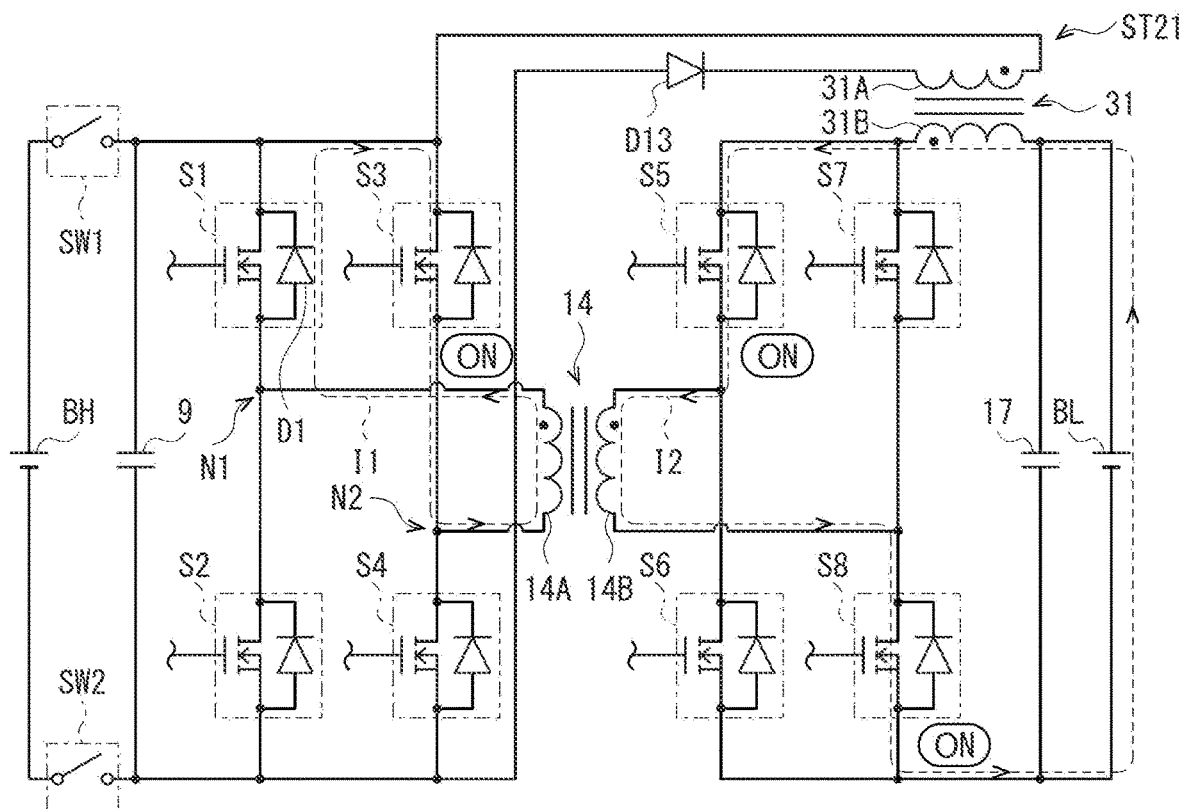
FIG. 26A is an explanatory diagram illustrating an operation state of the power conversion system illustrated in FIG. 22.

In the operation state ST21, the controller 19 may set the gate signals GC and GF at the high level and set the gate signals GA, GB, GD, and GE at the low level (part (A) of FIG. 24). This turns on the transistors S3, S5, and S8 and turns off the transistors S1, S2, S4, S6, and S7 (FIG. 26A). In the secondary circuitry, the current I2 flows through the positive terminal of the low-voltage battery BL, the winding 31B of the choke transformer 31, the transistor S5 in the ON state, the winding 14B, the transistor S8 in the ON state, and the negative terminal of the low-voltage battery BL in this order, and energy is stored in an excitation inductor LCH of the choke transformer 31. In the primary circuitry, the body diode D1 of the transistor S1 is turned on to allow the current I1 to flow through the one end of the winding 14A, i.e., the node N1, the body diode D1 of the transistor S1, the transistor S3 in the ON state, and the other end of the winding 14A, i.e., the node N2 in this order, and energy is stored in the leakage inductor LLK of the transformer 14. At this time, the primary circuitry is in a substantially short-circuited state as viewed from the secondary circuitry. The transformer voltages VTR1 and VTR2 are therefore substantially 0 V (parts (D) and (E) of FIG. 24).

Figure 26B:
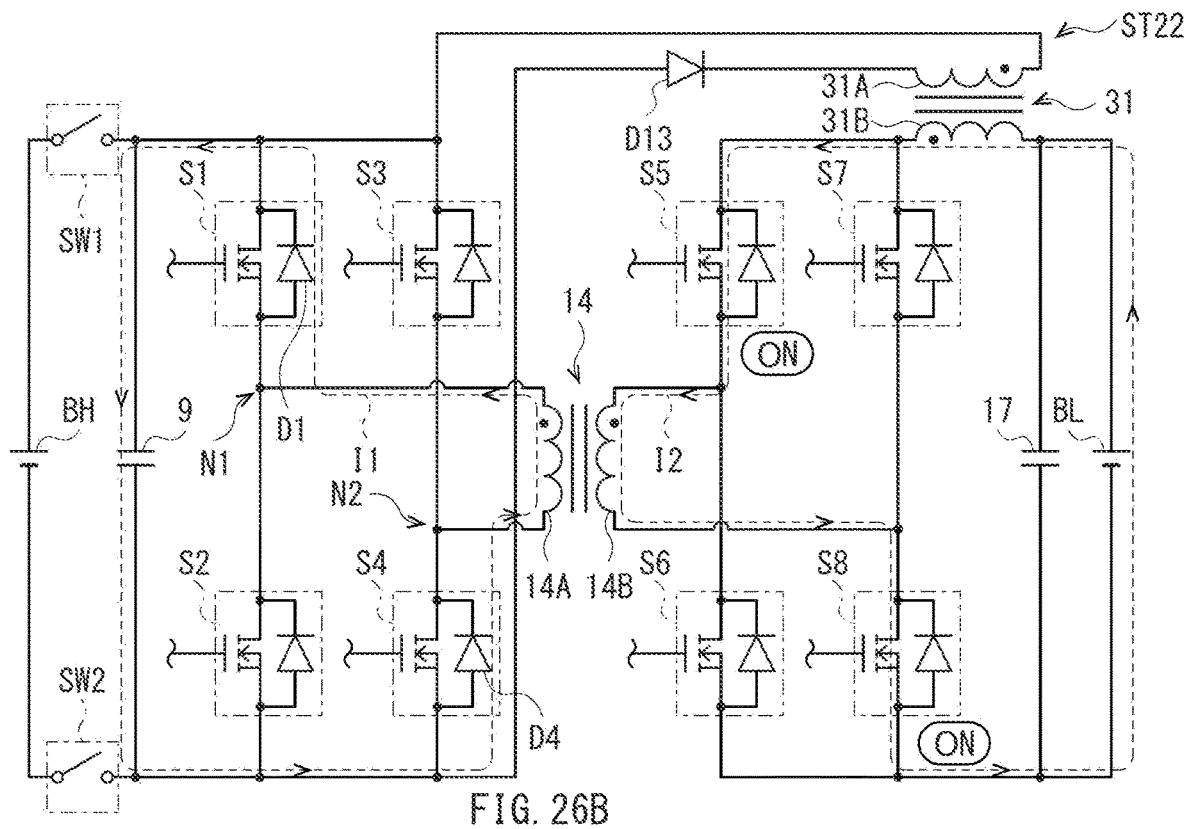
FIG. 26B is an explanatory diagram illustrating another operation state of the power conversion system illustrated in FIG. 22.

In the next operation state ST22, the controller 19 may change the gate signal GC from the high level to the low level (part (A) of FIG. 24). This changes the transistor S3 from the ON state to the OFF state (FIG. 26B). In the primary circuitry, the body diode D4 of the transistor S4 is turned on to allow the current I1 to flow through the one end of the winding 14A, i.e., the node N1, the body diode D1 of the transistor S1, the capacitor 9, the body diode D4 of the transistor S4, and the other end of the winding 14A, i.e., the node N2 in this order, and the charge current ICHG thus flows (part (B) of FIG. 24). In other words, the energy stored in the leakage inductor LLK of the transformer 14 is released and stored in the capacitor 9. In this way, the voltage VH increases (part (K) of FIG. 24). In the secondary circuitry, the transformer voltage VTR2 becomes a positive voltage (part (E) of FIG. 24), and the excitation current IM starts to flow through the transformer 14 (part (C) of FIG. 24). In a case where the power conversion system 1H performs the step-down operation, the inductor current IL increases. In a case where the power conversion system 1H performs the step-up operation, the inductor current IL decreases (part (F) of FIG. 24).

Figure 26C:
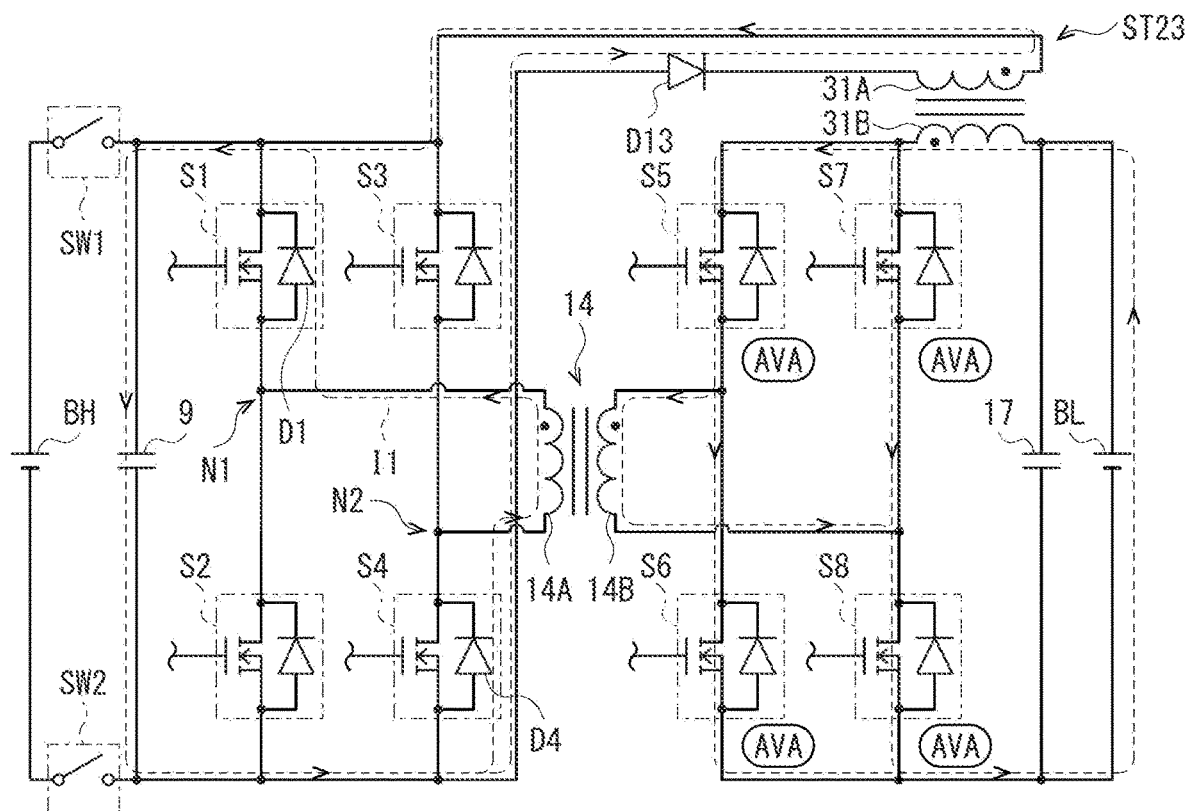
FIG. 26C is an explanatory diagram illustrating another operation state of the power conversion system illustrated in FIG. 22.

In the next operation state ST23 over a very small time period, the controller 19 may change the gate signal GF from the high level to the low level (part (A) of each of FIGS. 24 and 25). This changes the transistors S5 and S8 from the ON state to the OFF state (FIG. 26C). In the secondary circuitry, a counter-electromotive voltage occurs in the choke transformer 31 and the drain-to-source voltage of each of the transistors S5 to S8 increases to reach the avalanche breakdown voltage. As a result, the avalanche current flows through each of the transistors S5 to S8, bringing each of the transistors S5 to S8 into the avalanche breakdown state AVA. In this way, due to each of the transistors S5 to S8 coming into the avalanche breakdown state AVA, the transformer voltage VTR2 becomes substantially 0 V (part (E) of each of FIGS. 24 and 25). In the primary circuitry, continuing from the previous operation state ST22, the current I1 flows through the one end of the winding 14A, i.e., the node N1, the body diode D1 of the transistor S1, the capacitor 9, the body diode D4 of the transistor S4, and the other end of the winding 14A, i.e., the node N2 in this order. A counter-electromotive voltage of the leakage inductor LLK of the transformer 14 appears in the transformer voltage VTR1. Further, due to the counter-electromotive voltage of the choke transformer 31, a voltage occurs at the winding 31A of the choke transformer 31 (part (I) of each of FIGS. 24 and 25). This turns on the diode D13, thus causing the diode current ID to start flowing (part (H) of each of FIGS. 24 and 25).

Figure 26D:
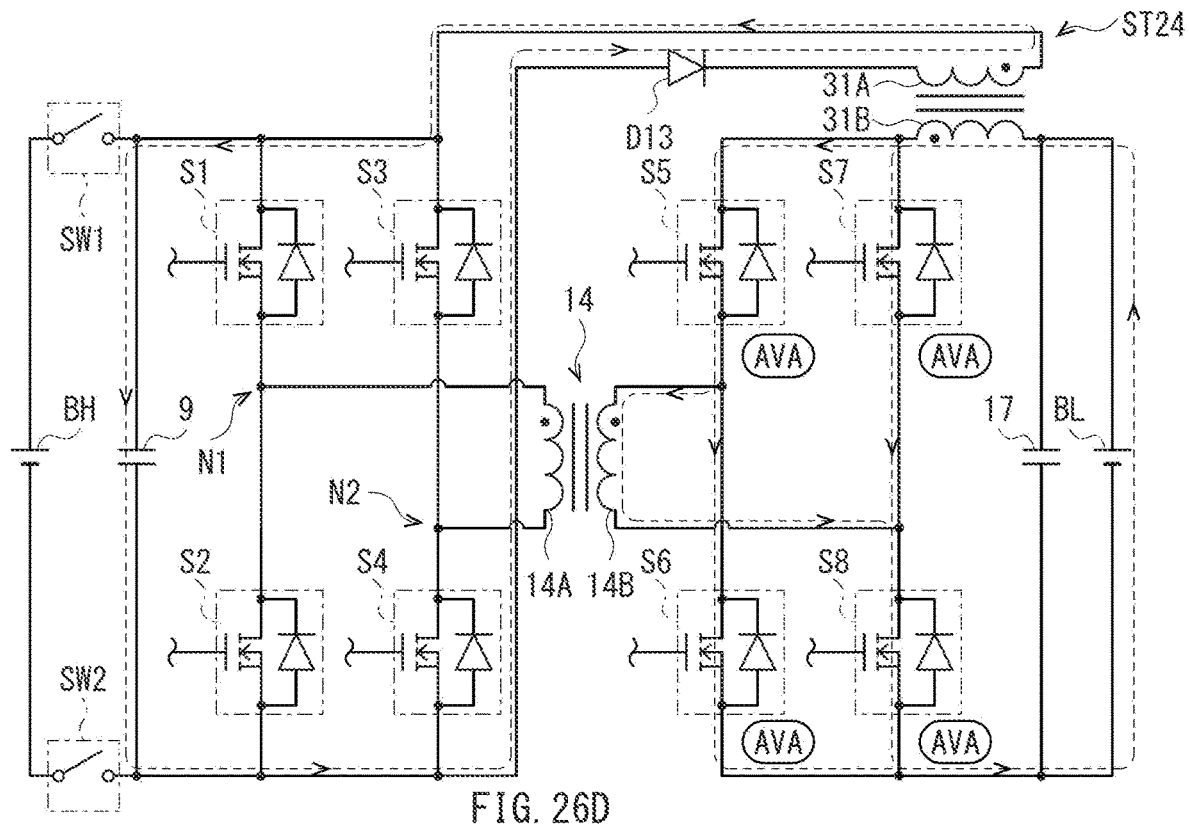
FIG. 26D is an explanatory diagram illustrating another operation state of the power conversion system illustrated in FIG. 22.

In the next operation state ST24 over a very small time period, in the primary circuitry, the release of the energy stored in the leakage inductor LLK of the transformer 14 ends, and the body diode D1 of the transistor S1 and the body diode D4 of the transistor S4 are turned off (FIG. 26D). Thus, in the primary circuitry, no current flows through the switching circuit 13. In the secondary circuitry, the transistors S5 to S8 each remain in the avalanche breakdown state AVA. The avalanche current flowing through the transistor S5 exceeds the avalanche current flowing through the transistor S6 by the excitation current IM. Likewise, the avalanche current flowing through the transistor S8 exceeds the avalanche current flowing through the transistor S7 by the excitation current IM. Therefore, the avalanche current flowing through each of the transistors S6 and S7 approaches 0 A faster than the avalanche current flowing through each of the transistors S5 and S8. Further, the diode D13 is in the ON state continuously from the previous operation state ST23, allowing the diode current ID to flow therethrough (part (H) of each of FIGS. 24 and 25). In other words, the energy stored in the excitation inductor LCH of the choke transformer 31 is released and stored in the capacitor 9. In this way, the charge current ICHG flows (part (B) of each of FIGS. 24 and 25) and the voltage VH increases (part (K) of FIG. 24).

Figure 26E:
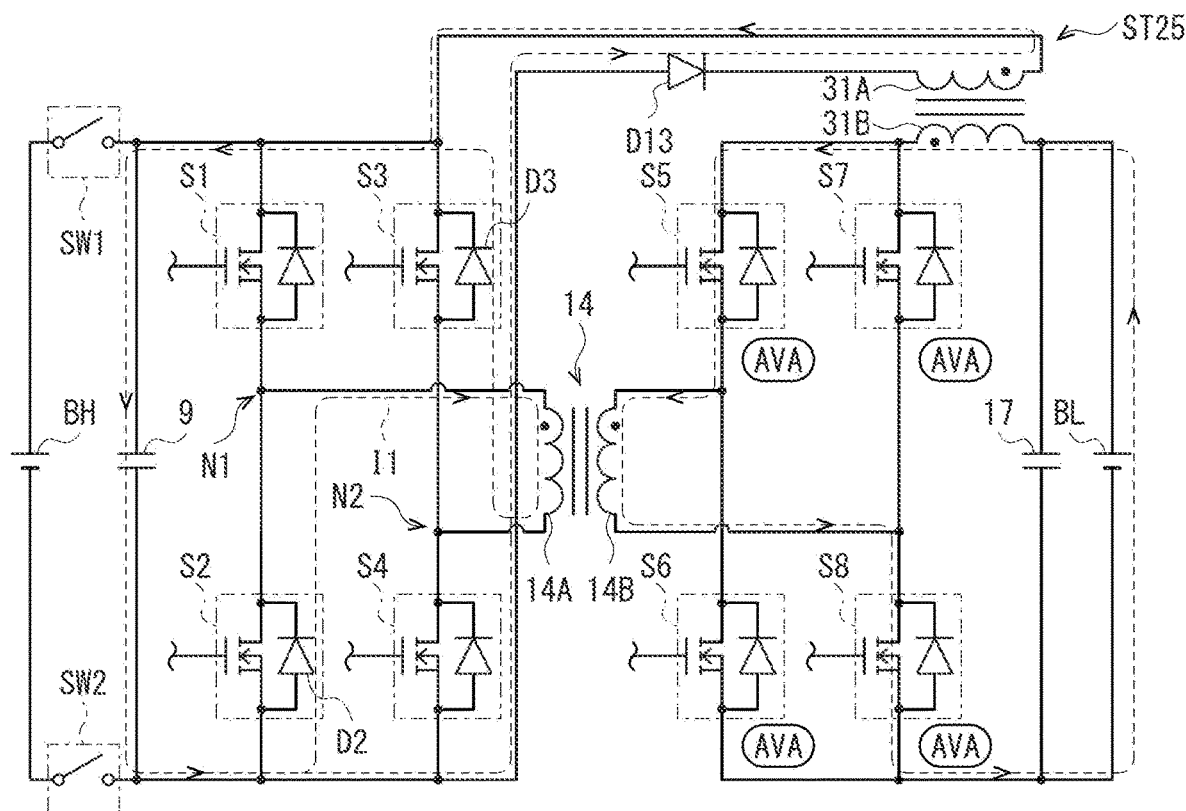
FIG. 26E is an explanatory diagram illustrating another operation state of the power conversion system illustrated in FIG. 22.

In the next operation state ST25 over a very small time period, the avalanche current flowing through each of the transistors S6 and S7 reaches 0 A, and the avalanche breakdown state AVA of each of the transistors S6 and S7 is thus cleared as illustrated in FIG. 26E. The transistors S5 and S8 remain in the avalanche breakdown state AVA. This causes the transformer voltages VTR1 and VTR2 to be negative voltages. As a result, in the primary circuitry, the body diode D2 of the transistor S2 and the body diode D3 of the transistor S3 are turned on to allow the current I1 to flow through the other end of the winding 14A, i.e., the node N2, the body diode D3 of the transistor S3, the capacitor 9, the body diode D2 of the transistor S2, and the one end of the winding 14A, i.e., the node N1 in this order. In other words, the energy stored in the excitation inductor LM of the transformer 14 is released and stored in the capacitor 9. Further, the diode D13 is continuously in the ON state, allowing the diode current ID to flow therethrough (part (H) of each of FIGS. 24 and 25). In other words, the energy stored in the excitation inductor LCH of the choke transformer 31 is released and stored in the capacitor 9. In this way, the charge current ICHG flows (part (B) of each of FIGS. 24 and 25) and the voltage VH increases (part (K) of FIG. 24).

Figure 26F:
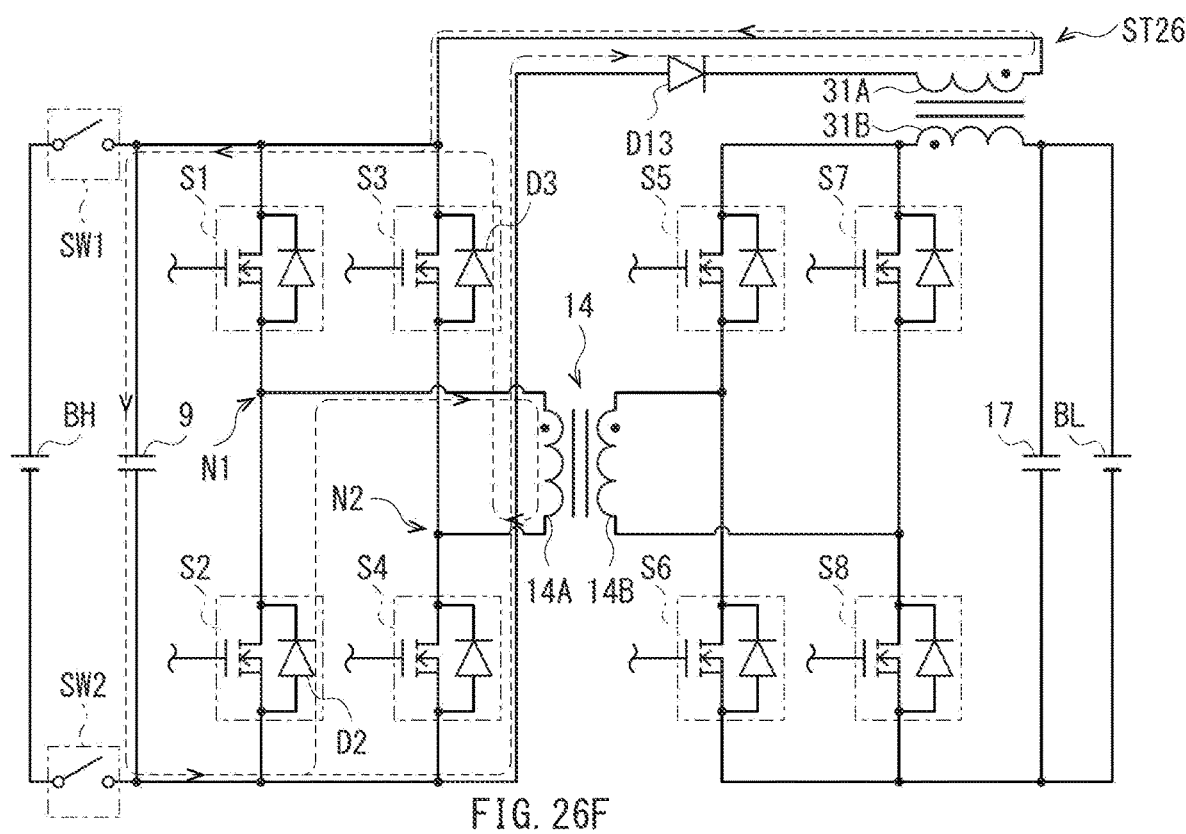
FIG. 26F is an explanatory diagram illustrating another operation state of the power conversion system illustrated in FIG. 22.

In the next operation state ST26, in the secondary circuitry, the release of energy stored in a leakage inductor LLKCH of the choke transformer 31 ends, and the avalanche breakdown state AVA of each of the transistors S5 and S8 is thus cleared (FIG. 26F). Accordingly, in the secondary circuitry, no current flows through the rectifier circuit 15. In the primary circuitry, continuing from the previous operation state ST25, the current I1 flows through the other end of the winding 14A, i.e., the node N2, the body diode D3 of the transistor S3, the capacitor 9, the body diode D2 of the transistor S2, and the one end of the winding 14A, i.e., the node N1 in this order. In other words, the energy stored in the excitation inductor LM of the transformer 14 is released and stored in the capacitor 9. Further, the diode D13 is continuously in the ON state, allowing the diode current ID to flow therethrough (part (H) of FIG. 24). In other words, the energy stored in the excitation inductor LCH of the choke transformer 31 is released and stored in the capacitor 9. In this way, the charge current ICHG flows (part (B) of FIG. 24) and the voltage VH increases (part (K) of FIG. 24).

Figure 26G:
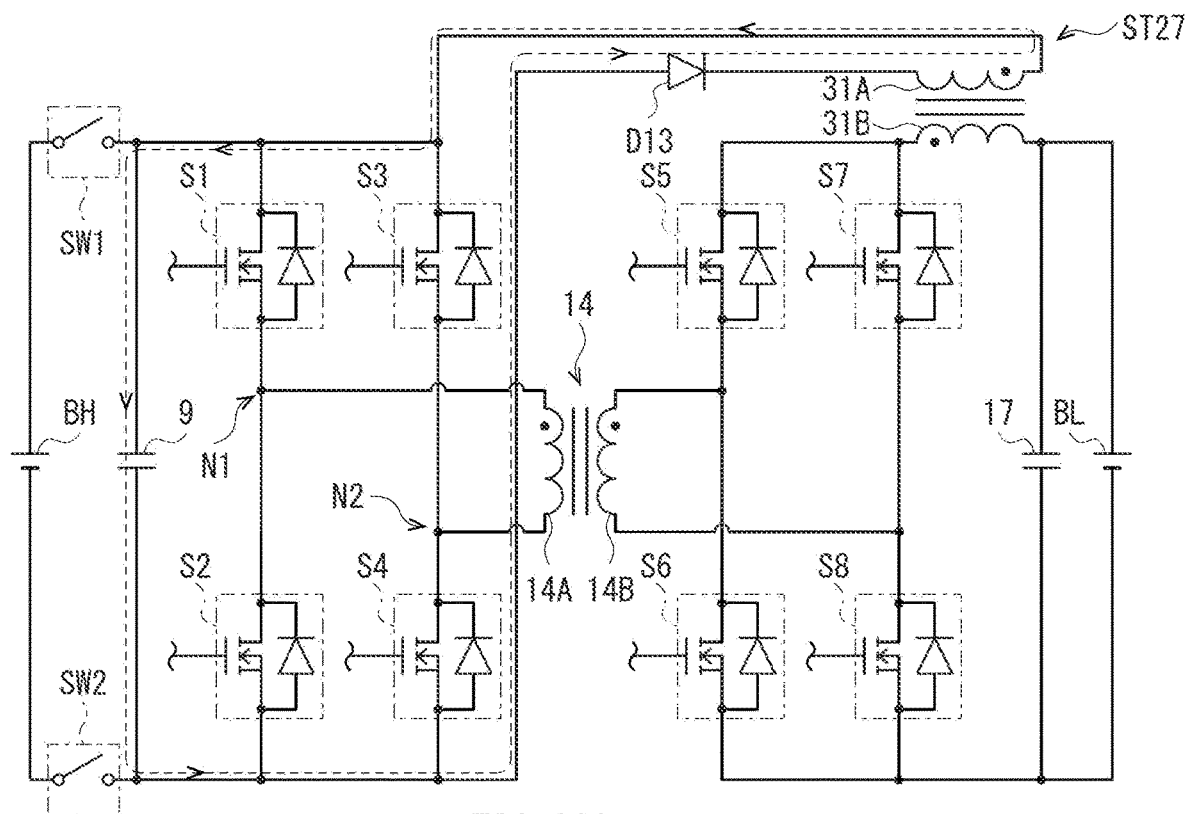
FIG. 26G is an explanatory diagram illustrating another operation state of the power conversion system illustrated in FIG. 22.

In the next operation state ST27, in the primary circuitry, the release of the energy stored in the excitation inductor LM of the transformer 14 ends, and the body diode D2 of the transistor S2 and the body diode D3 of the transistor S3 are turned off (FIG. 26G). Accordingly, in the primary circuitry, no current flows through the switching circuit 13. Further, the diode D13 is continuously in the ON state, allowing the diode current ID to flow therethrough (part (H) of FIG. 24). In other words, the energy stored in the excitation inductor LCH of the choke transformer 31 is released and stored in the capacitor 9. In this way, the charge current ICHG flows (part (B) of FIG. 24) and the voltage VH increases (part (K) of FIG. 24).

Figure 26H:
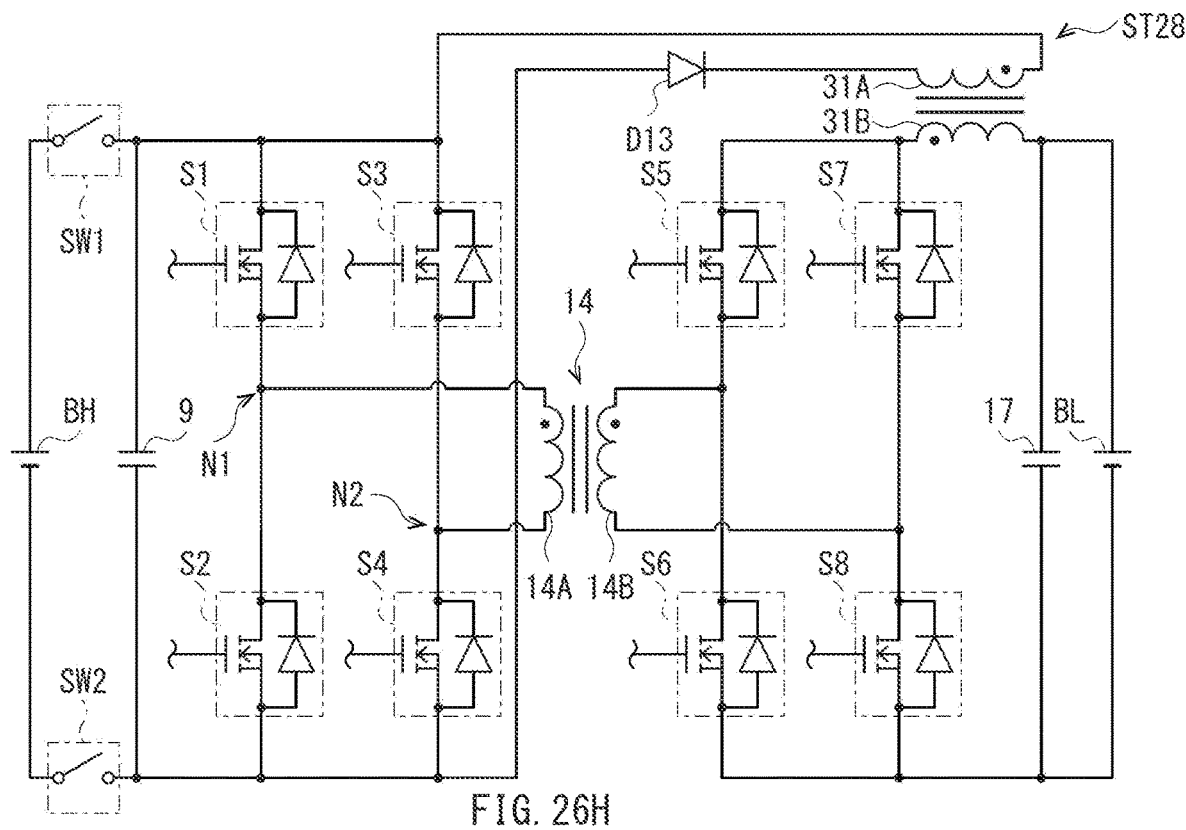
FIG. 26H is an explanatory diagram illustrating another operation state of the power conversion system illustrated in FIG. 22.

In the next operation state ST28, in the primary circuitry, the release of the energy stored in the excitation inductor LCH of the choke transformer 31 ends, and the diode D13 is turned off (FIG. 26H). Accordingly, no current flows through the primary circuitry. In other words, in the operation state ST28, any current flows through neither the primary circuitry nor the secondary circuitry.

In this way, during the period from the timing t41 to the timing t42, the capacitor 9 is charged and the voltage VH thus increases. The same applies to the period from the timing t42 to the timing t43. Note that the operations described above are one example. For example, if the duty ratio DS increases to approach "0.5", the operation state ST28, for example, among the operation states ST21 to ST28, can become absent. In the power conversion system 1H, as illustrated in FIG. 23, repeating such operations performed from the timing t41 to the timing t43 causes the capacitor 9 to be gradually charged and thus causes the voltage VH to gradually increase.

In the power conversion system 1H according to the present modification example, the choke transformer 31 may be provided in place of the choke inductor 16 (FIG. 1) of the foregoing example embodiment. According to the power conversion system 1H, this makes it possible for energy that is consumed in the case where, for example, the transistors S5 to S8 are in the avalanche breakdown state AVA to be efficiently transferred to the primary circuitry and regenerated. Further, according to the power conversion system 1H, it is possible to shorten the duration of the avalanche breakdown state AVA of the transistors S5 to S8, for example.

Figure 22:
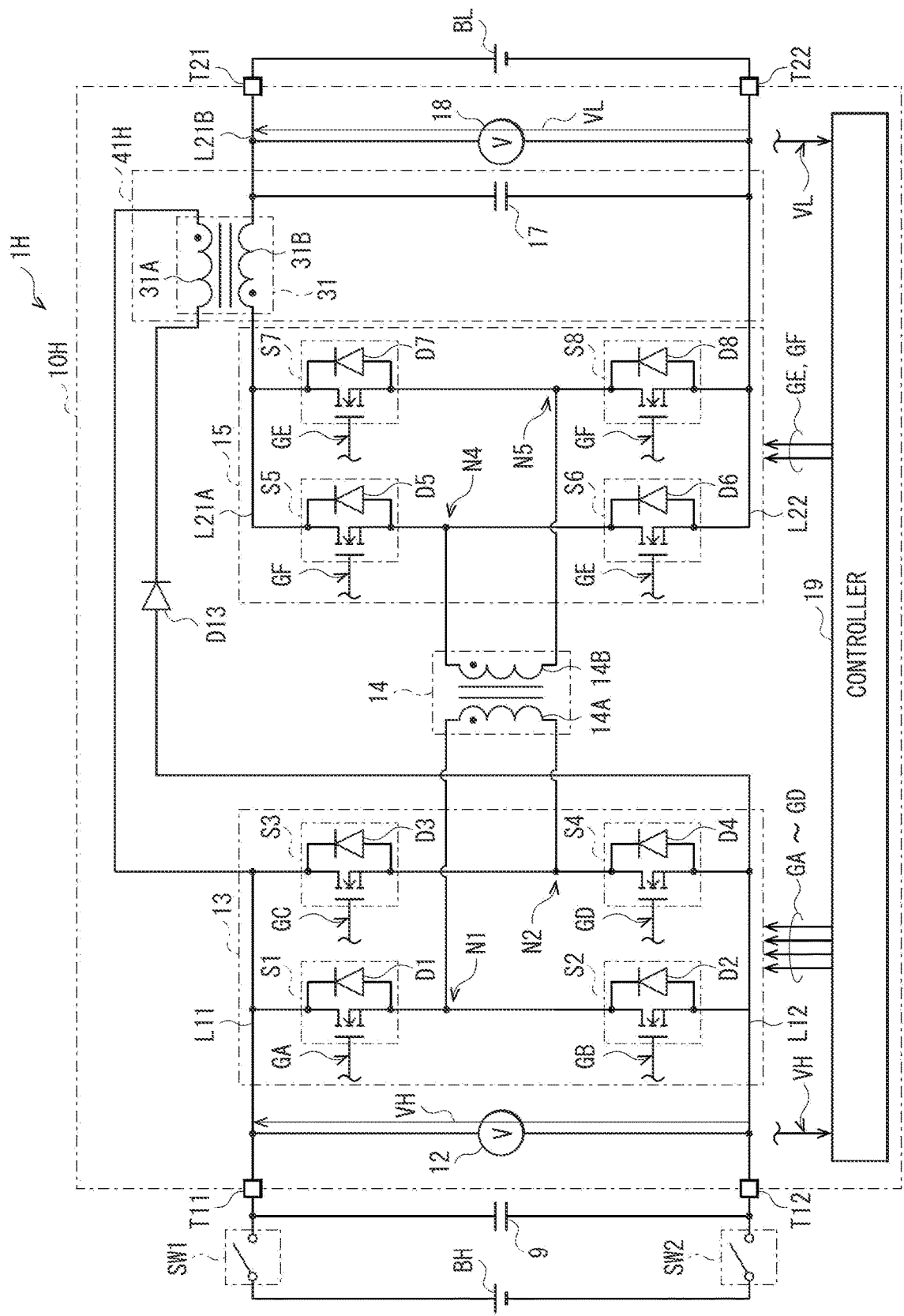
FIG. 22 is a circuit diagram illustrating a configuration example of a power conversion system according to another modification example.
Figure 27:
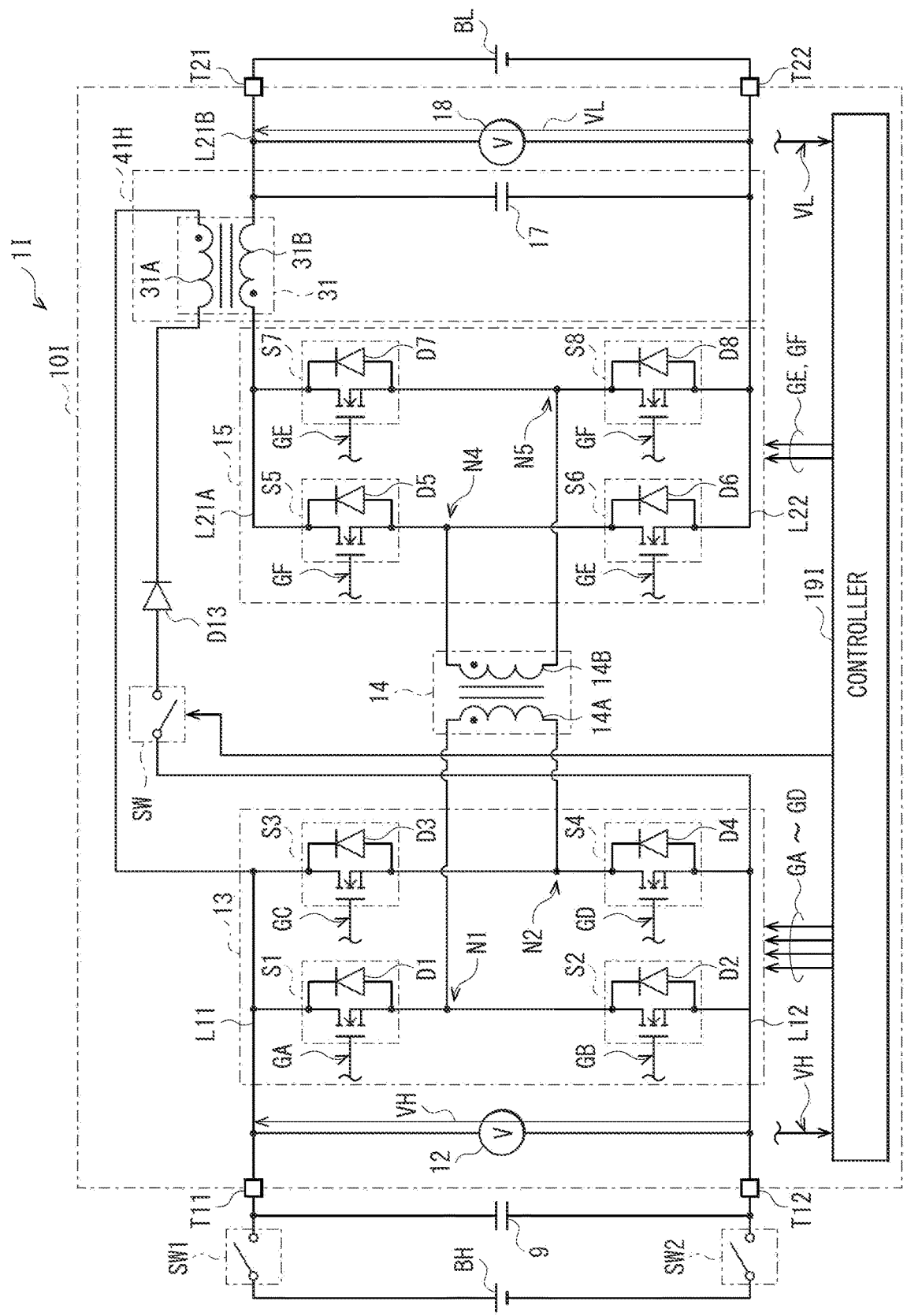
FIG. 27 is a circuit diagram illustrating a configuration example of a power conversion system according to another modification example.
Figure 28:
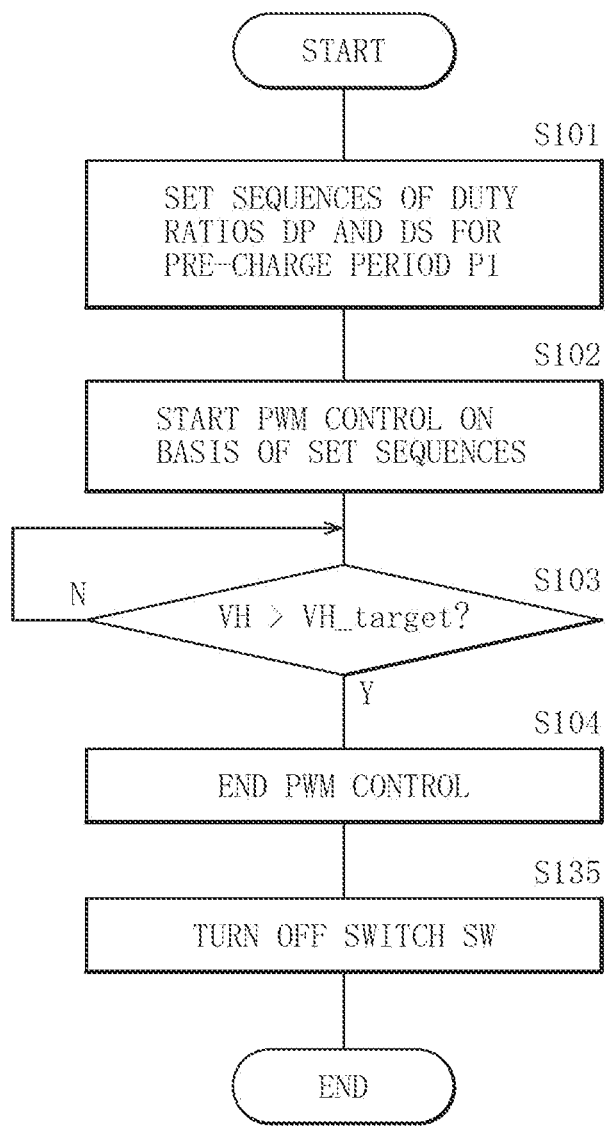
FIG. 28 is a flowchart illustrating an operation example of the power conversion system illustrated in FIG. 27.

Although FIG. 22 illustrates an example in which the diode D13 and the winding 31A of the choke transformer 31 are provided on a path coupling the reference voltage line L12 and the voltage line L11 to each other, this is non-limiting. For example, a switch SW may further be provided on the path, as in a power conversion system 1I illustrated in FIG. 27. The power conversion system 1I includes a power conversion apparatus 10I. The power conversion apparatus 10I may include the switch SW and a controller 19I. One end of the switch SW may be coupled to the reference voltage line L12, and another end of the switch SW may be coupled to the anode of the diode D13. The switch SW may operate in accordance with instructions provided by the controller 19I, and may couple the anode of the diode D13 to the reference voltage line L12 by being turned on. Like the controller 19 according to the foregoing example embodiment, the controller 19I may be configured to control the operation of the power conversion apparatus 10I by controlling the operations of the switching circuit 13 and the rectifier circuit 15 on the basis of the voltage VH detected by the voltage sensor 12 and the voltage VL detected by the voltage sensor 18. The controller 19I may turn on the switch SW in the pre-charge operation and turn off the switch SW in the power conversion operation. In a specific but non-limiting example, as illustrated in FIG. 28, in the case where the voltage VH exceeds the target voltage VH_target ("Y" in step S103), the controller 19I may end the PWM control (step S104) and turn off the switch SW (step S135). The switch SW may correspond to a specific but non-limiting example of a "switch" in one embodiment of the technology.

Figure 29:
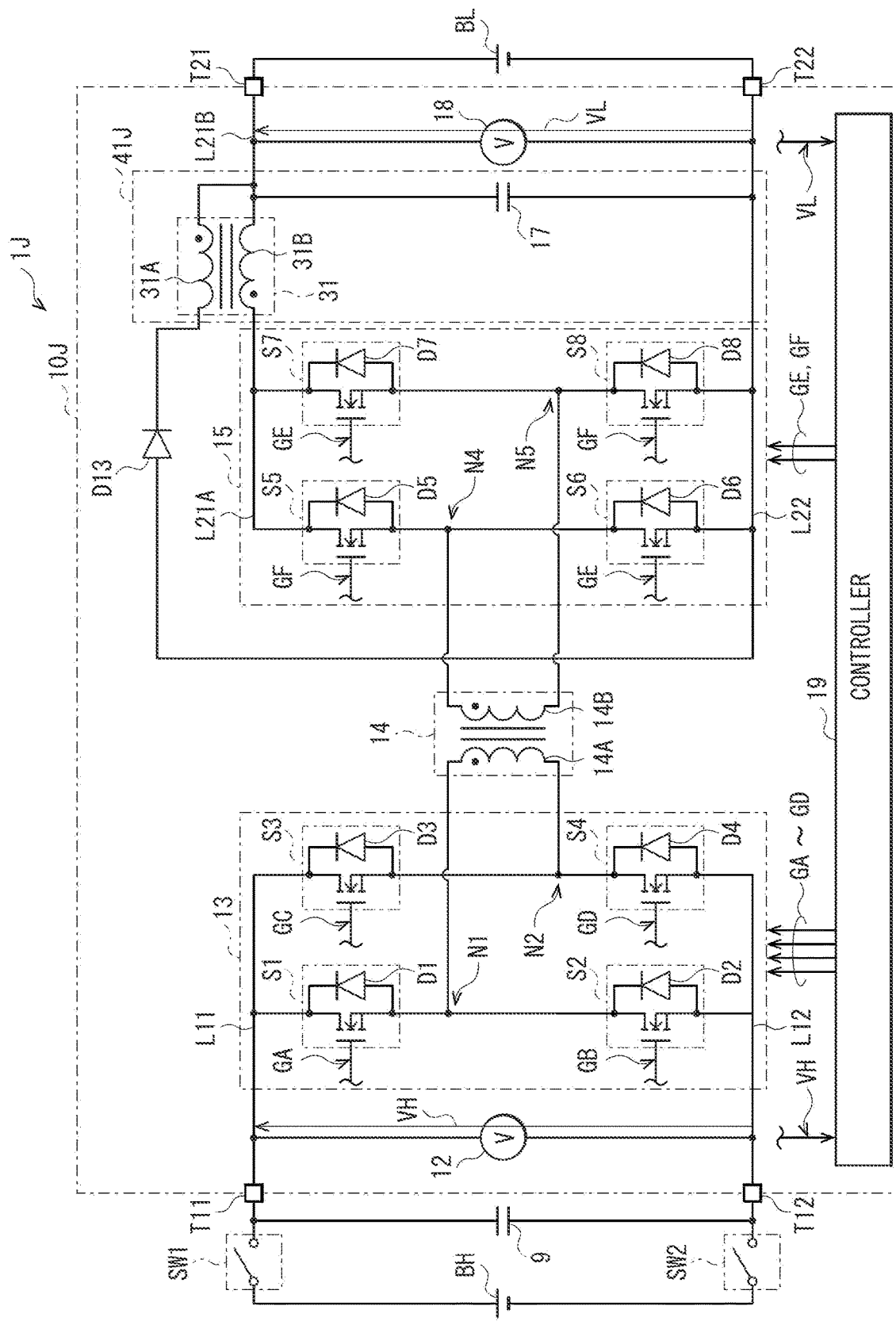
FIG. 29 is a circuit diagram illustrating a configuration example of a power conversion system according to another modification example.

FIG. 29 illustrates a configuration example of another power conversion system 1J according to the present modification example. The power conversion system 1J may be a system in which both ends of the winding 31A of the choke transformer 31 are coupled to the secondary circuitry. In summary, in the power conversion system 1H illustrated in FIG. 22, both ends of the winding 31A of the choke transformer 31 may be coupled to the primary circuitry closer to the high-voltage battery BH relative to the transformer 14, whereas in the power conversion system 1J according to the present modification example, both ends of the winding 31A of the choke transformer 31 may be coupled to the secondary circuitry closer to the low-voltage battery BL relative to the transformer 14. The power conversion system 1J includes a power conversion apparatus 10J. The power conversion apparatus 10J may include a smoothing circuit 41J and the diode D13. The smoothing circuit 41J may include the choke transformer 31. The choke transformer 31 may include the windings 31A and 31B. The one end of the winding 31A may be coupled to the voltage line L21B, and the other end of the winding 31A may be coupled to the cathode of the diode D13. The one end of the winding 31B may be coupled to the voltage line L21A, and the other end of the winding 31B may be coupled to the voltage line L21B. The anode of the diode D13 may be coupled to the reference voltage line L22, and the cathode of the diode D13 may be coupled to the other end of the winding 31A. The choke transformer 31 may correspond to a specific but non-limiting example of the "choke transformer" in one embodiment of the technology. The diode D13 may correspond to a specific but non-limiting example of the "third diode" in one embodiment of the technology.

Figure 30:
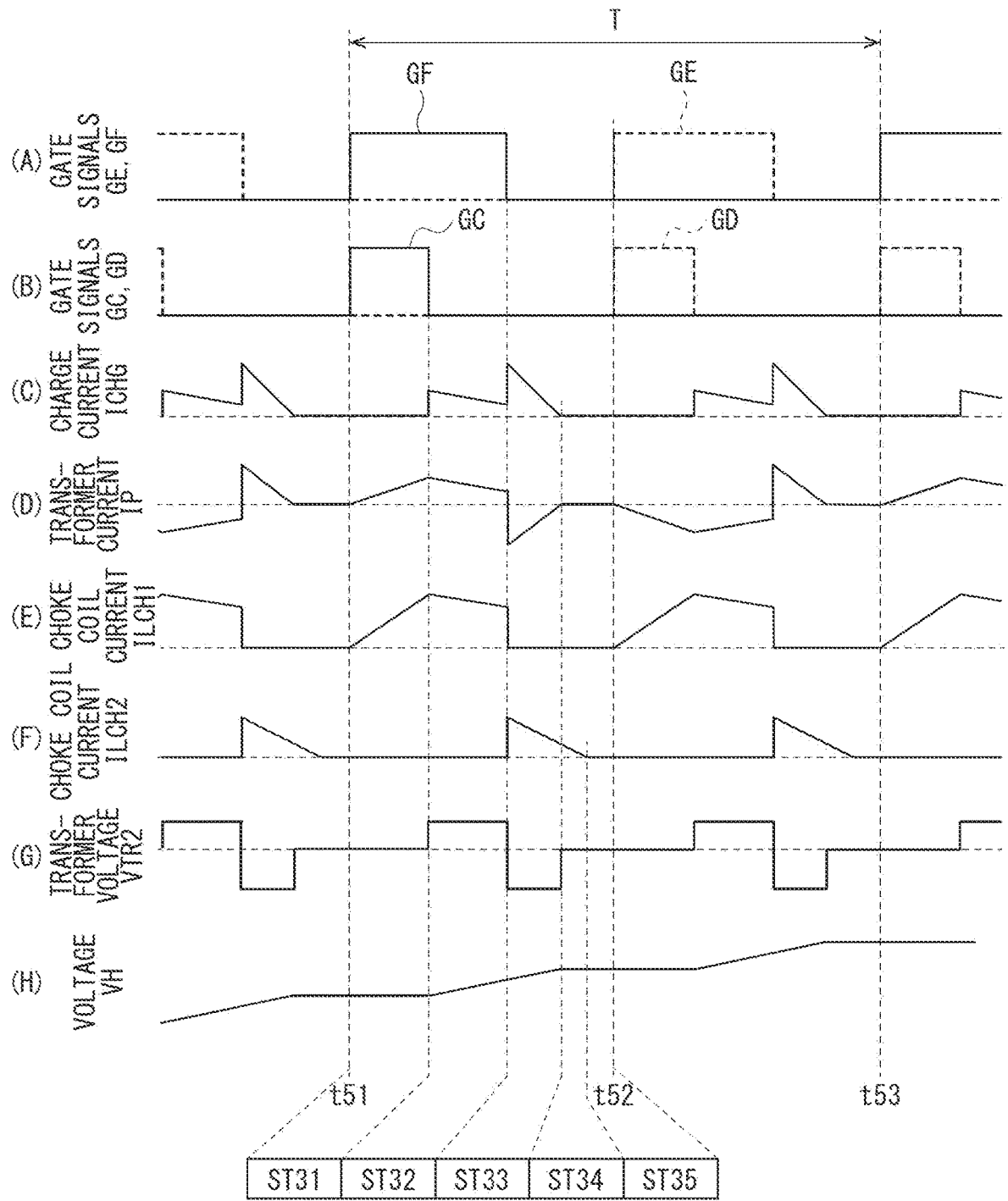
FIG. 30 is a timing waveform chart illustrating an operation example of the power conversion system illustrated in FIG. 29.

FIG. 30 illustrates an example of the pre-charge operation in the power conversion system 1J. Part (A) of FIG. 30 illustrates the waveforms of the gate signals GE and GF. Part (B) of FIG. 30 illustrates the waveforms of the gate signals GC and GD. Part (C) of FIG. 30 illustrates the waveform of the charge current ICHG, i.e., a current flowing into the capacitor 9. Part (D) of FIG. 30 illustrates a waveform of a transformer current IP, i.e., a current flowing through the winding 14A of the transformer 14. Part (E) of FIG. 30 illustrates a waveform of a coil current ILCH1, i.e., a current flowing through the winding 31B of the choke transformer 31. Part (F) of FIG. 30 illustrates a waveform of a coil current ILCH2, i.e., a current flowing through the winding 31A of the choke transformer 31. Part (G) of FIG. 30 illustrates the waveform of the transformer voltage VTR2, i.e., a voltage of the winding 14B of the transformer 14 at the node N4 relative to that at the node N5. Part (H) of FIG. 30 illustrates the waveform of the voltage VH.

As illustrated in parts (A) and (B) of FIG. 30, the controller 19 may change the gate signals GC and GF from the low level to the high level at a timing t51. Further, the controller 19 may change the gate signal GC from the high level to the low level at a timing at which the time corresponding to the duty ratio DP has elapsed from the timing t51, and may change the gate signal GF from the high level to the low level at a timing at which the time corresponding to the duty ratio DS has elapsed from the timing t51. Next, the controller 19 may change the gate signals GD and GE from the low level to the high level at a timing t52. Further, the controller 19 may change the gate signal GD from the high level to the low level at a timing at which the time corresponding to the duty ratio DP has elapsed from the timing t52, and may change the gate signal GE from the high level to the low level at a timing at which the time corresponding to the duty ratio DS has elapsed from the timing t52. The controller 19 may maintain the gate signals GA and GB at the low level. In the power conversion system 1J, the capacitor 9 may be charged by repeating the operations performed from the timing t51 to a timing t53 while changing the duty ratios DP and DS. This causes the voltage VH to gradually increase as illustrated in part (H) of FIG. 30.

A detailed description will be given below of operations based on the gate signals GC and GF during a period from the timing t51 to the timing t52 by way of example. Note that the same applies to operations based on the gate signals GD and GE during a period from the timing t52 to the timing t53. The power conversion system 1J can take five operation states ST31 to ST35 during the period from the timing t51 to the timing t52. Note that the description here omits the description of an operation state over a very small time period such as the operation states ST23 to ST25 in FIG. 24. The operation states ST of the power conversion system 1J may change in the order of the operation state ST31, the operation state ST32, . . . , and the operation state ST35.

FIGS. 31A to 31E illustrate operations of the power conversion system 1J in the five operation states ST31 to ST35.

Figure 31A:
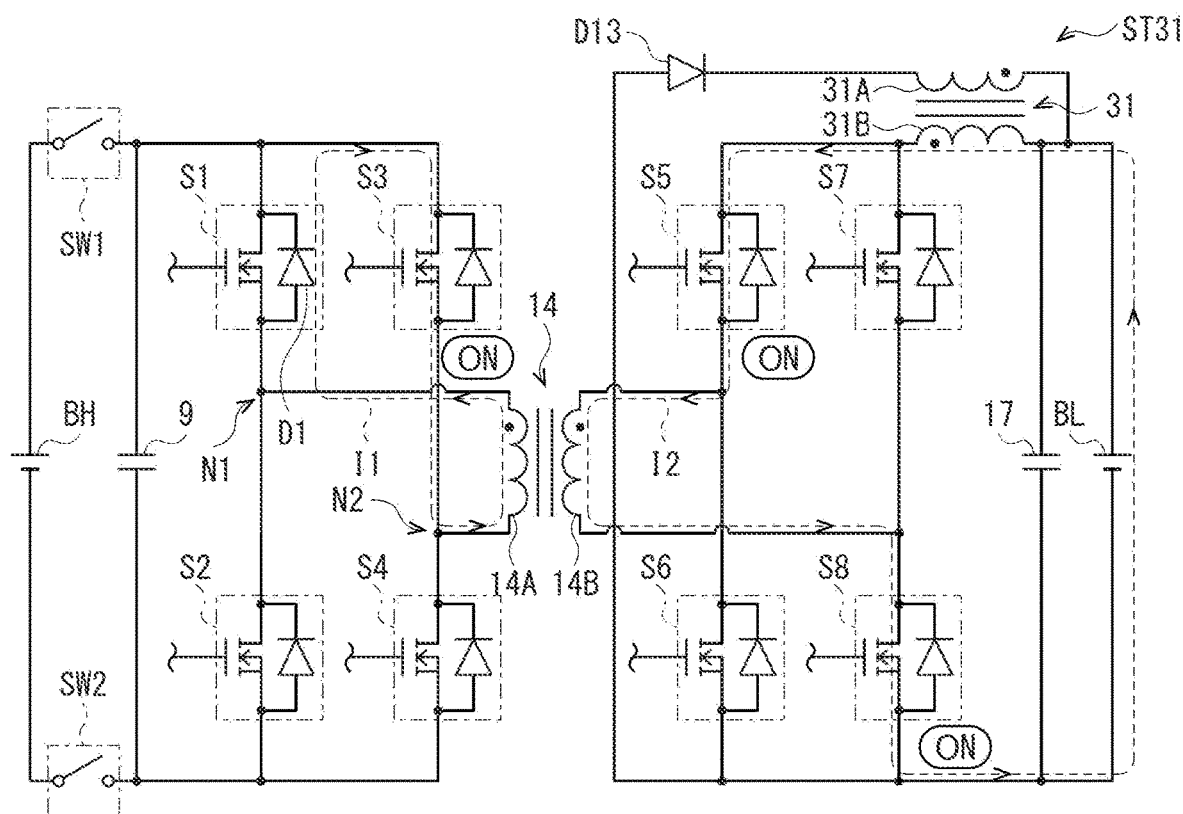
FIG. 31A is an explanatory diagram illustrating an operation state of the power conversion system illustrated in FIG. 29.

In the operation state ST31, the controller 19 may set the gate signals GC and GF at the high level and set the gate signals GA, GB, GD, and GE at the low level (FIG. 31A). This turns on the transistors S3, S5, and S8 and turns off the transistors S1, S2, S4, S6, and S7 (FIG. 31A). In the secondary circuitry, the current I2 flows through the positive terminal of the low-voltage battery BL, the winding 31B of the choke transformer 31, the transistor S5 in the ON state, the winding 14B, the transistor S8 in the ON state, and the negative terminal of the low-voltage battery BL in this order, and energy is stored in the excitation inductor LCH of the choke transformer 31. In the primary circuitry, the body diode D1 of the transistor S1 is turned on to allow the current I1 to flow through the one end of the winding 14A, i.e., the node N1, the body diode D1 of the transistor S1, the transistor S3 in the ON state, and the other end of the winding 14A, i.e., the node N2 in this order, and energy is stored in the leakage inductor LLK of the transformer 14. At this time, the primary circuitry is in a substantially short-circuited state as viewed from the secondary circuitry. The transformer voltage VTR2 is therefore substantially 0 V (part (G) of FIG. 30).

Figure 31B:
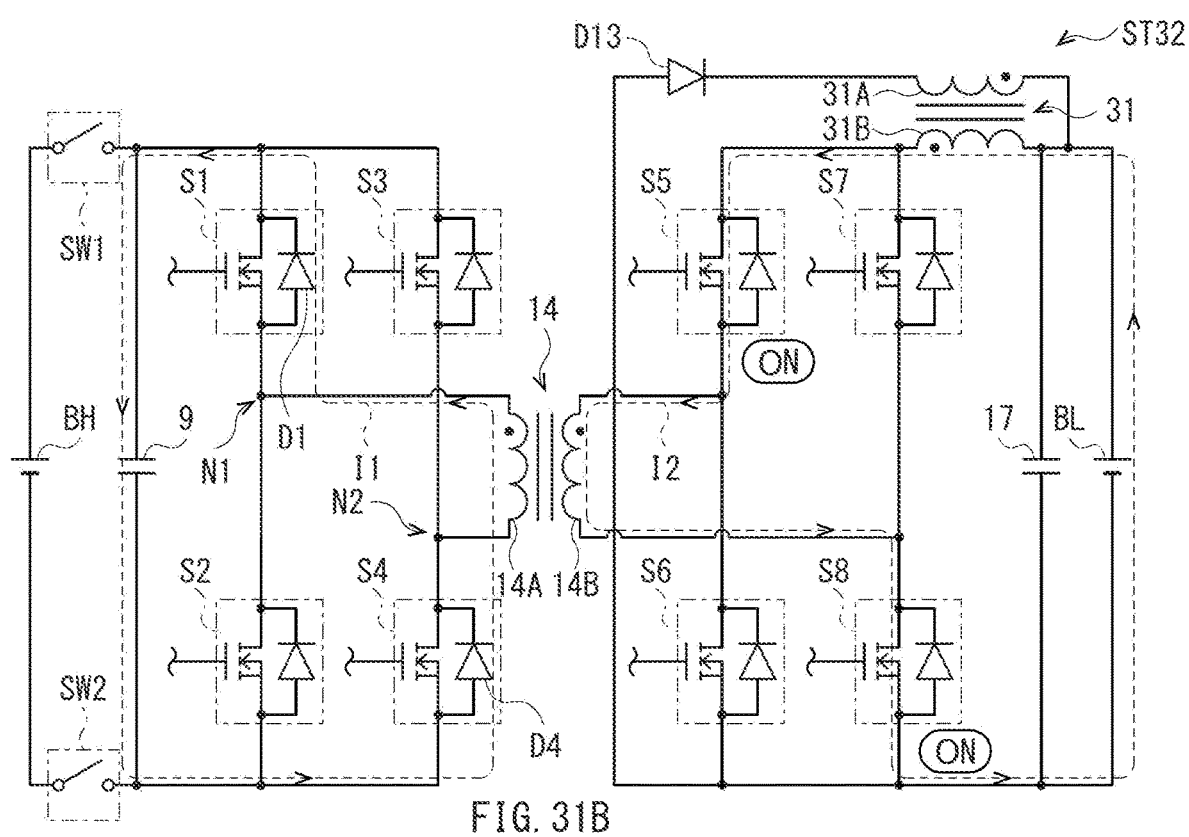
FIG. 31B is an explanatory diagram illustrating an operation state of the power conversion system illustrated in FIG. 29.

In the next operation state ST32, the controller 19 may change the gate signal GC from the high level to the low level (part (B) of FIG. 30). This changes the transistor S3 from the ON state to the OFF state (FIG. 31B). In the primary circuitry, the body diode D4 of the transistor S4 is turned on to allow the current I1 to flow through the one end of the winding 14A, i.e., the node N1, the body diode D1 of the transistor S1, the capacitor 9, the body diode D4 of the transistor S4, and the other end of the winding 14A, i.e., the node N2 in this order, and the charge current ICHG thus flows (part (C) of FIG. 30). In other words, the energy stored in the leakage inductor LLK of the transformer 14 is released and stored in the capacitor 9. In this way, the voltage VH increases (part (H) of FIG. 30). In the secondary circuitry, the transformer voltage VTR2 becomes a positive voltage (part (G) of FIG. 30). In a case where the power conversion system 1J performs the step-down operation, a choke coil current ILCH1 increases. In a case where the power conversion system 1J performs the step-up operation, the choke coil current ILCH1 decreases (part (E) of FIG. 30).

Figure 31C:
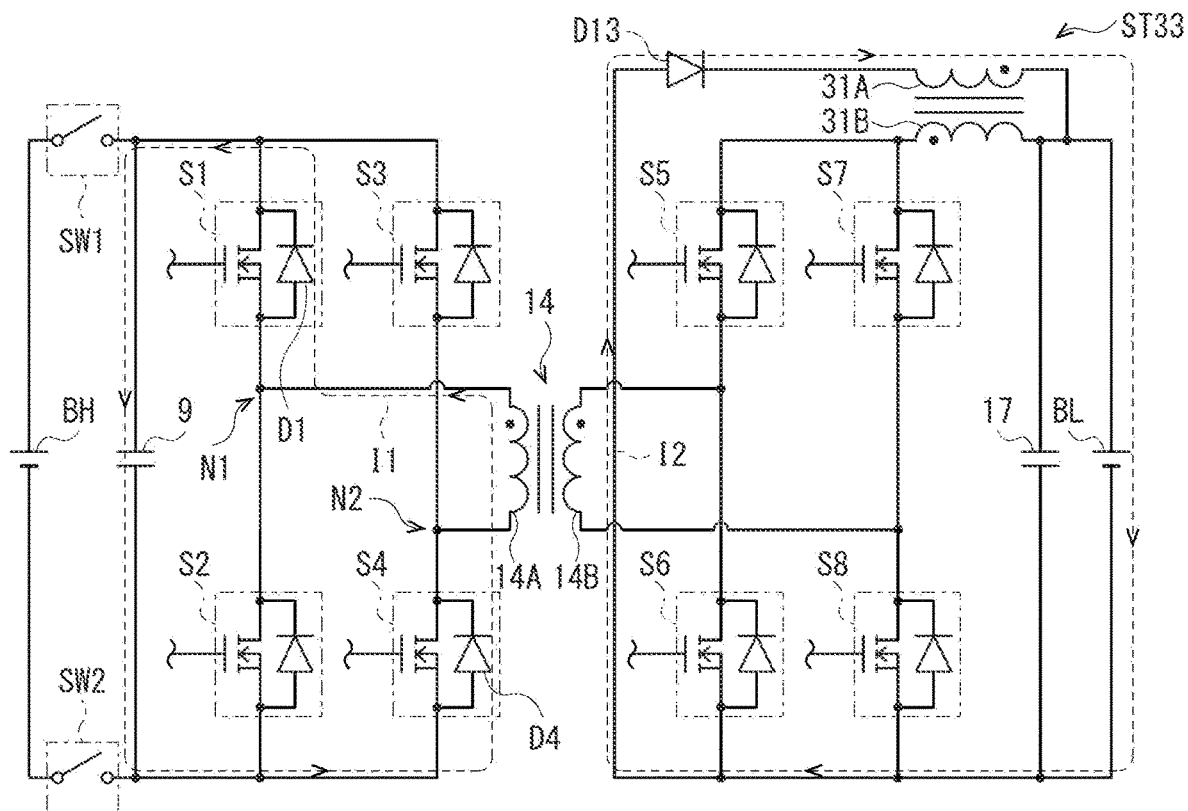
FIG. 31C is an explanatory diagram illustrating an operation state of the power conversion system illustrated in FIG. 29.

In the next operation state ST33, the controller 19 may change the gate signal GF from the high level to the low level (part (A) of FIG. 30). This changes the transistors S5 and S8 from the ON state to the OFF state (FIG. 31C). In the primary circuitry, continuing from the previous operation state ST32, the current I1 flows through the one end of the winding 14A, i.e., the node N1, the body diode D1 of the transistor S1, the capacitor 9, the body diode D4 of the transistor S4, and the other end of the winding 14A, i.e., the node N2 in this order. Accordingly, the voltage VH increases continuously (part (H) of FIG. 30). In the secondary circuitry, a counter-electromotive voltage occurs in the choke transformer 31, and the counter-electromotive voltage causes a voltage to occur at the winding 31A of the choke transformer 31. The diode D13 is thereby turned on to allow the current I2 to flow through the winding 31A, the low-voltage battery BL, the diode D13, and the winding 31A in this order, and a choke coil current ILCH2 thus flows (part (F) of FIG. 30).

Figure 31D:
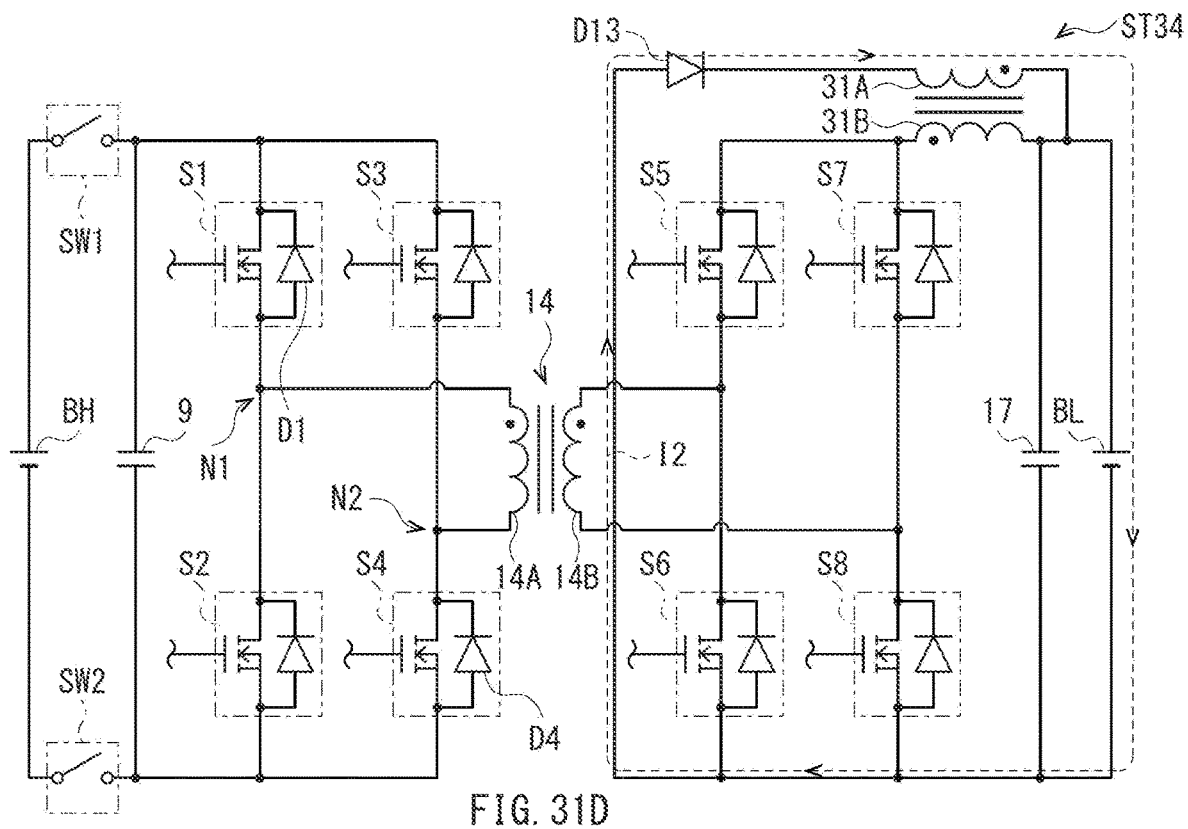
FIG. 31D is an explanatory diagram illustrating an operation state of the power conversion system illustrated in FIG. 29.

In the next operation state ST34, in the primary circuitry, the release of excitation energy of the transformer 14 ends, and the body diode D1 of the transistor S1 and the body diode D4 of the transistor S4 are turned off (FIG. 31D). Thus, in the primary circuitry, no current flows through the switching circuit 13. In the secondary circuitry, the diode D13 is in the ON state continuously from the previous operation state ST33, allowing the choke coil current ILCH2 to flow therethrough (part (F) of FIG. 30).

Figure 31E:
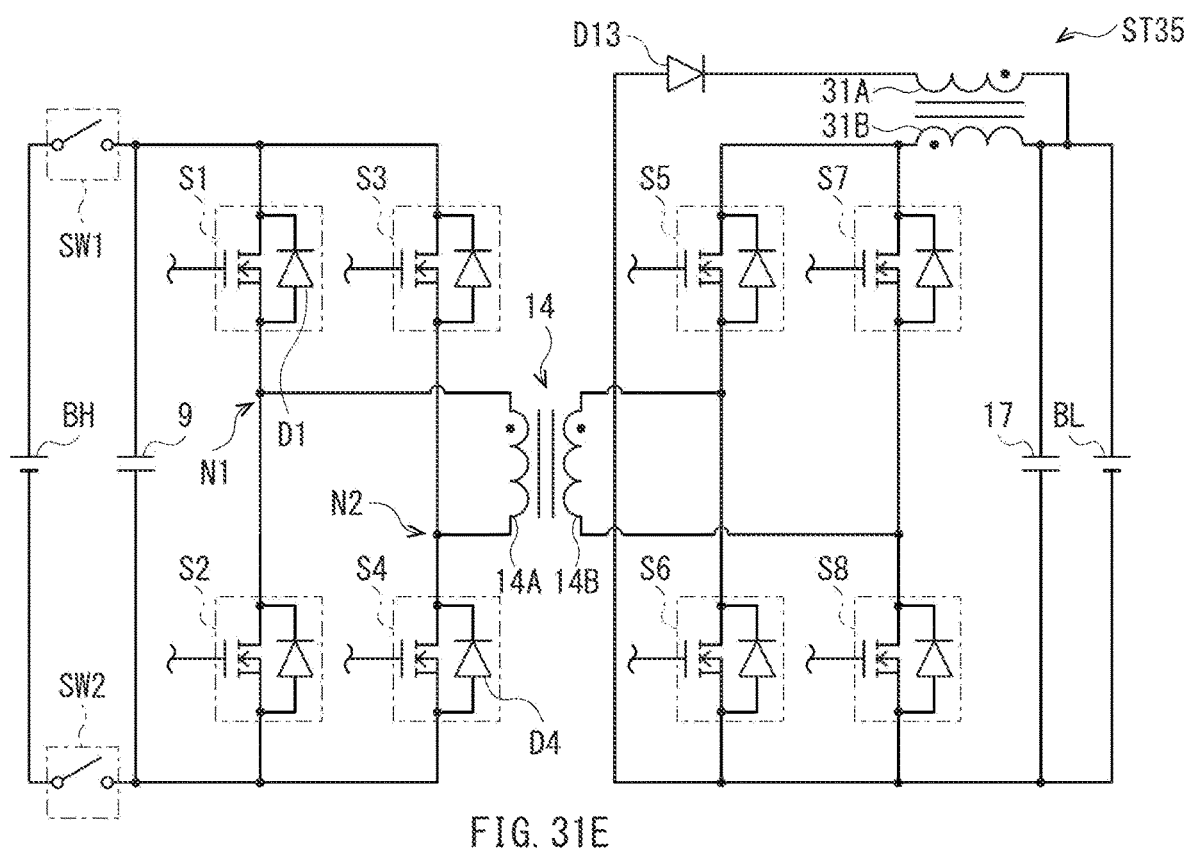
FIG. 31E is an explanatory diagram illustrating an operation state of the power conversion system illustrated in FIG. 29.

In the next operation state ST35, in the secondary circuitry, the release of the energy stored in the excitation inductor LCH of the choke transformer 31 ends, and the diode D13 is turned off (FIG. 31E). Accordingly, no current flows through the secondary circuitry. In other words, in the operation state S35, any current flows through neither the primary circuitry nor the secondary circuitry.

In this way, during the period from the timing t51 to the timing t52, the capacitor 9 is charged and the voltage VH thus increases. The same applies to the period from the timing t52 to the timing t53.

Figure 32:
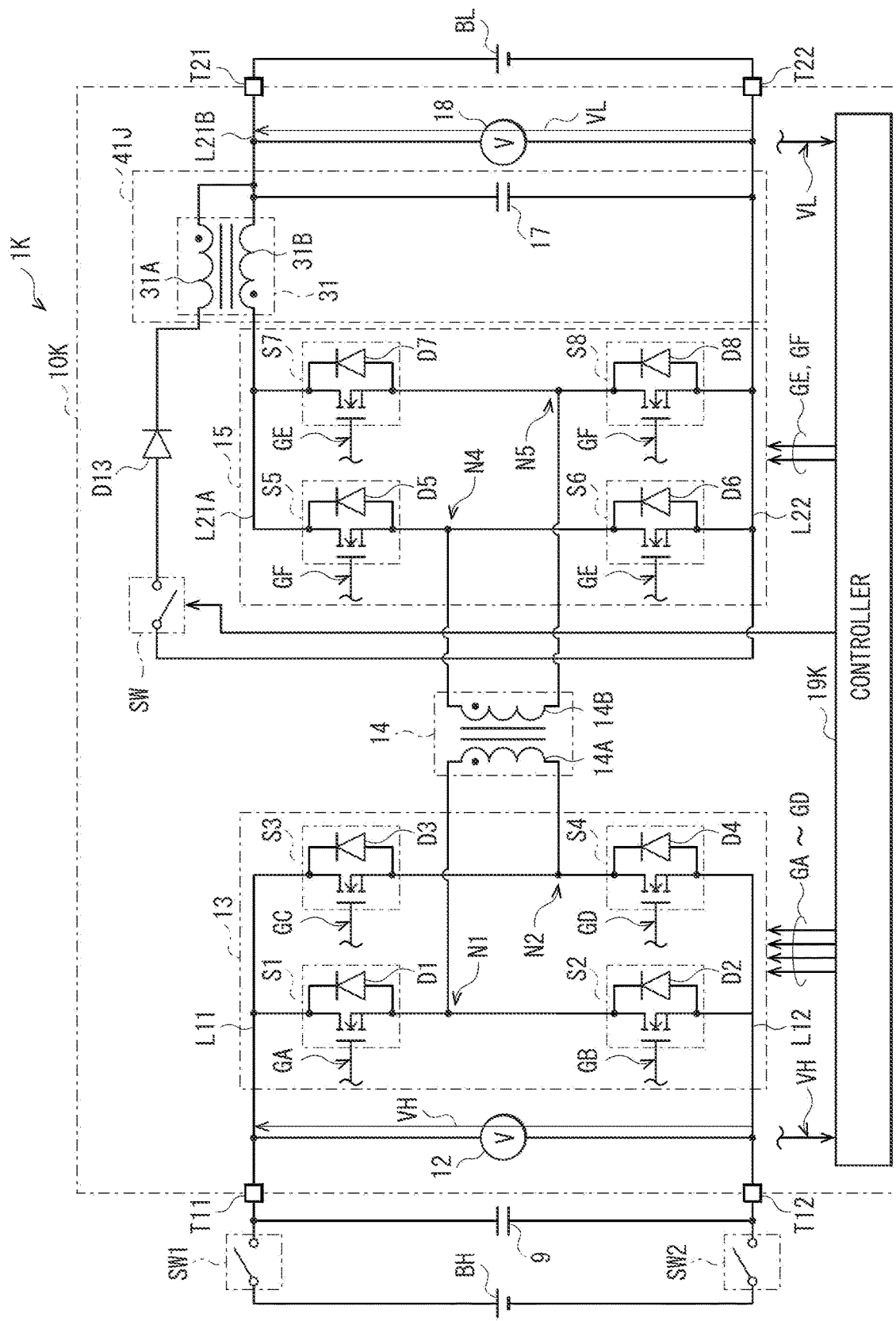
FIG. 32 is a circuit diagram illustrating a configuration example of a power conversion system according to another modification example.

Although FIG. 29 illustrates an example in which the diode D13 and the winding 31A of the choke transformer 31 are provided on the path coupling the reference voltage line L22 and the voltage line L21B to each other, this is non-limiting. For example, the switch SW may further be provided on the path, as in a power conversion system 1K illustrated in FIG. 32. The power conversion system 1K includes a power conversion apparatus 10K. The power conversion apparatus 10K may include the switch SW and a controller 19K. The one end of the switch SW may be coupled to the reference voltage line L22, and the other end of the switch SW may be coupled to the anode of the diode D13. The switch SW may operate in accordance with instructions provided by the controller 19K, and may couple the anode of the diode D13 to the reference voltage line L22 by being turned on. Like the controller 19 according to the foregoing example embodiment, the controller 19K may be configured to control the operation of the power conversion apparatus 10K by controlling the operations of the switching circuit 13 and the rectifier circuit 15 on the basis of the voltage VH detected by the voltage sensor 12 and the voltage VL detected by the voltage sensor 18. The controller 19K may turn on the switch SW in the pre-charge operation, and may turn off the switch SW in the power conversion operation.

Modification Example 10

In the foregoing example embodiment, as illustrated in FIG. 1, the rectifier circuit 15 may be configured by a full-bridge circuit; however, this is non-limiting. Alternatively, for example, a so-called center-tapped power conversion system may be employed. Such a modification example will be described in detail below.

Figure 33:
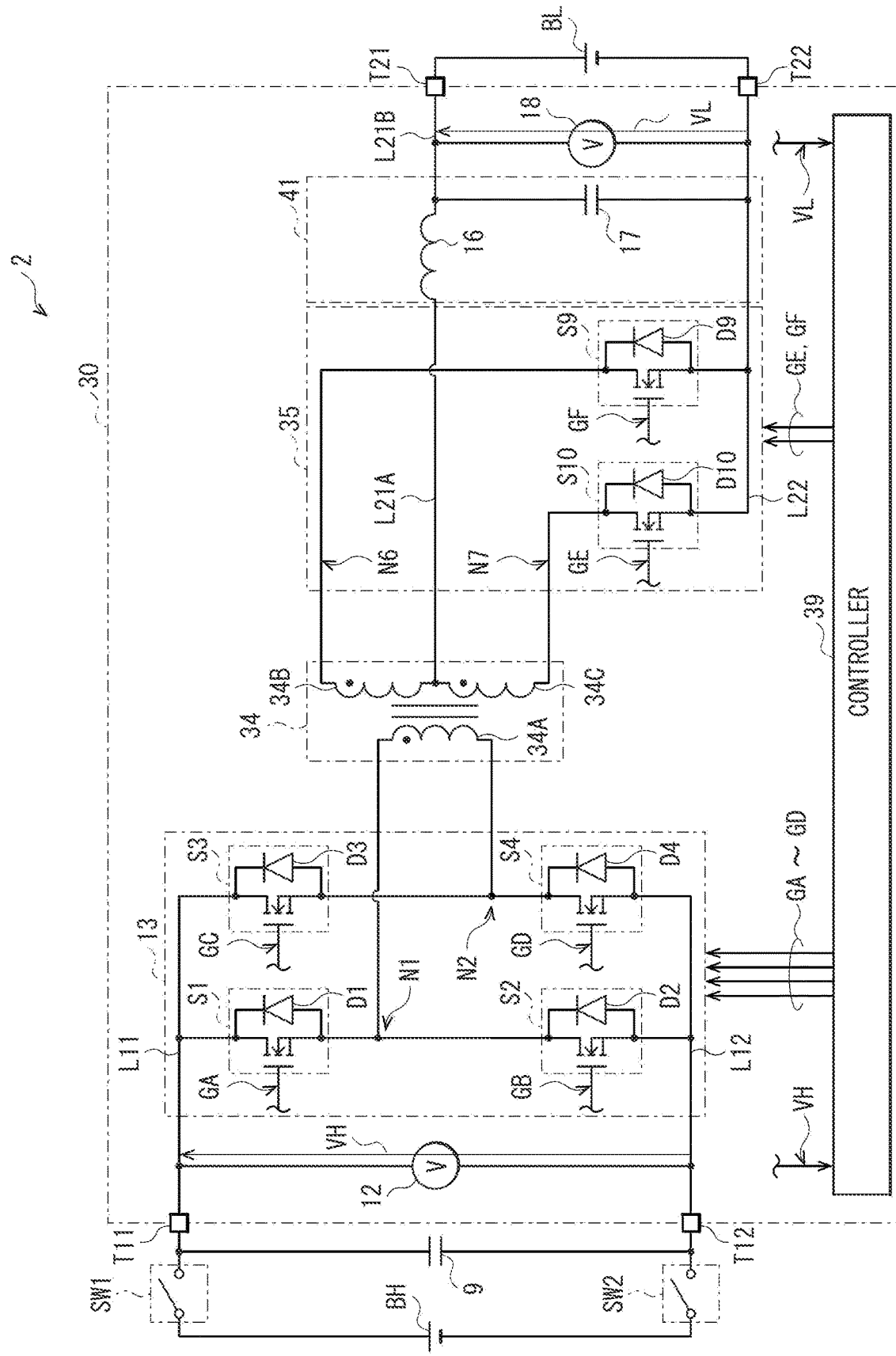
FIG. 33 is a circuit diagram illustrating a configuration example of a power conversion system according to another modification example.

FIG. 33 illustrates a configuration example of a power conversion system 2 according to the present modification example. The power conversion system 2 includes a power conversion apparatus 30. The power conversion apparatus 30 includes a transformer 34, a rectifier circuit 35, and a controller 39.

The transformer 34 may include windings 34A, 34B, and 34C. One end of the winding 34A is coupled to the node N1 of the switching circuit 13, and another end of the winding 34A is coupled to the node N2 of the switching circuit 13. One end of the winding 34B may be coupled to a node N6, and another end of the winding 34B may be coupled to one end of the winding 34C and to the voltage line L21A. The one end of the winding 34C may be coupled to the other end of the winding 34B and to the voltage line L21A, and another end of the winding 34C may be coupled to a node N7.

The rectifier circuit 35 may include transistors S9 and S10. The transistors S9 and S10 may each be configured by an n-type FET, for example. The transistors S9 and S10 may include body diodes D9 and D10, respectively. The transistor S9 may be provided on a path coupling the node N6 and the reference voltage line L22 to each other, and may be configured to couple the node N6 to the reference voltage line L22 by being turned on. A drain of the transistor S9 may be coupled to the node N6, a gate of the transistor S9 may be supplied with the gate signal GF, and a source of the transistor S9 may be coupled to the reference voltage line L22. The transistor S10 may be provided on a path coupling the node N7 and the reference voltage line L22 to each other, and may be configured to couple the node N7 to the reference voltage line L22 by being turned on. A drain of the transistor S10 may be coupled to the node N7, a gate of the transistor S10 may be supplied with the gate signal GE, and a source of the transistor S10 may be coupled to the reference voltage line L22.

The controller 39 may be configured to control an operation of the power conversion apparatus 30 by controlling operations of the switching circuit 13 and the rectifier circuit 35 on the basis of the voltage VH detected by the voltage sensor 12 and the voltage VL detected by the voltage sensor 18. In a specific but non-limiting example, the controller 39 may be configured to control the operation of the power conversion apparatus 30 by generating the gate signals GA to GF on the basis of the voltages VH and VL and performing PWM control through the use of the gate signals GA to GF.

The transformer 34 may correspond to a specific but non-limiting example of the "transformer" in one embodiment of the technology. The winding 34A may correspond to a specific but non-limiting example of the "first winding" in one embodiment of the technology. The winding 34B may correspond to a specific but non-limiting example of the "second winding" in one embodiment of the technology. The winding 34C may correspond to a specific but non-limiting example of a "third winding" in one embodiment of the technology. The rectifier circuit 35 may correspond to a specific but non-limiting example of the "rectifier circuit" in one embodiment of the technology. The node N6 may correspond to a specific but non-limiting example of a "sixth node" in one embodiment of the technology. The node N7 may correspond to a specific but non-limiting example of a "seventh node" in one embodiment of the technology. The transistor S9 may correspond to a specific but non-limiting example of a "ninth switching device" in one embodiment of the technology. The transistor S10 may correspond to a specific but non-limiting example of a "tenth switching device" in one embodiment of the technology.

The foregoing modification examples may be applied to the power conversion system 2. A description will be given below of some examples of the power conversion system 2 to which the modification examples are applied.

Figure 34:
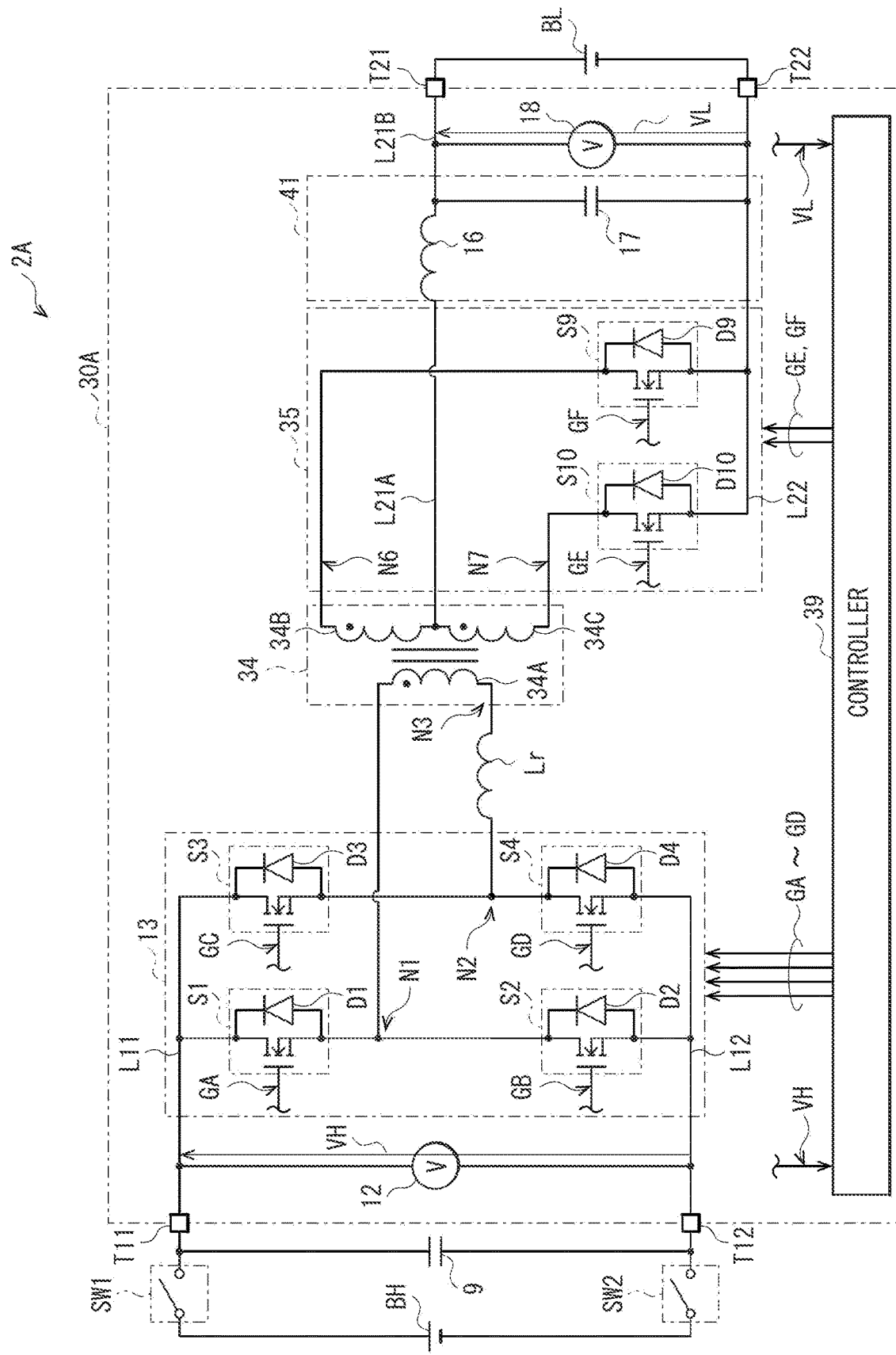
FIG. 34 is a circuit diagram illustrating a configuration example of a power conversion system according to another modification example.

FIG. 34 illustrates a configuration example of a power conversion system 2A to which Modification Example 4 is applied. The power conversion system 2A includes a power conversion apparatus 30A. The power conversion apparatus 30A may include the resonant inductor Lr. The one end of the resonant inductor Lr may be coupled to the node N2, and the other end of the resonant inductor Lr may be coupled to the other end of the winding 34A of the transformer 34.

Figure 35:
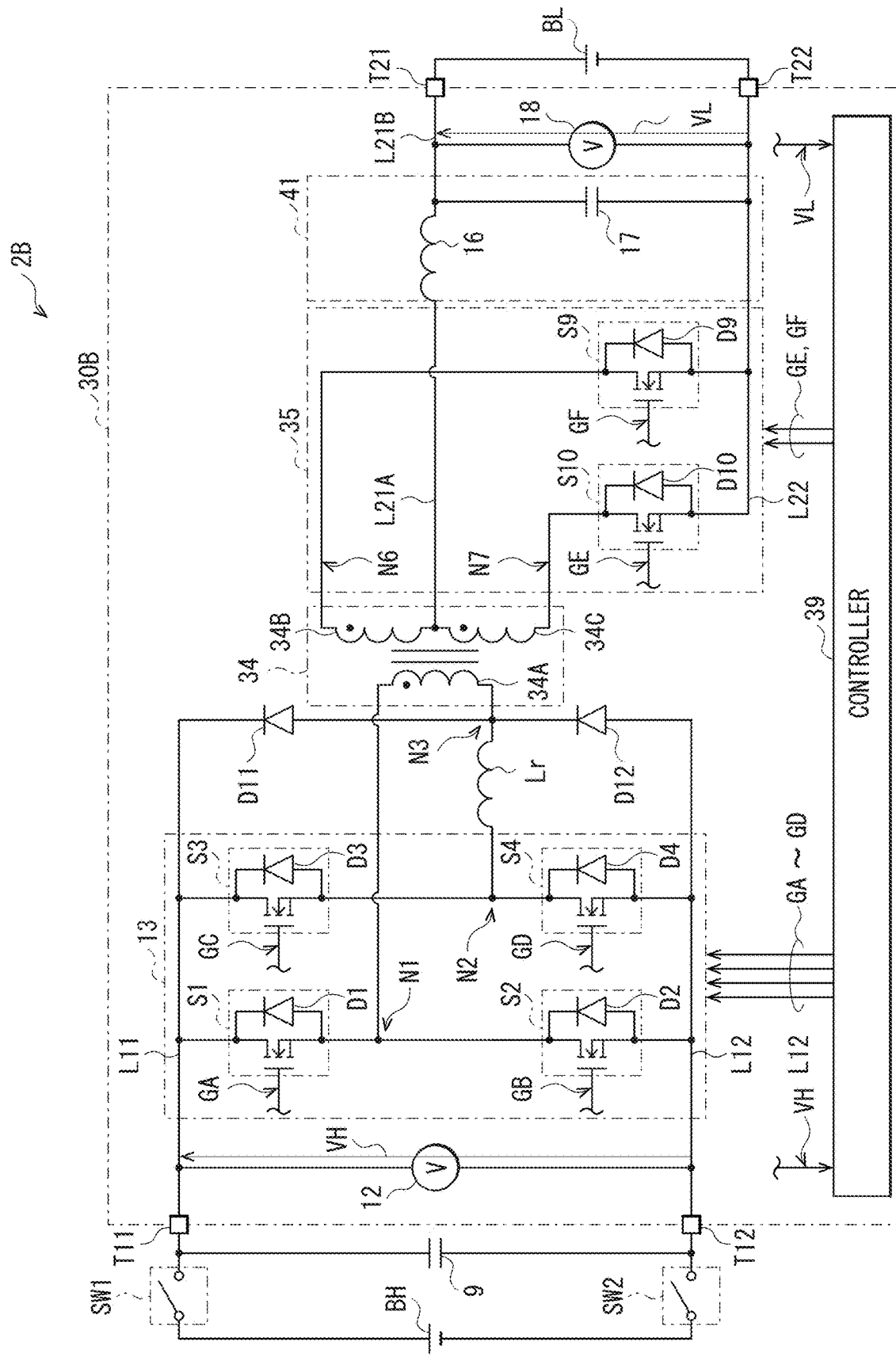
FIG. 35 is a circuit diagram illustrating a configuration example of a power conversion system according to another modification example.

FIG. 35 illustrates a configuration example of a power conversion system 2B to which Modification Example 5 is applied. The power conversion system 2B includes a power conversion apparatus 30B. The power conversion apparatus 30B may include the resonant inductor Lr and the diodes D11 and D12. The one end of the resonant inductor Lr may be coupled to the node N2, and the other end of the resonant inductor Lr may be coupled to the node N3. The other end of the winding 34A of the transformer 34 may be coupled to the node N3. The anode of the diode D11 may be coupled to the node N3, and the cathode of the diode D11 may be coupled to the voltage line L11. The anode of the diode D12 may be coupled to the reference voltage line L12, and the cathode of the diode D12 may be coupled to the node N3.

Figure 36:
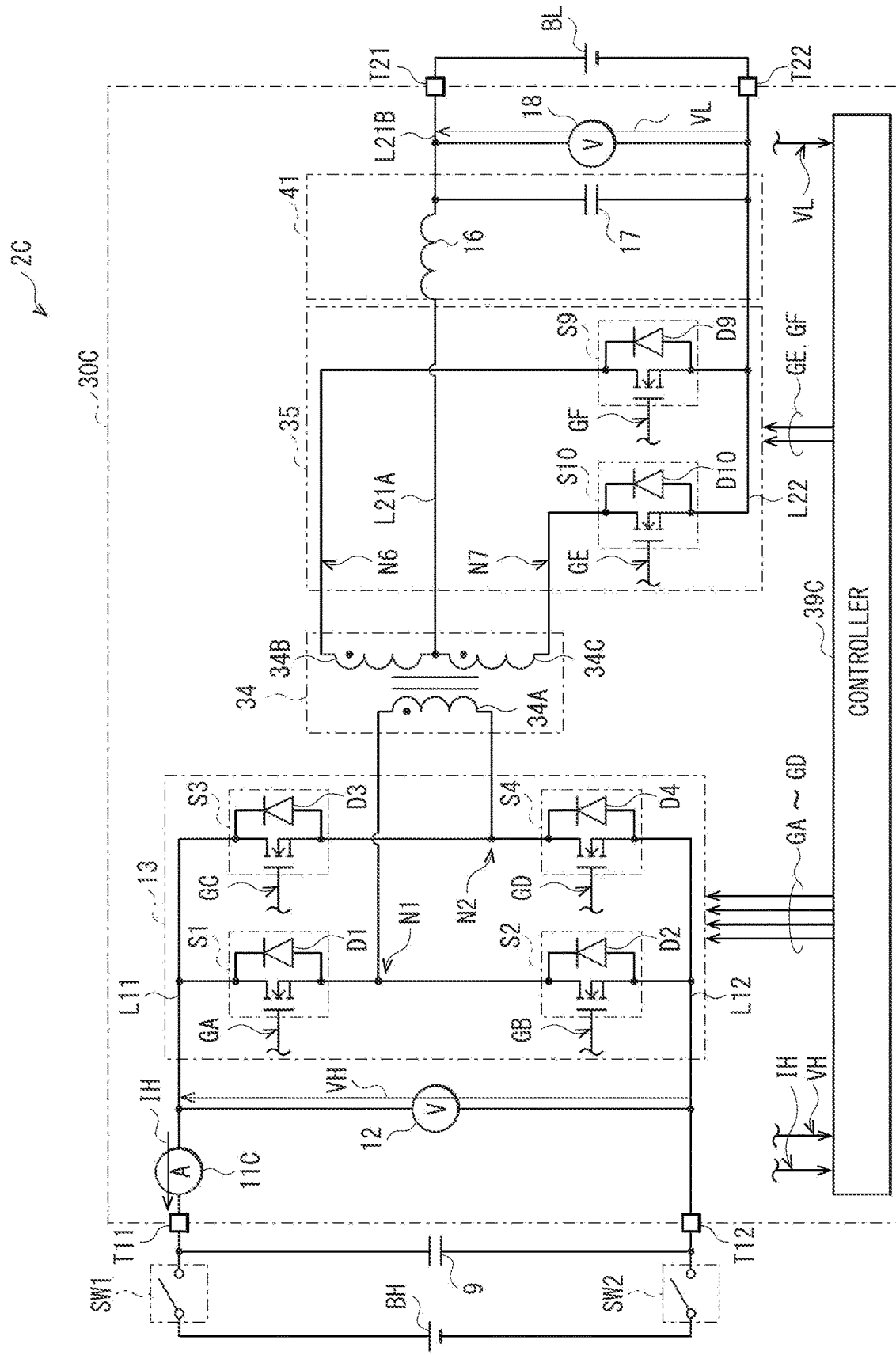
FIG. 36 is a circuit diagram illustrating a configuration example of a power conversion system according to another modification example.

FIG. 36 illustrates a configuration example of a power conversion system 2C to which Modification Example 6 is applied. The power conversion system 2C includes a power conversion apparatus 30C. The power conversion apparatus 30C may include the current sensor 11C and a controller 39C. The current sensor 11C may be configured to detect a current flowing through the terminal T11. The one end of the current sensor 11C may be coupled to the terminal T11, and the other end of the current sensor 11C may be coupled to the voltage line L11. The current sensor 11C may detect a current flowing from the voltage line L11 toward the terminal T11 as the current IH. The controller 39C may be configured to control the operations of the switching circuit 13 and the rectifier circuit 35 on the basis of the current IH detected by the current sensor 11C, the voltage VH detected by the voltage sensor 12, and the voltage VL detected by the voltage sensor 18. The controller 39C may include, for example, the pre-charge controller 21C illustrated in FIG. 16 or the pre-charge controller 21D illustrated in FIG. 17.

Figure 37:
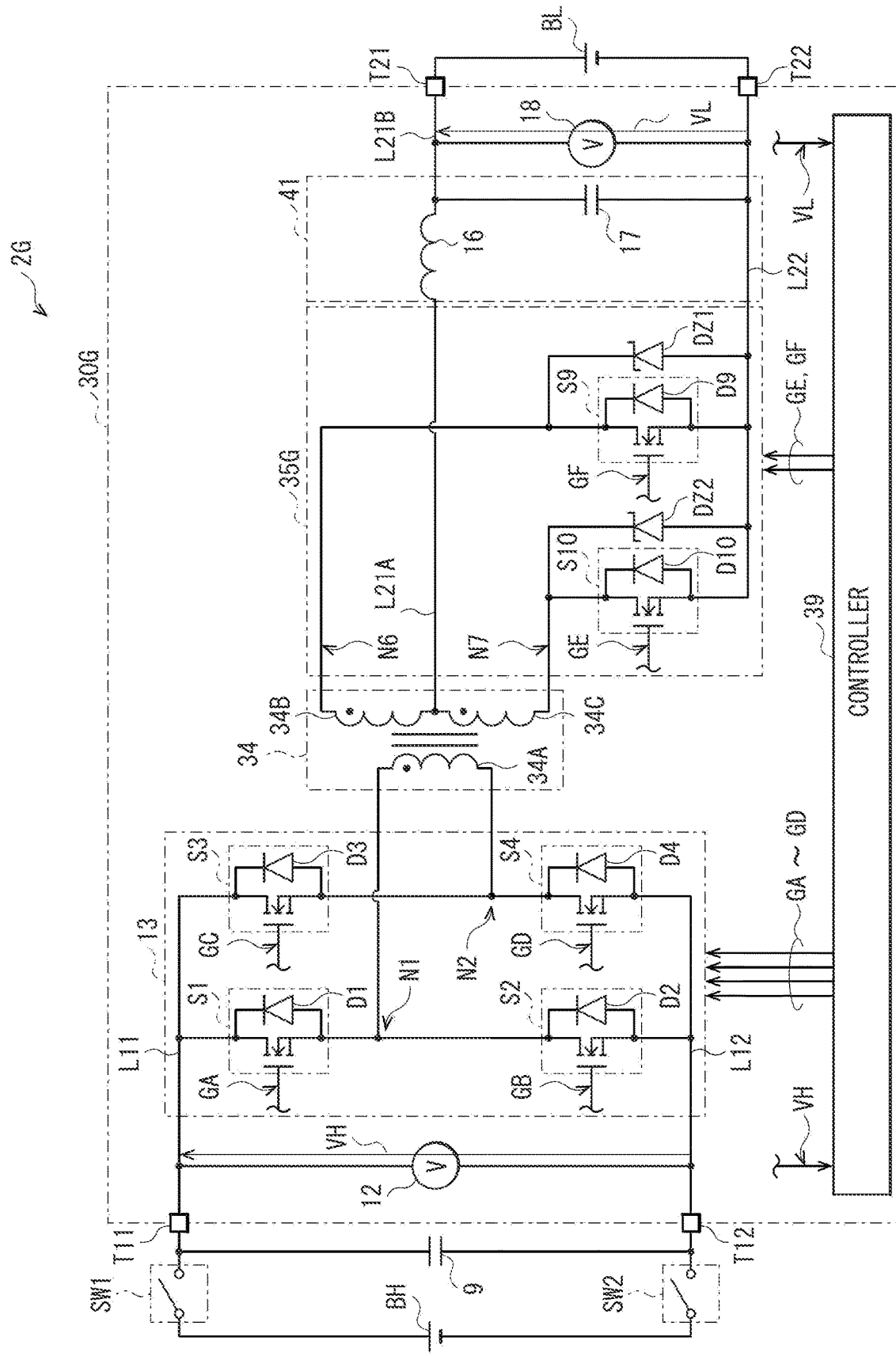
FIG. 37 is a circuit diagram illustrating a configuration example of a power conversion system according to another modification example.

FIG. 37 illustrates a configuration example of a power conversion system 2G to which Modification Example 8 is applied. The power conversion system 2G includes a power conversion apparatus 30G. The power conversion apparatus 30G includes a rectifier circuit 35G. The rectifier circuit 35G may include Zener diodes DZ1 and DZ2. An anode of the Zener diode DZ1 may be coupled to the reference voltage line L22, and a cathode of the Zener diode DZ1 may be coupled to the node N6. An anode of the Zener diode DZ2 may be coupled to the reference voltage line L22, and a cathode of the Zener diode DZ2 may be coupled to the node N7. Note that this is a non-limiting example, and the active clamp circuit 90 illustrated in FIG. 21 may be employed. In a specific but non-limiting example, one active clamp circuit 90 (an active clamp circuit 90A) may be provided between the node N6 and the reference voltage line L22, and another active clamp circuit 90 (an active clamp circuit 90B) may be provided between the node N7 and the reference voltage line L22.

Figure 38:
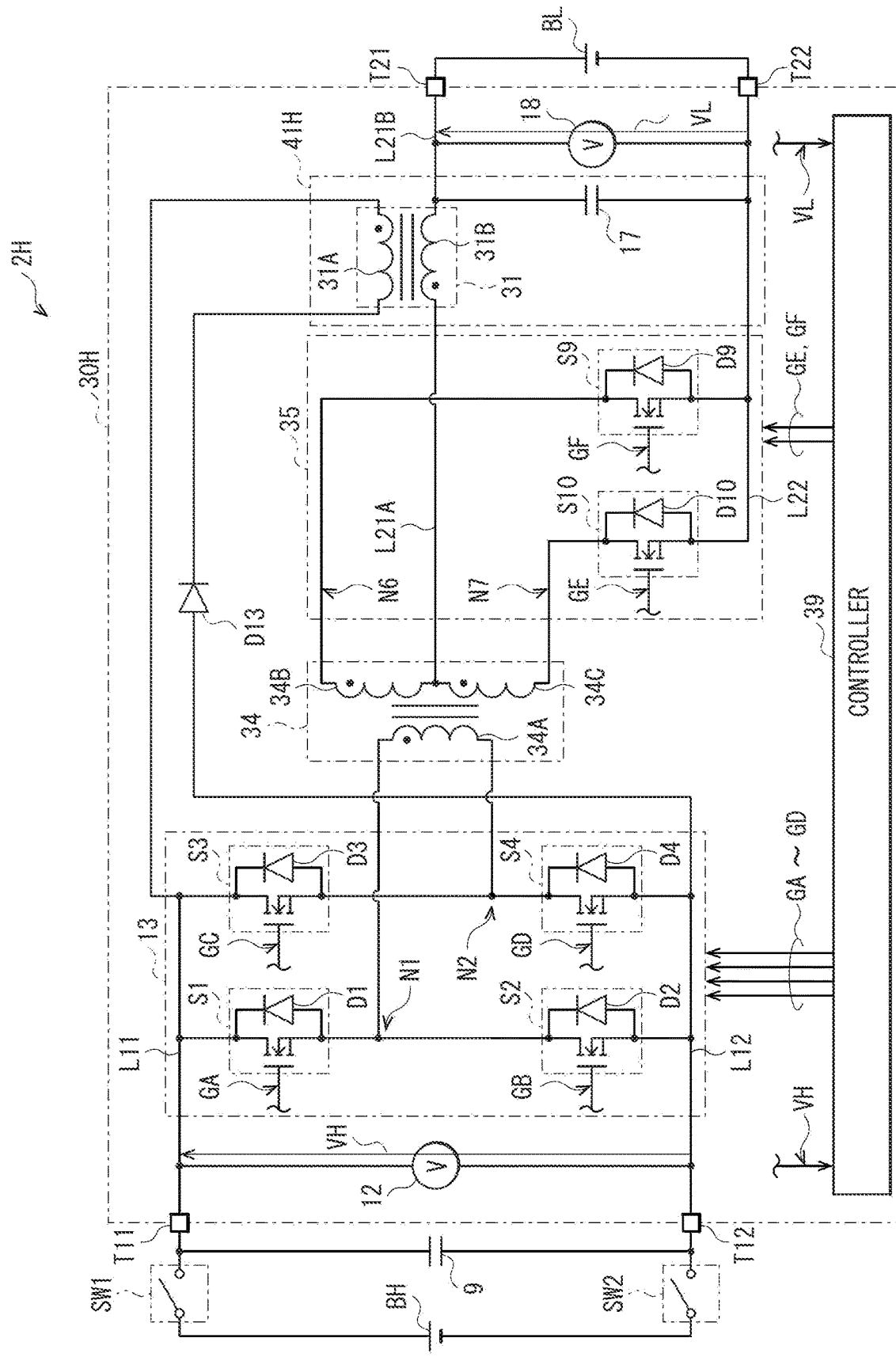
FIG. 38 is a circuit diagram illustrating a configuration example of a power conversion system according to another modification example.

FIG. 38 illustrates a configuration example of a power conversion system 2H to which Modification Example 9 is applied. The power conversion system 2H includes a power conversion apparatus 30H. The power conversion apparatus 30H may include the choke transformer 31 and the diode D13. The choke transformer 31 may include the windings 31A and 31B. The one end of the winding 31A may be coupled to the voltage line L11, and the other end of the winding 31A may be coupled to the cathode of the diode D13. The one end of the winding 31B may be coupled to the voltage line L21A, and the other end of the winding 31B may be coupled to the voltage line L21B. The anode of the diode D13 may be coupled to the reference voltage line L12, and the cathode of the diode D13 may be coupled to the other end of the winding 31A. Note that the switch SW may further be provided as with the example of FIG. 27.

Figure 39:
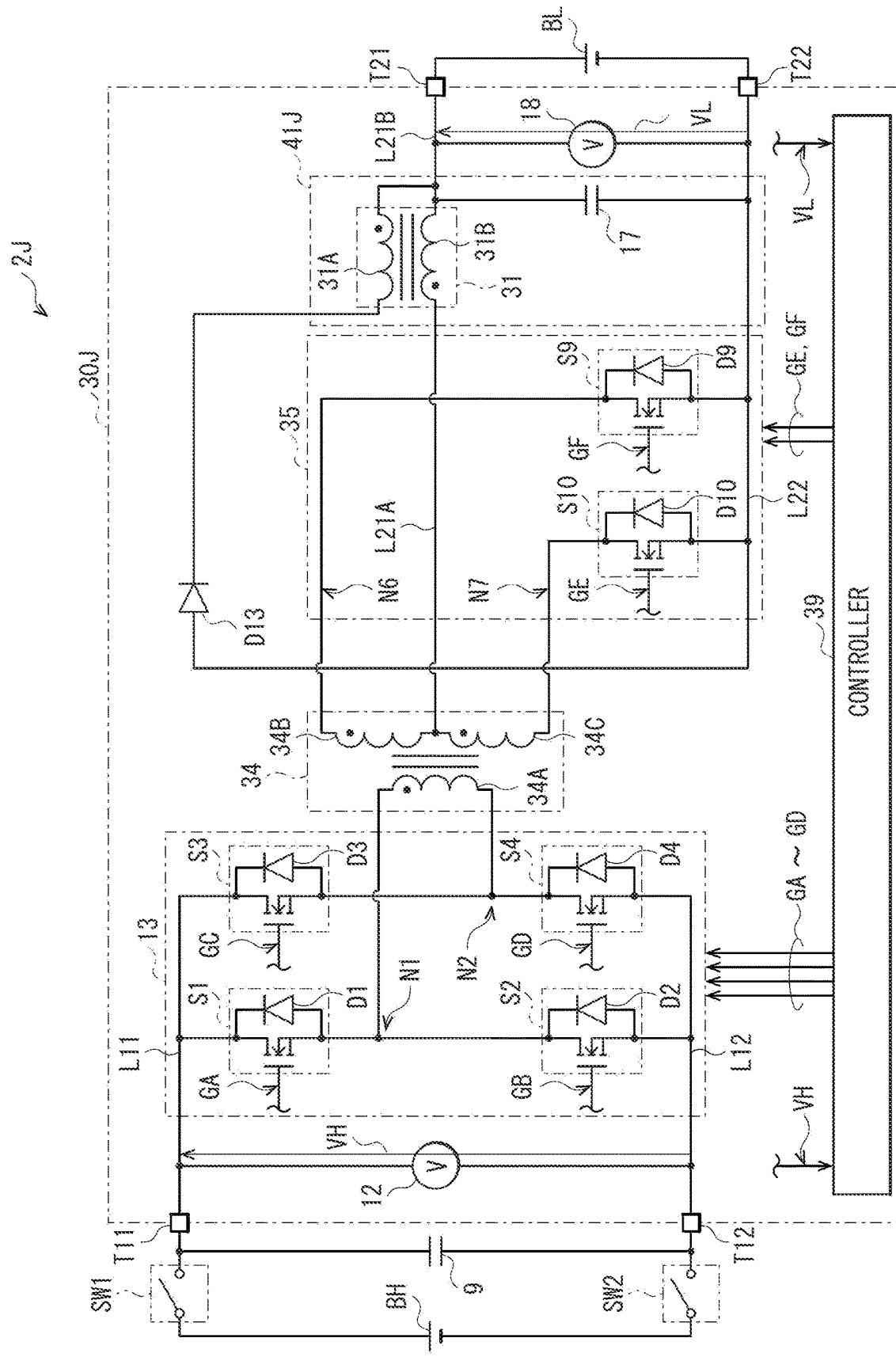
FIG. 39 is a circuit diagram illustrating a configuration example of a power conversion system according to another modification example.

FIG. 39 illustrates a configuration example of a power conversion system 2J to which Modification Example 9 is applied. The power conversion system 2J includes a power conversion apparatus 30J. The power conversion apparatus 30J may include the choke transformer 31 and the diode D13. The choke transformer 31 may include the windings 31A and 31B. The one end of the winding 31A may be coupled to the voltage line L21B, and the other end of the winding 31A may be coupled to the cathode of the diode D13. The one end of the winding 31B may be coupled to the voltage line L21A, and the other end of the winding 31B may be coupled to the voltage line L21B. The anode of the diode D13 may be coupled to the reference voltage line L22, and the cathode of the diode D13 may be coupled to the other end of the winding 31A. Note that the switch SW may further be provided as with the example of FIG. 32.

Other Modification Examples

Any two or more of the foregoing modification examples may be combined.

The technology has been described hereinabove with reference to the example embodiment and the modification examples. However, the technology is not limited thereto, and may be modified in a variety of ways.

For example, in the foregoing example embodiment, a step-down operation may be performed in the power conversion operation; however, this is non-limiting, and a step-up operation may be performed.

For example, in the foregoing example embodiment, a unidirectional conversion operation of supplying electric power from the high-voltage battery BH to the low-voltage battery BL may be performed in the power conversion operation; however, this is non-limiting. For example, a bidirectional conversion operation may be performed in the power conversion operation by providing a mode in which electric power is supplied form the high-voltage battery BH to the low-voltage battery BL and a mode in which electric power is supplied from the low-voltage battery BL to the high-voltage battery VH. In such a case also, it is possible to charge the capacitor 9 on the basis of the electric power supplied from the low-voltage battery BL during the preparation period before performing the power conversion operation in the mode in which electric power is supplied from the high-voltage battery BH to the low-voltage battery BL.

For example, in the foregoing example embodiment, the controller 19 may generate the duty ratios DP and DS to satisfy the equations EQ1 and EQ2 in the pre-charge operation; however, this is non-limiting. Alternatively, for example, in the power conversion system that performs the bidirectional conversion operation with the mode in which electric power is supplied from the high-voltage battery BH to the low-voltage battery BL and the mode in which electric power is supplied from the low-voltage battery BL to the high-voltage battery BH in the power conversion operation, the controller 19 may generate the duty ratios DP and DS to satisfy the equations EQ1 and EQ2 in performing the power conversion operation in the mode in which electric power is supplied from the low-voltage battery BL to the high-voltage battery BH.

For example, when the body diode of any of the transistors is turned on, the gate signal of the relevant transistor may be set to the high level at this timing to thereby synchronize the turning on of the transistor with the body diode. This makes it possible to enhance conversion efficiency of the power conversion system.

It is possible to achieve at least the following configurations from the foregoing embodiments and modification examples of the technology.

(1)
A power conversion apparatus including:
a first power terminal including a first coupling terminal and a second coupling terminal;
a switching circuit including
    a first switching device provided on a path coupling a first power node and a first node to each other, the first power node being led to the first coupling terminal;
    a second switching device provided on a path coupling the first node and a second power node to each other, the second power node being led to the second coupling terminal;
    a third switching device provided on a path coupling the first power node and a second node to each other, and
    a fourth switching device provided on a path coupling the second node and the second power node to each other;
a transformer including a first winding and a second winding, the first winding including a first terminal coupled to the first node and a second terminal coupled to the second node;
a rectifier circuit coupled to the second winding and including a plurality of switching devices;
a second power terminal led to the rectifier circuit; and
a controller configured to control an operation of each of the first switching device, the second switching device, the third switching device, the fourth switching device, and the plurality of switching devices, in which
the controller is configured to control, during a predetermined period, an operation of each of the switching circuit and the rectifier circuit to supply electric power from the second power terminal toward the first power terminal, the predetermined period being different from a period during which electric power is to be supplied from the first power terminal toward the second power terminal,
the controller is configured to operate the switching circuit with a first duty ratio and operate the rectifier circuit with a second duty ratio during the predetermined period, and
the first duty ratio is greater than zero and less than or equal to the second duty ratio.

(2)
The power conversion apparatus according to (1), in which the predetermined period is a period before the period during which electric power is to be supplied from the first power terminal toward the second power terminal.

(3)
The power conversion apparatus according to (1) or (2), in which the second duty ratio is greater than zero and less than or equal to 0.5.

(4)
The power conversion apparatus according to any one of (1) to (3), in which
the predetermined period includes a first period, and a second period after the first period, and
the controller is configured to control the operation of the rectifier circuit during the first period and to control the operation of each of the switching circuit and the rectifier circuit during the second period.

(5)
The power conversion apparatus according to any one of (1) to (4), in which the controller is configured to control the operation of each of any two of the first switching device, the second switching device, the third switching device, and the fourth switching device of the switching circuit during the predetermined period.

(6)
The power conversion apparatus according to any one of (1) to (5), in which the controller is configured to determine a sequence of the first duty ratio of the switching circuit and a sequence of the second duty ratio of the rectifier circuit for the predetermined period on a basis of a voltage at the second power terminal, and to control the operation of each of the switching circuit and the rectifier circuit on a basis of a result of the determination.

(7)
The power conversion apparatus according to any one of (1) to (6), wherein the controller is configured to control the operation of one or both of the switching circuit and the rectifier circuit by performing feedback control on a basis of a first current corresponding to a current flowing through the first power terminal.

(8)
The power conversion apparatus according to (7), in which the first current includes any one of the current flowing through the first power terminal, a current flowing through the switching circuit, and a current flowing through the first winding.

(9)
The power conversion apparatus according to any one of (1) to (8), in which the controller is configured to control the operation of one or both of the switching circuit and the rectifier circuit by performing feedback control on a basis of a voltage at the first power terminal.

(10)
The power conversion apparatus according to any one of (1) to (9), in which the controller is configured to cause the control during the predetermined period to end in a case where a voltage at the first power terminal exceeds a predetermined voltage.

(11)
The power conversion apparatus according to any one of (1) to (10), further including an inductor including a first terminal coupled to the second node and a second terminal coupled to a third node, in which the second terminal of the first winding is coupled to the third node, and is coupled to the second node via the inductor.

(12)

The power conversion apparatus according to (11), further including:

a first diode including a cathode coupled to the first power node and an anode coupled to the third node; and a second diode including a cathode coupled to the third node and an anode coupled to the second power node, in which the controller is configured to control the operation of each of the third switching device and the fourth switching device among the first switching device, the second switching device, the third switching device, and the fourth switching device of the switching circuit during the predetermined period.

(13)

The power conversion apparatus according to any one of (1) to (12), in which the second power terminal includes a third coupling terminal and a fourth coupling terminal, and the plurality of switching devices of the rectifier circuit includes:

a fifth switching device provided on a path coupling a third power node and a fourth node to each other, the third power node being led to the third coupling terminal;

a sixth switching device provided on a path coupling the fourth node and a fourth power node to each other, the fourth power node being led to the fourth coupling terminal;

a seventh switching device provided on a path coupling the third power node and a fifth node to each other; and an eighth switching device provided on a path coupling the fifth node and the fourth power node to each other.

(14)

The power conversion apparatus according to (13), in which the rectifier circuit further includes a Zener diode provided on a path coupling the third power node and the fourth power node to each other.

(15)

The power conversion apparatus according to any one of (1) to (12), in which the second power terminal includes a third coupling terminal and a fourth coupling terminal, the transformer further includes a third winding, the second winding includes a first terminal coupled to a third power node led to the third coupling terminal, and a second terminal coupled to a sixth node, the third winding includes a first terminal coupled to the third power node, and a second terminal coupled to a seventh node, and the plurality of switching devices of the rectifier circuit includes:

a ninth switching device provided on a path coupling the sixth node and a fourth power node to each other, the fourth power node being led to the fourth coupling terminal; and a tenth switching device provided on a path coupling the seventh node and the fourth power node to each other.

(16)

The power conversion apparatus according to (15), in which the rectifier circuit further includes a first Zener diode provided on the path coupling the sixth node and the fourth power node to each other, and a second Zener diode provided on the path coupling the seventh node and the fourth power node to each other.

(17)

The power conversion apparatus according to any one of (1) to (12), further including:

a choke transformer including a first winding and a second winding; and a third diode, in which the second power terminal includes a third coupling terminal and a fourth coupling terminal, the first winding of the choke transformer and the third diode are provided on a path coupling the first power node and the second power node to each other, and the second winding of the choke transformer is provided on a path coupling the rectifier circuit and the third coupling terminal to each other.

(18)

The power conversion apparatus according to (17), further including a switch, in which the first winding of the choke transformer, the third diode, and the switch are provided on the path coupling the first power node and the second power node to each other, and the switch is configured to be in an ON state during the predetermined period.

(19)

The power conversion apparatus according to any one of (1) to (12), further including a choke transformer including a first winding and a second winding; and a third diode, in which the second power terminal includes a third coupling terminal and a fourth coupling terminal, the first winding of the choke transformer and the third diode are provided on a path coupling the third coupling terminal and the fourth coupling terminal to each other, and the second winding of the choke transformer is provided on a path coupling the rectifier circuit and the third coupling terminal to each other.

(20)

The power conversion apparatus according to (19), further including a switch, in which the first winding of the choke transformer, the third diode, and the switch are provided on the path coupling the third coupling terminal and the fourth coupling terminal to each other, and the switch is configured to be in an ON state during the predetermined period.

(21)

The power conversion apparatus according to any one of (1) to (20), in which the first coupling terminal and the second coupling terminal are coupled to a capacitor.

(22)

A power conversion system including a first battery including a first terminal and a second terminal, a capacitor including a first terminal and a second terminal, a first switch provided on a path coupling the first terminal of the first battery and the first terminal of the capacitor to each other, a second switch provided on a path coupling the second terminal of the first battery and the second terminal of the capacitor to each other,
a power conversion apparatus, and
a second battery,
the power conversion apparatus including:
a first power terminal including a first coupling terminal coupled to the first terminal of the capacitor, and a second coupling terminal coupled to the second terminal of the capacitor;
a switching circuit including
a first switching device provided on a path coupling a first power node and a first node to each other, the first power node being led to the first coupling terminal;
a second switching device provided on a path coupling the first node and a second power node to each other, the second power node being led to the second coupling terminal;
a third switching device provided on a path coupling the first power node and a second node to each other, and
a fourth switching device provided on a path coupling the second node and the second power node to each other;
a transformer including a first winding and a second winding, the first winding including a first terminal coupled to the first node and a second terminal coupled to the second node;
a rectifier circuit coupled to the second winding and including a plurality of switching devices;
a second power terminal led to the rectifier circuit and coupled to the second battery; and
a controller configured to control an operation of each of the first switching device, the second switching device, the third switching device, the fourth switching device, and the plurality of switching devices, in which
the controller is configured to control, during a predetermined period, an operation of each of the switching circuit and the rectifier circuit to supply electric power from the second power terminal toward the first power terminal, the predetermined period being different from a period during which electric power is to be supplied from the first power terminal toward the second power terminal,
the controller is configured to operate the switching circuit with a first duty ratio and operate the rectifier circuit with a second duty ratio during the predetermined period, and
the first duty ratio is greater than zero and less than or equal to the second duty ratio.

According to the power conversion apparatus and the power conversion system of at least one embodiment of the technology, it is possible to perform the pre-charge operation with a simple configuration with less additional components.

Although the technology has been described hereinabove in terms of the example embodiment and modification examples, the technology is not limited thereto. It should be appreciated that variations may be made in the described example embodiment and modification examples by those skilled in the art without departing from the scope of the disclosure as defined by the following claims. The limitations in the claims are to be interpreted broadly based on the language employed in the claims and not limited to examples described in this specification or during the prosecution of the application, and the examples are to be construed as non-exclusive. The use of the terms first, second, etc. do not denote any order or importance, but rather the terms first, second, etc. are used to distinguish one element from another. The term "substantially" and its variants are defined as being largely but not necessarily wholly what is specified as understood by one of ordinary skill in the art. The term "disposed on/provided on/formed on" and its variants as used herein refer to elements disposed directly in contact with each other or indirectly by having intervening structures therebetween. Moreover, no element or component in this disclosure is intended to be dedicated to the public regardless of whether the element or component is explicitly recited in the following claims.

What is claimed is:

1. A power conversion apparatus comprising:
a first power terminal including a first coupling terminal and a second coupling terminal;
a switching circuit including
a first switching device provided on a path coupling a first power node and a first node to each other, the first power node being led to the first coupling terminal;
a second switching device provided on a path coupling the first node and a second power node to each other, the second power node being led to the second coupling terminal;
a third switching device provided on a path coupling the first power node and a second node to each other, and
a fourth switching device provided on a path coupling the second node and the second power node to each other;
a transformer including a first winding and a second winding, the first winding including a first terminal coupled to the first node and a second terminal coupled to the second node;
a rectifier circuit coupled to the second winding and including a plurality of switching devices;
a second power terminal led to the rectifier circuit; and
a controller configured to control an operation of each of the first switching device, the second switching device, the third switching device, the fourth switching device, and the plurality of switching devices, wherein
the controller is configured to control, during a predetermined period, an operation of each of the switching circuit and the rectifier circuit to supply electric power from the second power terminal through the transformer toward the first power terminal, the predetermined period being a period before a period during which electric power is to be supplied from the first power terminal through the transformer toward the second power terminal,
the controller is configured to operate the switching circuit with a first duty ratio and operate the rectifier circuit with a second duty ratio during the predetermined period,
the first duty ratio is greater than zero and less than or equal to the second duty ratio,
the predetermined period includes a first period, and a second period after the first period,
the controller is configured to control the operation of the rectifier circuit during the first period and to control the operation of each of the switching circuit and the rectifier circuit during the second period, and
the controller is configured to
control, during the predetermined period, the operation of each of the third switching device and the fourth switching device among the first switching device, the second switching device, the third switching device, and the fourth switching device of the switching circuit, maintain, during the first period, four gate signals to be supplied to the first switching device, the second switching device, the third switching device, and the fourth switching device at a low level, and maintain, during the second period, two gate signals to be supplied to the first switching device and the second switching device, out of the four gate signals, at the low level.

2. The power conversion apparatus according to claim 1, wherein the second duty ratio is greater than zero and less than or equal to 0.5.

3. The power conversion apparatus according to claim 1, wherein the controller is configured to determine a sequence of the first duty ratio of the switching circuit and a sequence of the second duty ratio of the rectifier circuit for the predetermined period on a basis of a voltage at the second power terminal, and to control the operation of each of the switching circuit and the rectifier circuit on a basis of a result of the determination.

4. The power conversion apparatus according to claim 1, wherein the controller is configured to control the operation of one or both of the switching circuit and the rectifier circuit by performing feedback control on a basis of a first current corresponding to a current flowing through the first power terminal.

5. The power conversion apparatus according to claim 4, wherein the first current includes any one of the current flowing through the first power terminal, a current flowing through the switching circuit, and a current flowing through the first winding.

6. The power conversion apparatus according to claim 1, wherein the controller is configured to control the operation of one or both of the switching circuit and the rectifier circuit by performing feedback control on a basis of a voltage at the first power terminal.

7. The power conversion apparatus according to claim 1, wherein the controller is configured to cause the control during the predetermined period to end in a case where a voltage at the first power terminal exceeds a predetermined voltage.

8. The power conversion apparatus according to claim 1, further comprising an inductor including a first terminal coupled to the second node and a second terminal coupled to a third node, wherein the second terminal of the first winding is coupled to the third node, and is coupled to the second node via the inductor.

9. The power conversion apparatus according to claim 8, further comprising:

a first diode including a cathode coupled to the first power node and an anode coupled to the third node; and a second diode including a cathode coupled to the third node and an anode coupled to the second power node.

10. The power conversion apparatus according to claim 1, wherein the second power terminal includes a third coupling terminal and a fourth coupling terminal, and the plurality of switching devices of the rectifier circuit includes:

a fifth switching device provided on a path coupling a third power node and a fourth node to each other, the third power node being led to the third coupling terminal;

a sixth switching device provided on a path coupling the fourth node and a fourth power node to each other, the fourth power node being led to the fourth coupling terminal;

a seventh switching device provided on a path coupling the third power node and a fifth node to each other; and an eighth switching device provided on a path coupling the fifth node and the fourth power node to each other.

11. The power conversion apparatus according to claim 10, wherein the rectifier circuit further includes a Zener diode provided on a path coupling the third power node and the fourth power node to each other.

12. The power conversion apparatus according to claim 1, wherein the second power terminal includes a third coupling terminal and a fourth coupling terminal, the transformer further includes a third winding, the second winding includes a first terminal coupled to a third power node led to the third coupling terminal, and a second terminal coupled to a sixth node, the third winding includes a first terminal coupled to the third power node, and a second terminal coupled to a seventh node, and the plurality of switching devices of the rectifier circuit includes:

a ninth switching device provided on a path coupling the sixth node and a fourth power node to each other, the fourth power node being led to the fourth coupling terminal; and a tenth switching device provided on a path coupling the seventh node and the fourth power node to each other.

13. The power conversion apparatus according to claim 12, wherein the rectifier circuit further includes a first Zener diode provided on the path coupling the sixth node and the fourth power node to each other, and a second Zener diode provided on the path coupling the seventh node and the fourth power node to each other.

14. The power conversion apparatus according to claim 1, further comprising:

a choke transformer including a first winding and a second winding; and a third diode, wherein the second power terminal includes a third coupling terminal and a fourth coupling terminal, the first winding of the choke transformer and the third diode are provided on a path coupling the first power node and the second power node to each other, and the second winding of the choke transformer is provided on a path coupling the rectifier circuit and the third coupling terminal to each other.

15. The power conversion apparatus according to claim 14, further comprising a switch, wherein the first winding of the choke transformer, the third diode, and the switch are provided on the path coupling the first power node and the second power node to each other, and the switch is configured to be in an ON state during the predetermined period.

16. The power conversion apparatus according to claim 1, further comprising
a choke transformer including a first winding and a second winding; and
a third diode, wherein
the second power terminal includes a third coupling terminal and a fourth coupling terminal,
the first winding of the choke transformer and the third diode are provided on a path coupling the third coupling terminal and the fourth coupling terminal to each other, and
the second winding of the choke transformer is provided on a path coupling the rectifier circuit and the third coupling terminal to each other.

17. The power conversion apparatus according to claim 16, further comprising a switch, wherein
the first winding of the choke transformer, the third diode, and the switch are provided on the path coupling the third coupling terminal and the fourth coupling terminal to each other, and
the switch is configured to be in an ON state during the predetermined period.

18. The power conversion apparatus according to claim 1, wherein the first coupling terminal and the second coupling terminal are coupled to a capacitor.

19. A power conversion system comprising
a first battery including a first terminal and a second terminal,
a capacitor including a first terminal and a second terminal,
a first switch provided on a path coupling the first terminal of the first battery and the first terminal of the capacitor to each other,
a second switch provided on a path coupling the second terminal of the first battery and the second terminal of the capacitor to each other,
a power conversion apparatus, and
a second battery,
the power conversion apparatus including:
a first power terminal including a first coupling terminal coupled to the first terminal of the capacitor, and a second coupling terminal coupled to the second terminal of the capacitor;
a switching circuit including
a first switching device provided on a path coupling a first power node and a first node to each other, the first power node being led to the first coupling terminal;
a second switching device provided on a path coupling the first node and a second power node to each other, the second power node being led to the second coupling terminal;
a third switching device provided on a path coupling the first power node and a second node to each other, and
a fourth switching device provided on a path coupling the second node and the second power node to each other;
a transformer including a first winding and a second winding, the first winding including a first terminal coupled to the first node and a second terminal coupled to the second node;
a rectifier circuit coupled to the second winding and including a plurality of switching devices;
a second power terminal led to the rectifier circuit and coupled to the second battery; and
a controller configured to control an operation of each of the first switching device, the second switching device, the third switching device, the fourth switching device, and the plurality of switching devices, wherein
the controller is configured to control, during a predetermined period, an operation of each of the switching circuit and the rectifier circuit to supply electric power from the second power terminal through the transformer toward the first power terminal, the predetermined period being a period before a period during which electric power is to be supplied from the first power terminal through the transformer toward the second power terminal,
the controller is configured to operate the switching circuit with a first duty ratio and operate the rectifier circuit with a second duty ratio during the predetermined period,
the first duty ratio is greater than zero and less than or equal to the second duty ratio,
the predetermined period includes a first period, and a second period after the first period,
the controller is configured to control the operation of the rectifier circuit during the first period and to control the operation of each of the switching circuit and the rectifier circuit during the second period, and
the controller is configured to
control, during the predetermined period, the operation of each of the third switching device and the fourth switching device among the first switching device, the second switching device, the third switching device, and the fourth switching device of the switching circuit,
maintain, during the first period, four gate signals to be supplied to the first switching device, the second switching device, the third switching device, and the fourth switching device at a low level, and
maintain, during the second period, two gate signals to be supplied to the first switching device and the second switching device, out of the four gate signals, at the low level.

* * * * *